(12) United States Patent
Wang et al.

(10) Patent No.: US 10,867,253 B1
(45) Date of Patent: Dec. 15, 2020

(54) DISTRIBUTABLE CLUSTERING MODEL TRAINING SYSTEM

(71) Applicant: SAS Institute Inc., Cary, NC (US)

(72) Inventors: Yingjian Wang, Apex, NC (US); Xu Chen, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/880,551

(22) Filed: May 21, 2020

Related U.S. Application Data

(60) Provisional application No. 62/852,574, filed on May 24, 2019, provisional application No. 62/874,732, filed on Jul. 16, 2019, provisional application No. 63/018,476, filed on Apr. 30, 2020.

(51) Int. Cl.
   *G06N 20/20* (2019.01)
   *G06N 7/00* (2006.01)

(52) U.S. Cl.
   CPC ............. *G06N 7/005* (2013.01); *G06N 20/20* (2019.01)

(58) Field of Classification Search
   CPC .............................. G06N 7/005; G06N 20/20
   See application file for complete search history.

(56) References Cited

U.S. PATENT DOCUMENTS

| | | | |
|---|---|---|---|
| 10,586,165 B1 | 3/2020 | Wang | |
| 10,628,755 B1 | 4/2020 | Wang | |
| 10,635,947 B2 | 4/2020 | Chen et al. | |
| 2010/0145961 A1* | 6/2010 | Hu | G06F 16/355 707/758 |

OTHER PUBLICATIONS

Borsos, Zalan et al. "Variational Inference for DPGMM with Coresets." (2017), https://pdfs.semanticscholar.org/5b0b/370817cde6760248f11bfa810f0bd90a3700.pdf?_ga=2.125402314.1779312314.1598977262-1158537085.1595348974 (Year: 2017).*

* cited by examiner

*Primary Examiner* — Austin Hicks
(74) *Attorney, Agent, or Firm* — Bell & Manning, LLC

(57) ABSTRACT

A computing system trains a clustering model. A responsibility parameter vector is initialized for each observation vector and includes a probability value of a cluster membership. The observation vectors include a plurality of classified observation vectors and a plurality of unclassified observation vectors. (A) Beta distribution parameter values are computed for each cluster. (B) Parameter values are computed for a normal-Wishart distribution for each cluster. (C) Each responsibility parameter vector is updated using the beta distribution parameter values, the parameter values, and a respective observation vector. (D) A convergence parameter value is computed. (E) (A) to (D) are repeated until the computed convergence parameter value indicates the responsibility parameter vector defined for each observation vector of the plurality of unclassified observation vectors is converged. A cluster membership is determined and output for each observation vector using a respective, updated responsibility parameter vector.

30 Claims, 19 Drawing Sheets

DISTRIBUTABLE CLUSTERING MODEL TRAINING SYSTEM

CROSS-REFERENCE TO RELATED APPLICATIONS

The present application claims the benefit of and priority to 35 U.S.C. § 119(e) to U.S. Provisional Patent Application No. 63/018,476 filed Apr. 30, 2020, the entire contents of which are hereby incorporated by reference. The present application also claims the benefit of and priority to 35 U.S.C. § 119(e) to U.S. Provisional Patent Application No. 62/852,574 filed May 24, 2019, the entire contents of which are hereby incorporated by reference. The present application further claims the benefit of and priority to 35 U.S.C. § 119(e) to U.S. Provisional Patent Application No. 62/874,732 filed Jul. 16, 2019, the entire contents of which are hereby incorporated by reference.

BACKGROUND

Clustering is a commonly used machine learning model used to analyze a wide range of types of data that includes text data, image data, biological data, geographic data, etc. The Dirichlet process Gaussian mixture model (DPGMM) is a widely used nonparametric Bayesian model for clustering tasks in machine learning. The nonparametric feature in DPGMM is to use the Dirichlet process to support unknown components in the mixture which corresponds to the number of clusters in data rendering DPGMM a desirable tool in clustering for its efficacy and elegancy. However, due to its high modeling complexity, DPGMM has rarely been applied to cluster with relatively big datasets, e.g., datasets with more than a million of observations, due to the prohibitive clustering time incurred.

Machine learning algorithms can be classified into three categories: unsupervised learning, supervised learning, and semi-supervised learning. Unsupervised learning does not require that a target (dependent) variable y be labeled in training data to indicate occurrence or non-occurrence of the event or to recognize/classify the object. An unsupervised learning system predicts the label or classification of a target variable y in training data by defining a model that describes the hidden structure in the training data. Supervised learning requires that the target (dependent) variable y be labeled or classified in training data so that a model can be built to predict the label or classification of new unlabeled data. A supervised learning system discards observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the prediction/classification (data labeling) model.

SUMMARY

In an example embodiment, a computer-readable medium is provided having stored thereon computer-readable instructions that when executed by a computing device, cause the computing device to train a clustering model. A mean vector is computed for each cluster of a plurality of clusters from a plurality of observation vectors. The plurality of observation vectors includes a plurality of classified observation vectors and a plurality of unclassified observation vectors. Each observation vector of the plurality of observation vectors includes a value for each variable of the plurality of variables. A target variable value is defined to represent a class for each respective observation vector of the plurality of classified observation vectors. The target variable value is unlabeled for each respective observation vector of the plurality of unclassified observation vectors. An inverse precision parameter matrix is computed for each cluster of the plurality of clusters from the plurality of observation vectors. A responsibility parameter vector is initialized for each observation vector of the plurality of unclassified observation vectors. The responsibility parameter vector includes a probability value of a cluster membership in each cluster of the plurality of clusters for each respective observation vector. (A) Beta distribution parameter values are computed for each cluster using a predefined mass parameter value and the responsibility parameter vector. (B) Parameter values are computed for a normal-Wishart distribution for each cluster using a predefined concentration parameter value, a predefined degree of freedom parameter value, the computed mean vector, the computed inverse precision parameter matrix, each observation vector of the plurality of observation vectors, and each responsibility parameter vector defined for each observation vector of the plurality of unclassified observation vectors. (C) Each responsibility parameter vector defined for each observation vector of the plurality of unclassified observation vectors is updated using the computed beta distribution parameter values, the computed parameter values for the normal-Wishart distribution, and a respective observation vector of the plurality of unclassified observation vectors. (D) A convergence parameter value is computed. (E) (A) to (D) are repeated until the computed convergence parameter value indicates the responsibility parameter vector defined for each observation vector of the plurality of unclassified observation vectors is converged. A cluster membership is determined for each observation vector of the plurality of unclassified observation vectors from the plurality of clusters using a respective, updated responsibility parameter vector. The determined cluster membership is output for each observation vector of the plurality of unclassified observation vectors.

In another example embodiment, a system is provided. The system includes, but is not limited to, a processor and a computer-readable medium operably coupled to the processor. The computer-readable medium has instructions stored thereon that, when executed by the processor, cause the system to train a clustering model.

In yet another example embodiment, a method of training a clustering model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
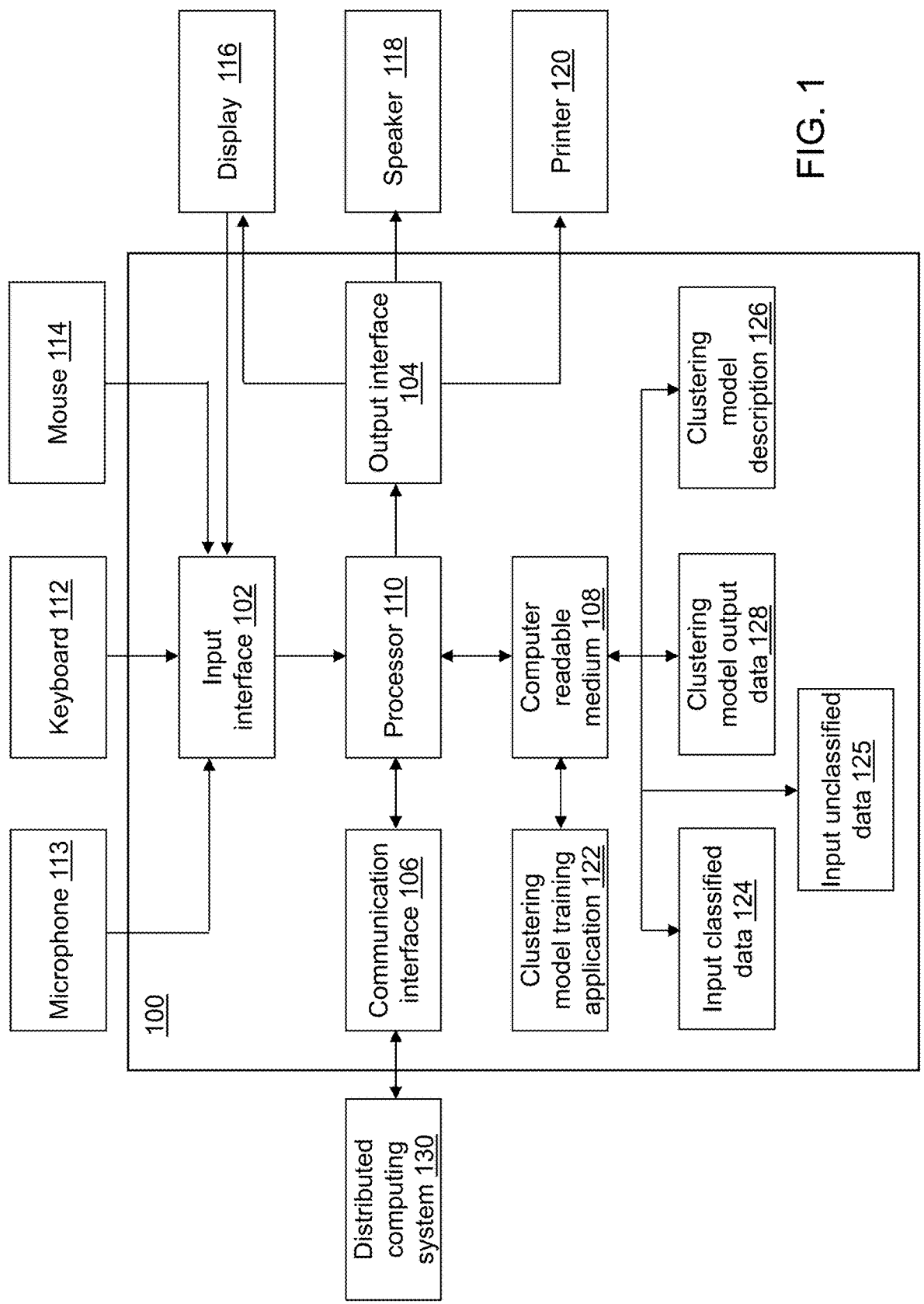
FIG. 1 depicts a block diagram of a clustering model training device in accordance with an illustrative embodiment.

In Dirichlet process Gaussian mixture model (DPGMM), each cluster is represented by a mean or center location and a covariance matrix of a Gaussian distribution that defines a shape of each cluster. Use of a Gaussian distribution is justified by the central limit theorem that states any data made up with a large number of underlying features will be distributed as a Gaussian. The Gaussian mixture model can be regarded as an extension of a k-means clustering model with the additional information of the correlations within each cluster defined by the covariance matrices. The function of the Dirichlet process (DP) in DPGMM is to find a number of clusters in the data. The mathematic expression of the DPGMM is given in equation (1).

$$p(\{\mu_k, \Lambda_k\}_{k=1}^{K_{max}} | x, z) \propto \Pi_{i=1}^{n} N(x_i | \mu_{z_i}, \Lambda_{z_i}) \Pi_{k=1}^{K_{max}} NW(\mu_k, \Lambda_k | m_0, \beta_0, \Psi_0, \nu_0) \quad (1)$$

$x = \{x_i\}_{i=1}^{n}$, n input observations;
$z = \{z_i\}_{i=1}^{n}$, a cluster index where $z=1, 2, \ldots, K_{max}$;
K, a number of clusters in x;
$\mu_k$, a mean of Gaussian distribution, where $k=1, 2, \ldots, K_{max}$;

$\Lambda_k$, a covariance of the Gaussian distribution, where $k=1, 2, \ldots, K_{max}$;

$x_i$, the $i^{th}$ data;

$z_i$, the cluster membership of the $i^{th}$ data;

$\mu_{z_i}$, a mean of the cluster of the $i^{th}$ data;

$\Lambda_{z_i}$, a covariance of the cluster of the $i^{th}$ data;

$m_0, \beta_0, \Psi_0, \nu_0$, the parameters of the normal-Wishart distribution prior;

N(.), a Gaussian distribution;

NW(.), a normal-Wishart distribution.

For DPGMM, the parameters to be inferred are the number of clusters K, the cluster membership for all observations $\{z_i\}_{i=1}^{n}$, and the Gaussian parameters of the clusters $\{\mu_k, \Lambda_k\}_{k=1}^{K_{max}}$. There are two major methods for the inference of DPGMM: 1) the Markov chain Monte Carlo (MCMC) and 2) the variational Bayesian (VB).

MCMC is a class of methods to infer a complicated probability distribution via sampling. The strategy is to form a Markov chain whose equilibrium distribution is the probability distribution whose parameters are to be inferred. After the proposed Markov chain achieve its equilibrium, the samples drawn from the conditional distribution of the Markov chain are regarded as samples from the target distribution. Hence these samples can be used to calculate the needed parameters. More details about the MCMC method can be found in Andrieu, C., de Freitas, N., Doucet, A., and Jordan, M. I., *An Introduction to MCMC for Machine Learning* Machine Learning 50: 5-43 (2003).

For DPGMM, MCMC is the most common inference method for two major reasons. First, the implementation of MCMC is relatively easy with the sampling steps usually derived in a straightforward manner from the target distribution. Second, the MCMC is guaranteed to yield unbiased results relative to the true distribution by the central limit theorem. Because of these merits of MCMC, there is a series of works on the sampling inference for DPGMM. However, the Markov chain in MCMC usually involves a large number of iterations to reach equilibrium making it computationally time expensive. Additionally, the Markov chain is a strict serial process making it difficult to parallelize with distributed data on multiple machines, especially when processing big data. Recently some parallel algorithms have been developed to run MCMC independently on each machine and synthesize all of the samples into the full distribution. However, when it used for clustering, a cluster alignment procedure is required to unite the separate clustering results into one, which can introduce significant mixing errors.

In contrast with MCMC, VB inference has been inadequately investigated largely because VB is an approximation method. Nevertheless, VB inference has advantages over MCMC. First, VB inference typically takes significantly fewer iterations resulting in a much faster convergence. Second, VB inference does not require a strict serial implementation and is more compatible with a distributed data environment. Third, VB shows clear asymptotic properties even though the result is approximated by a Kullback-Leibler distance relative to the true target distribution.

Detailed discussion on VB methods can be found in Wang, Y. and M. Blei, D., *Frequentist Consistency of Variational Bayes*, Journal of the American Statistical Association (2017). Generally speaking, in VB inference, the task to calculate the target distribution is an optimization problem with the goal of finding a candidate distribution $q(\theta)$ that is closest to a true target distribution $p(\theta|x)$ as shown in equation (2).

$$q^*(\theta) = \underset{q(\theta) \in M}{\mathrm{argmax}} KL(q(\theta) \| p(\theta | x)) \qquad (2)$$

$$KL(q(\theta) \| p(\theta | x)) =$$
$$\log p(x) + KL(q(\theta) \| p(x, \theta)) = \log p(x) - ELBO(q(\theta))$$

where ELBO is the evidence lower bound.

In practice, the DP is implemented with a stick-breaking construction, but truncated at a sufficiently large $K_{max}$ based on an understanding about the upper bound of the number of clusters among the data and/or a capacity limit of the hardware. The VB model for DPGMM, $p(\theta|x)$, is defined in equation (3) with $p(\theta)$:

$\phi_k \sim \mathrm{Beta}(1, \alpha_0)$ $\pi_k = \phi_k \Pi_{l=1}^{k-1}(1-\phi_l)$ $\mu_k, \Lambda_k \sim NW(m_0, \beta_0, \Psi_0, v_0), k=1,2,\ldots,K_{max}$ $z_i \sim \mathrm{multinomial}(\pi)$ $$x_i \sim N(\mu_{z_i}, \Lambda_{z_i}^{-1}), i=1,2,\ldots,n \qquad (3)$$

$\theta$, clustering parameters to be inferred: $K_{max}, \mu_k, \Lambda_k$,
$\alpha_0$, a mass parameter of the DP,
$\phi_k$, a beta variable for the stick-breaking,
$\pi_k$, a fraction of the $k^{th}$ cluster.

The variational distribution, $q(\theta)$, is defined in equation (4).

$q(\theta)$:

$\phi_k \sim \mathrm{Beta}(\gamma_{k,1}, \gamma_{k,2})$ $\mu_k, \Lambda_k \sim NW(m_k, \beta_k, \Psi_k, v_k), k=1,2,\ldots,K_{max}$ $$z_i \sim \mathrm{multinomial}(r_i), i=1,2,\ldots,n \qquad (4)$$

$\gamma_{k,1}, \gamma_{k,2}$, parameters of the beta distribution of the $k^{th}$ fraction of stick-breaking, $m_k, \beta_k, \Psi_k, v_k$, parameters of the normal-Wishart distribution of the $k^{th}$ cluster, $r_i$: a responsibility vector over the $K_{max}$ clusters of the $i^{th}$ data.

A covariance option may be used to indicate if the variables that define each observation vector are independent. For the VB model for DPGMM when the covariance option indicates that the variables are independent, $p(\theta|x)$, is defined in equation (5) with $p(\theta)$:

$\phi_k \sim \mathrm{Beta}(1, \alpha_0)$ $\pi_k = \phi_k \Pi_{l=1}^{k-1}(1-\phi_l)$ $\mu_{k,j}, \Lambda_{k,j} \sim NW(m_{0,j}, \beta_{0,j}, \Psi_{0,j}, v_{0,j}), k=1,2,\ldots,K_{max};$
  $j=1,2,\ldots,d$ $z_i \sim \mathrm{multinomial}(\pi)$ $$x_i \sim N(\mu_{z_i}, \Lambda_{z_i}^{-1}), i=1,2,\ldots,n \qquad (5)$$

$\theta$, clustering parameters to be inferred: $K_{max}, \mu_k, \Lambda_k$,
$\alpha_0$, a mass parameter of the DP,
$\phi_k$, a beta variable for the stick-breaking,
$\pi_k$, a fraction of the $k^{th}$ cluster.

The variational distribution, $q(\theta)$, is defined in equation (6).

$q(\theta)$:

$\phi_k \sim \mathrm{Beta}(\gamma_{k,1}, \gamma_{k,2})$ $\mu_{k,j}, \Lambda_{k,j} \sim NW(m_{k,j}, \beta_{k,j}, \Psi_{k,j}, v_{k,j}), k=1,2,\ldots,K_{max};$
  $j=1,2,\ldots,d$ $$z_i \sim \mathrm{multinomial}(r_i), i=1,2,\ldots,n \qquad (6)$$

$\gamma_{k,1}, \gamma_{k,2}$, parameters of the beta distribution of the $k^{th}$ fraction of stick-breaking, $m_{k,j}, \beta_{k,j}, \Psi_{k,j}, v_{k,j}$, parameters of the normal-Wishart distribution of the $k^{th}$ cluster, $r_i$: a responsibility vector over the $K_{max}$ clusters of the $i^{th}$ data.

Referring to FIG. 1, a block diagram of a clustering model training device 100 is shown in accordance with an illustrative embodiment that clusters data using the DPGMM with the variational Bayesian inference method. Clustering model training device 100 may include an input interface 102, an output interface 104, a communication interface 106, a non-transitory computer-readable medium 108, a processor 110, a clustering model training application 122, input classified data 124, input unclassified data 125, a clustering model description 126, and clustering model output data 128. Fewer, different, and/or additional components may be incorporated into clustering model training device 100.

Input interface 102 provides an interface for receiving information from the user or another device for entry into clustering model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into clustering model training device 100 or to make selections presented in a user interface displayed on display 116.

The same interface may support both input interface 102 and output interface 104. For example, display 116 comprising a touch screen provides a mechanism for user input and for presentation of output to the user. Clustering model training device 100 may have one or more input interfaces that use the same or a different input interface technology. The input interface technology further may be accessible by clustering model training device 100 through communication interface 106.

Output interface 104 provides an interface for outputting information for review by a user of clustering model training device 100 and/or for use by another application or device. For example, output interface 104 may interface with various output technologies including, but not limited to, display 116, a speaker 118, a printer 120, etc. Clustering model training device 100 may have one or more output interfaces that use the same or a different output interface technology. The output interface technology further may be accessible by clustering model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Clustering model training device 100 may have one or more communication interfaces that use the same or a different communication interface technology. For example, clustering model training device 100 may support communication using an Ethernet port, a Bluetooth antenna, a telephone jack, a USB port, etc. Data and/or messages may be transferred between clustering model training device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Clustering model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Clustering model training device 100 also may have one or more drives that support the loading of a memory media such as a CD, DVD, an external hard drive, etc. One or more external hard drives further may be connected to clustering model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Clustering model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Clustering model training application 122 performs operations associated with defining clustering model description 126 from data stored in input classified data 124 and in input unclassified data 125. Clustering model description 126 may be used to predict a cluster membership for data stored in input unclassified data 125 or in a second dataset 1324 (shown referring to FIG. 13). Some or all of the operations described herein may be embodied in clustering model training application 122. The operations may be implemented using hardware, firmware, software, or any combination of these methods.

Referring to the example embodiment of FIG. 1, clustering model training application 122 is implemented in software (comprised of computer-readable and/or computer-executable instructions) stored in computer-readable medium 108 and accessible by processor 110 for execution of the instructions that embody the operations of clustering model training application 122. Clustering model training application 122 may be written using one or more programming languages, assembly languages, scripting languages, etc. Clustering model training application 122 may be integrated with other analytic tools. As an example, clustering model training application 122 may be part of an integrated data analytics software application and/or software architecture such as that offered by SAS Institute Inc. of Cary, N.C., USA. Merely for illustration, clustering model training application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS@Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Clustering model training application 122 may be implemented as a Web application. For example, clustering model training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input classified data 124 and input unclassified data 125 may include, for example, a plurality of rows and a plurality of columns. The plurality of rows may be referred to as observation vectors or records (observations), and the columns may be referred to as variables. In an alternative embodiment, input classified data 124 and input unclassified data 125 may be transposed. The plurality of variables define a vector $x_i$ for each observation vector i=1, 2, . . . , N, where N is a number of the observation vectors included in input classified data 124 and input unclassified data 125. Input classified data 124 includes a target variable value $y_i$ for each observation vector that indicates a label or class or other characteristic defined for the respective observation vector $x_i$ for i=1, 2, . . . , $n_c$, where $n_c$ is a number of the observation vectors included in input classified data 124. Input classified data 124 includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc. Input unclassified data 125 includes observation vectors $x_i$ for i=1, 2, . . . , $n_u$, where $n_u$ is a number of the observation vectors included in input unclassified data 125 that have not been labeled such that the $y_i$ value has not been determined though a value such as zero may be included in a column associated with the $y_i$ values. Input classified data 124 and input unclassified data 125 may be stored in a single database, file, etc. where the $y_i$ value may indicate whether the associated observation vector has been labeled or classified. For example, a $y_i$ value of zero may indicate an unclassified observation vector though in other embodiments, the $y_i$ value of zero may indicate a label, and therefor, a classified observation vector.

Input classified data 124 and input unclassified data 125 may include additional variables that are not included in the plurality of variables. One or more variables of the plurality of variables may describe a characteristic of a physical object. For example, if input classified data 124 and input unclassified data 125 include data related to operation of a vehicle, the variables may include a type of vehicle, an oil pressure, a speed, a gear indicator, a gas tank level, a tire pressure for each tire, an engine temperature, a radiator level, etc.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, input classified data 124 and input unclassified data 125 may include image data captured by medical imaging equipment (i.e., computed tomography image, magnetic resonance image, x-ray image, ultrasound image, etc.) of a body part of a living thing. A subset of the image data is labeled and captured in input classified data 124, for example, as either indicating existence of a medical condition or non-existence of the medical condition. Input classified data 124 and input unclassified data 125 may include a reference to image data that may be stored, for example, in an image file or in a video file, and the existence/non-existence label associated with each image file or video file. Input classified data 124 and input unclassified data 125 may include a plurality of such references. The existence/non-existence label or other label may be defined by a clinician or expert in the field to which data stored in input classified data 124 relates.

In data science, engineering, and statistical applications, data often consists of multiple measurements (across sensors, characteristics, responses, etc.) collected across multiple time instances (patients, test subjects, etc.). These measurements may be collected in input classified data 124 and input unclassified data 125 for analysis and processing or streamed to clustering model training device 100 as it is generated. Input classified data 124 and input unclassified data 125 may include data captured as a function of time for one or more physical objects. The data stored in input classified data 124 and input unclassified data 125 may be captured at different time points periodically, intermittently, when an event occurs, etc. Input classified data 124 and input unclassified data 125 may include data captured at a high data rate such as 200 or more observation vectors per second for one or more physical objects. One or more columns of input classified data 124 and input unclassified data 125 may include a time and/or date value. Input classified data 124 and input unclassified data 125 may include data captured under normal and abnormal operating conditions of the physical object.

The data stored in input classified data 124 and input unclassified data 125 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input classified data 124 and input unclassified data 125 may be generated as part of the Internet of Things (IoT), where things (e.g., machines, devices, phones, sensors) can be connected to networks and the data from these things collected and processed within the things and/or external to the things before being stored in input classified data 124 and input unclassified data 125. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input classified data 124 and input unclassified data 125.

The data stored in input classified data 124 and input unclassified data 125 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input classified data 124 and input unclassified data 125 may be stored on computer-readable medium 108 or on one or more computer-readable media of distributed computing system 130 and accessed by clustering model training device 100 using communication interface 106, input interface 102, and/or output interface 104. Input classified data 124 and input unclassified data 125 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input classified data 124 and input unclassified data 125 may be stored using various data structures as known to those skilled in the art including one or more files of a file system, a relational database, one or more tables of a system of tables, a structured query language database, etc. on clustering model training device 100 or on distributed computing system 130. Clustering model training device 100 may coordinate access to input classified data 124 and input unclassified data 125 that is distributed across distributed computing system 130 that may include one or more computing devices. For example, input classified data 124 and input unclassified data 125 may be stored in a cube distributed across a grid of computers as understood by a person of skill in the art. As another example, input classified data 124 and input unclassified data 125 may be stored in a multi-node Hadoop® class. For instance, Apache™ Hadoop® is an open-source software framework for distributed computing supported by the Apache Software Foundation. As another example, input classified data 124 and input unclassified data 125 may be stored in a cloud of computers and accessed using cloud computing technologies, as understood by a person of skill in the art. The SAS® LASR™ Analytic Server may be used as an analytic platform to enable multiple users to concurrently access data stored in input classified data 124 and input unclassified data 125. The SAS Viya open, cloud-ready, in-memory architecture also may be used as an analytic platform to enable multiple users to concurrently access data stored in input classified data 124 and input unclassified data 125. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
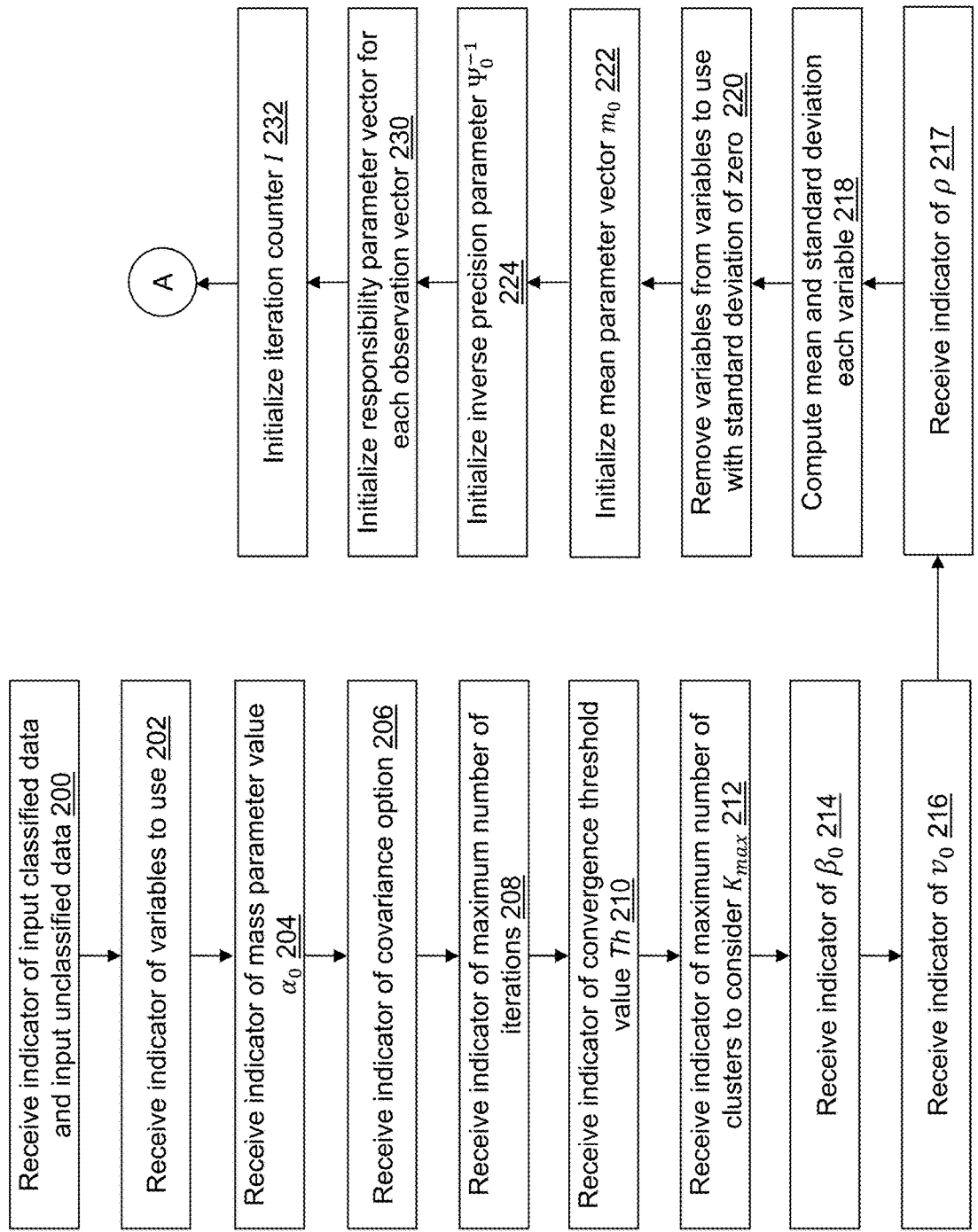
FIGS. 2A and 2B depict a flow diagram illustrating examples of operations performed by a clustering model training application of the clustering model training device of FIG. 1 in accordance with an illustrative embodiment.
Figure 2B:
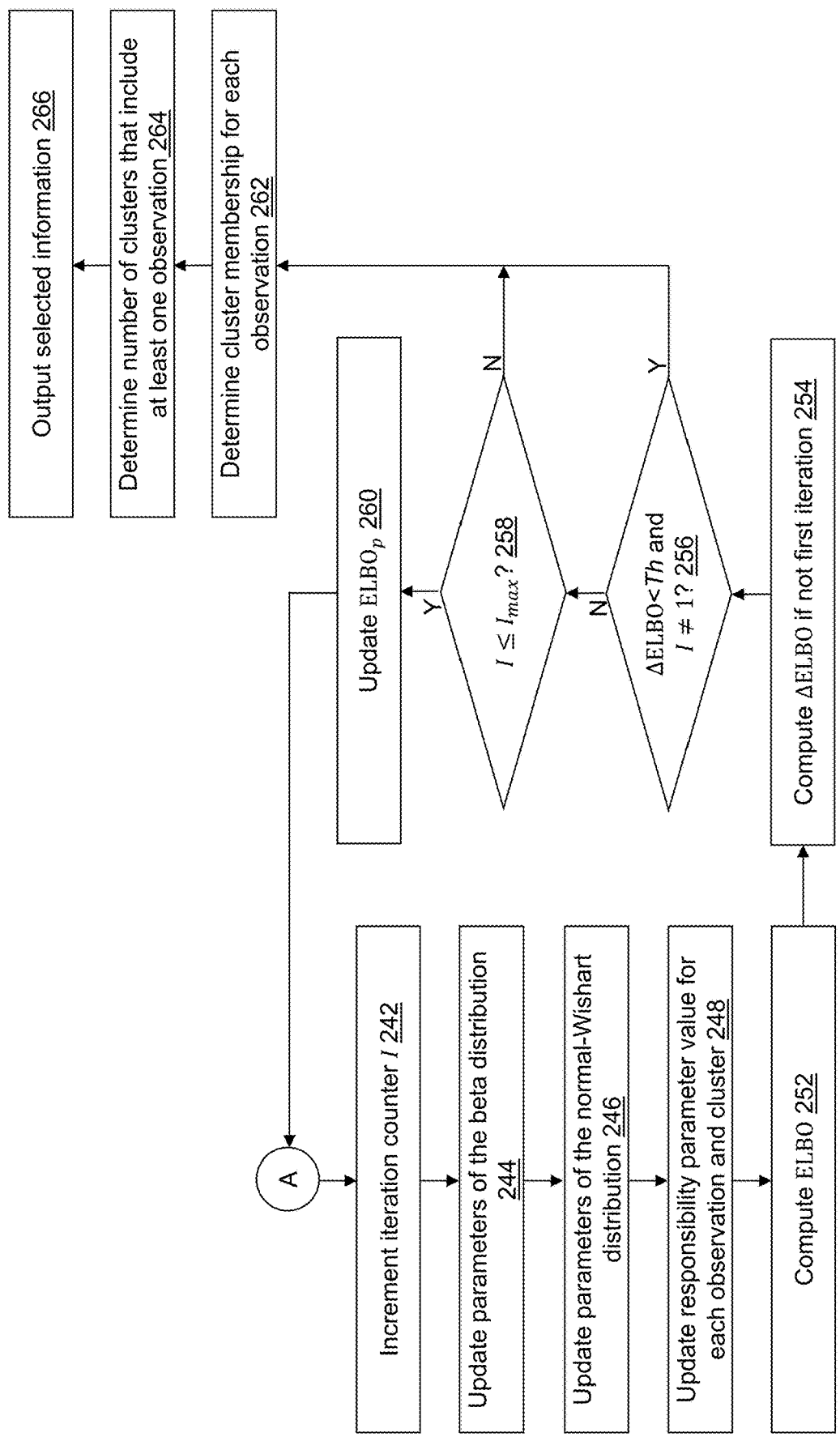

Referring to FIGS. 2A and 2B, example operations associated with clustering model training application 122 are described when input classified data 124 and input unclassified data 125 are stored on clustering model training device 100. Additional, fewer, or different operations may be performed depending on the embodiment of clustering model training application 122. The order of presentation of the operations of FIGS. 2A and 2B is not intended to be limiting. Some of the operations may not be performed in some embodiments. Although some of the operational flows are presented in sequence, the various operations may be performed in various repetitions and/or in other orders than those that are illustrated. For example, a user may execute clustering model training application 122, which causes presentation of a first user interface window, which may include a plurality of menus and selectors such as drop-down menus, buttons, text boxes, hyperlinks, etc. associated with clustering model training application 122 as understood by a person of skill in the art. The plurality of menus and selectors may be accessed in various orders. An indicator may indicate one or more user trainings from a user interface, one or more data entries into a data field of the user interface, one or more data items read from computer-readable medium 108 or otherwise defined with one or more default values, etc. that are received as an input by clustering model training application 122.

Referring to FIG. 2A, in an operation 200, a first indicator may be received that indicates input classified data 124 and input unclassified data 125. For example, the first indicator indicates a location and a name of input classified data 124 and input unclassified data 125 that may be stored together or separately though they are described herein as separate for simplicity. As an example, the first indicator may be received by classification model training application 122 after selection from a user interface window or after entry by a user into a user interface window. In an alternative embodiment, input classified data 124 and input unclassified data 125 may not be selectable. For example, a most recently created dataset may be used automatically.

In an operation 202, a second indicator may be received that indicates the plurality of variables to use in input classified data 124 and input unclassified data 125. For example, the second indicator may indicate one or more column numbers or one or more column names. As another option, all of the columns of input classified data 124 and of and input unclassified data 125 except a first or a last column may be assumed to be the plurality of variables. The plurality of variables are the variables that define each observation vector $x_i$. In an illustrative embodiment, each variable of the plurality of variables can be associated with an interval variable type. Any variable of the plurality of variables that has a standard deviation of zero indicates a constant variable in input classified data 124 and in and input unclassified data 125. Constant variables do not contribute to the clustering and are ignored. A number of the plurality of variables may be indicated by d.

In an operation 204, a third indicator of a mass parameter value $\alpha_0$ of the DP may be received. As an example, the third indicator may be received by clustering model training application 122 after selection from a user interface window or after entry by a user into a user interface window. In an alternative embodiment, the third indicator may not be received. For example, a default value may be stored, for example, in computer-readable medium 108 and used automatically. In another alternative embodiment, the value of the mass parameter value $\alpha_0$ may not be selectable. Instead, a fixed, predefined value may be used. For illustration, a default value of the mass parameter value $\alpha_0$ may be 1.0 though other values may be used.

In an operation 206, a fourth indicator of a covariance option may be received that indicates whether a full covariance matrix or a diagonal covariance matrix is computed. As an example, the fourth indicator may be received by clustering model training application 122 after selection from a user interface window or after entry by a user into a user interface window. In an alternative embodiment, the fourth indicator may not be received. For example, a default value may be stored, for example, in computer-readable medium 108 and used automatically. In another alternative embodiment, the value of the covariance option may not be selectable. Instead, a fixed, predefined value may be used. For illustration, a default value of the covariance option may be "diagonal" though other values may be used. When the plurality of variables are believed to be independent of each other, the Gaussian components of diagonal precision matrices can be used with the benefit of a much lower time complexity of O(d). When the covariance option indicates the diagonal covariance matrix is used, the nonzero elements of the precision matrices are located only along the diagonal:

$$\Lambda_k = \text{diag}(\lambda_{k,1}, \lambda_{k,2}, \ldots, \lambda_{k,d}), k=1,2,\ldots,K_{max}$$

where d is the number of variables of the plurality of variables.

In an operation 208, a fifth indicator of a maximum number of iterations $I_{max}$ may be received. As an example, the fifth indicator may be received by clustering model training application 122 after selection from a user interface window or after entry by a user into a user interface window. In an alternative embodiment, the fifth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 100 though other values may be used.

In an operation 210, a sixth indicator of a convergence threshold value Th may be received. As an example, the sixth indicator may be received by clustering model training application 122 after selection from a user interface window or after entry by a user into a user interface window. In an alternative embodiment, the sixth indicator may not be received. For example, a default value may be stored, for example, in computer-readable medium 108 and used automatically. In another alternative embodiment, the value of the convergence threshold value Th may not be selectable. Instead, a fixed, predefined value may be used. For illustration, a default value of the convergence threshold value Th may be 0.01 though other values may be used.

In an operation 212, a seventh indicator of a maximum number of clusters to consider $K_{max}$ may be received. As an example, the seventh indicator may be received by clustering model training application 122 after selection from a user interface window or after entry by a user into a user interface window. In an alternative embodiment, the seventh indicator may not be received. For example, a default value may be stored, for example, in computer-readable medium 108 and used automatically. In another alternative embodiment, the value of the maximum number of clusters to consider $K_{max}$ may not be selectable. Instead, a fixed, predefined value may be used. For illustration, a default value of the maximum number of clusters to consider $K_{max}$ may be 100 though other values may be used.

In an operation 214, an eighth indicator of a first normal-Wishart distribution parameter $\beta_0$ may be received. As an example, the eighth indicator may be received by clustering model training application 122 after selection from a user interface window or after entry by a user into a user interface window. When the covariance option indicates the diagonal covariance option, the first normal-Wishart distribution parameter $\beta_0$ is a vector $\beta_{0,j}$ j=1, 2, . . . , d such that the first normal-Wishart distribution parameter vector $\beta_0$ has a value defined for each variable of the plurality of variables. When the covariance option does not indicate the diagonal covariance option, the first normal-Wishart distribution parameter $\beta_0$ is a scalar value. The first normal-Wishart distribution parameter $\beta_0$ may be referred to as a concentration parameter of the normal-Wishart distribution. For illustration, a first normal-Wishart distribution parameter value $\beta_{0,j}$, $\beta=1, 2, \ldots, d$ may be defined independently for each variable of the plurality of variables. In an alternative embodiment, the eighth indicator may not be received. For example, a default vector or value may be stored, for example, in computer-readable medium 108 and used automatically. In another alternative embodiment, value(s) for the first normal-Wishart distribution parameter $\beta_0$ may not be selectable. Instead, a fixed, predefined vector or value may be used. For illustration, a default vector for the first normal-Wishart distribution parameter vector $\beta_{0,j}$ may be initialized to a 1.0 vector, and a default value for the first normal-Wishart distribution parameter value $\beta_0$ may be one though other values may be used.

In an operation 216, a ninth indicator of a second normal-Wishart distribution parameter vector $v_0$ may be received. As an example, the ninth indicator may be received by clustering model training application 122 after selection from a user interface window or after entry by a user into a user interface window. When the covariance option indicates the diagonal covariance option, the second normal-Wishart distribution parameter $v_0$ is a vector $v_{0,j}$, j=1, 2, . . . , d such that the second normal-Wishart distribution parameter vector $v_0$ has a value defined for each variable of the plurality of variables. When the covariance option does not indicate the diagonal covariance option, the second normal-Wishart distribution parameter $v_0$ is a scalar value. The second normal-Wishart distribution parameter v may be referred to as a degree of freedom parameter of the normal-Wishart distribution. For illustration, a second normal-Wishart distribution parameter value $v_{0,j}$, j=1, 2, . . . , d may be defined independently for each variable of the plurality of variables. In an alternative embodiment, the ninth indicator may not be received. For example, a default vector or value may be stored, for example, in computer-readable medium 108 and used automatically. In another alternative embodiment, value(s) for the second normal-Wishart distribution parameter $v_0$ may not be selectable. Instead, a fixed, predefined vector or value may be used. For illustration, a default vector for the second normal-Wishart distribution parameter vector $v_0$, may be initialized to a 1.0 vector and a default value for the second normal-Wishart distribution parameter value $v_0$ may be one though other values may be used.

In an operation 217, a tenth indicator of a labeling coefficient ρ may be received that tunes an effect between the classified (labeled) and unclassified (unlabeled) data. As an example, the tenth indicator may be received by clustering model training application 122 after selection from a user interface window or after entry by a user into a user interface window. In an alternative embodiment, the tenth indicator may not be received. For example, a default value may be stored, for example, in computer-readable medium 108 and used automatically. In another alternative embodiment, the value of the labeling coefficient ρ may not be selectable. Instead, a fixed, predefined value may be used. For illustration, a default value of the labeling coefficient ρ may be 0.5 though other values may be used.

In an operation 218, an unclassified mean vector $m^u$ may be computed using $$m_j^u = \frac{1}{n_u}\sum_{i=1}^{n_u} x_{i,j}, j=1, 2, \ldots, d,$$

and an unclassified standard deviation matrix $\sigma^u$ may be computed using $$\sigma_j^u = \sqrt{\frac{1}{n_u-1}\sum_{i=1}^{n_u}(x_i-m^u)\circ(x_i-m^u)}, j=1, 2, \ldots, d$$

for each variable of the plurality of variables included in input unclassified data 125 when the covariance option indicates the diagonal covariance option, where $x_{i,j}$ is a variable value for a $j^{th}$ variable of the $i^{th}$ observation vector $x_i$ read from input unclassified data 125. Otherwise, $$\sigma_j^u = \sqrt{\frac{1}{n_u - 1} \sum_{i=1}^{n_u} (x_i - m^u)(x_i - m^u)^\top}, j = 1, 2, \ldots, d.$$

A classified mean vector $m_k^c$ and a classified standard deviation matrix $\sigma^c$ further may be computed for each cluster using $$m_k^c = \frac{1}{n_k^c} \sum_{i=1}^{n_k^c} x_i, k = 1, 2, \ldots, K_{max}$$

and $$\sigma_k^c = \sqrt{\frac{1}{n_k^c - 1} \sum_{i=1}^{n_k^c} (x_i - m_k^c)(x_i - m_k^c)^\top}, k = 1, 2, \ldots, K_{max},$$

where x is the $i^{th}$ observation vector read from input classified data 124 included in the $k^{th}$ cluster, and $n_k^c$ is a number of observation vectors read from input classified data 124 that are included in the $k^{th}$ cluster.

In an operation 220, any variable of the plurality of variables that has a standard deviation value $\sigma_j^u=0$ is removed from the plurality of variables, and the number of variables d is reduced based on a number of variables removed.

In an operation 222, a third normal-Wishart distribution parameter vector $m_{0,k}$ is initialized for each cluster using $m_{0,k}=\rho m_k^c+(1-\rho)m^u$, k=1, 2, . . . , $K_{max}$.

In an operation 224, when the covariance option indicates the diagonal covariance option, a fourth normal-Wishart distribution parameter vector $\omega_{0,k}^{-1}$ is initialized or each cluster using $\Psi_{0,k}^{-1}=\rho\sigma_k^c+(1-\rho)\sigma^u$, k=1, 2, . . . , $K_{max}$.

In an operation 230, a responsibility parameter value $r_{i,k}$ is initialized for each observation vector read from input unclassified data 125 and for each cluster to define a responsibility vector $r_i$ for each observation vector with dimension $K_{max}$. For illustration, the responsibility parameter value $r_{i,k}$ may be initialized using draws from a multinomial distribution such that a probability that an $i^{th}$ observation vector read from input unclassified data 125 is assigned to each cluster k=1, 2, . . . , $K_{max}$ sums to one or $$\sum_{k=1}^{K_{max}} r_{i,k} = 1$$

for i=1, 2, . . . , $n_u$. As another illustration, the responsibility parameter value $r_{i,k}$ may be initialized using $r_{i,k}=1/K_{max}$, i=1, 2, . . . , $n_u$, and k=1, 2, . . . , $K_{max}$.

In an operation 232, an iteration counter I is initialized, for example, as I=0, and processing continues in an operation 242 shown referring to FIG. 2B.

Referring to FIG. 2B, in operation 242, the iteration counter I is incremented, for example, as I=I+1.

In an operation 244, parameters $\gamma_{k,1}$ and $\gamma_{k,2}$ of the beta distribution are updated for each cluster k=1, . . . , $K_{max}$. For example, $\gamma_{k,1}=1+q_k$, k=1, 2, . . . , $K_{max}$ and $$\gamma_{k,2} = \alpha_0 + \sum_{l=k+1}^{K_{max}} q_l, k = 1, 2, \ldots, K_{max},$$

where $$q_k = n_k^c + \sum_{i=1}^{n_u} r_{i,k}.$$

In an operation 246, parameters $m_k$, $\beta_k$, $\Psi_k$, $v_k$ of the normal-Wishart distribution are updated for each cluster k=1, 2, . . . , $K_{max}$. For example, the parameters $m_k$, $\beta_k$, $\Psi_k$, $v_k$ of the normal-Wishart distribution are updated for each cluster k=1, 2, . . . , $K_{max}$ using $$m_{k,j} = \frac{\beta_{0,j}m_{0,k,j} + u_{k,j}}{\beta_{0,j} + q_k},$$

$$\beta_{k,j} = \beta_{0,j} + q_k,$$

$$v_{k,j} = v_{0,j} + q_k, \text{ and}$$

$$\Psi_{k,j} = (\Psi_{0,j}^{-1} + \beta_{0,j}(m_{k,j} - m_{0,k,j})^2 + s_{k,j} - 2u_{k,j}m_{k,j} + q_k m_{k,j} m_{k,j})^{-1},$$

$$j = 1, 2, \ldots, d$$

when the covariance option indicates the diagonal covariance option, and using $$m_k = \frac{\beta_0 m_0 + u_k}{\beta_0 + q_k},$$

$$\beta_k = \beta_0 + q_k,$$

$$v_k = v_0 + q_k, \text{ and}$$

$$\Psi_k = (\Psi_0^{-1} + \beta_0(m_k - m_{0,k})(m_k - m_{0,k})^T + s_k - u_k m_k^\top - m_k u_k^\top + q_k m_k m_k^\top)^{-1}$$

otherwise, where $$u_{k,j} = \sum_{i=1}^{n_k^c} x_{i,j}^c + \sum_{i=1}^{n_u} r_{i,k} x_{i,j}^u, j = 1, 2, \ldots, d, k = 1, 2, \ldots, K_{max},$$

$$s_k = \sum_{i=1}^{n_k^c} x_i^c x_i^{c\top} + \sum_{i=1}^{n_u} r_{i,k} x_{i,j} x_{i,j}^\top, j = 1, 2, \ldots, d, k = 1, 2, \ldots,$$

$K_{max}$, $m_k$, $\beta_k$, $\Psi_k$, $v_k$ are the parameters of the normal-Wishart distribution of the $k^{th}$ cluster, $x_{i,j}$ is a variable value for a $j^{th}$ variable of the $i^{th}$ observation vector $x_i$ read from input unclassified data 125, and $x_i^c$ is the $i^{th}$ observation vector read from input classified data 124 and included in the $k^{th}$ cluster. $m_k$ is a d-dimensional vector, $\beta_k$ and $v_k$ are scalar values, and $\Psi_k$ is a d by d-dimensional matrix that may be a diagonal matrix.

In an operation 248, the responsibility parameter value $r_{i,k}$ is updated for each observation vector $x_i$, i=1, 2, . . . , $n_u$, and for each cluster k=1, 2, . . . , $K_{max}$ to update the responsibility vector $r_i$ for each observation vector read from input unclassified data 125. For example, $$r_{i,k} \propto \exp\left(\Gamma^{(1)}(\gamma_{k,1}) - \Gamma^{(1)}(\gamma_{k,1} + \gamma_{k,2}) + \sum_{l=1}^{k-1}(\Gamma^{(1)}(\gamma_{l,2}) - \Gamma^{(1)}(\gamma_{l,1} + \gamma_{l,2})) + \frac{1}{2}\sum_{j=1}^{d}\left(\Gamma^{(1)}\left(\frac{v_{k,j}}{2}\right) + \log|\Psi_{k,j}| - v_{k,j}\Psi_{k,j}(x_{i,j} - m_{k,j})^2 - \beta_{k,j}^{-1}\right)\right)$$

is used when the covariance option indicates the diagonal covariance option, and $$r_{i,k} \propto \exp\left(\Gamma^{(1)}(\gamma_{k,1}) - \Gamma^{(1)}(\gamma_{k,1} + \gamma_{k,2}) + \sum_{l=1}^{k-1}(\Gamma^{(1)}(\gamma_{l,2}) - \Gamma^{(1)}(\gamma_{l,1} + \gamma_{l,2})) + \frac{1}{2}\Gamma_d^{(1)}\left(\frac{v_k}{2}\right) + \frac{1}{2}\log|\Psi_k| - \frac{1}{2}(x_i - m_k)^T v_k \Psi_k (x_i - m_k) - \frac{d}{2}\beta_k^{-1}\right)$$

is used otherwise, where $\Gamma^{(1)}$ indicates a digamma function that is a derivative function of a logarithm of a gamma function, and $\delta_d^{(1)}$ indicates a d dimensional digamma function.

In an operation 252, ELBO is computed that is a sum of bounds for each variable of the plurality of variables. For example, ELBO is computed using $$ELBO = \sum_{k=1}^{K_{max}}(B_{\phi_k} + B_{\mu_k} + B_{\Lambda_k}) + \sum_{i=1}^{n_u}(B_{z_i} + B_{x_i})$$

where $$B_{\phi_k} = \log\Gamma(1+\alpha_0) - \log\Gamma(\alpha_0) +$$
$$(\alpha_0 - 1)(\Gamma^{(1)}(\gamma_{k,2}) - \Gamma^{(1)}(\gamma_{k,1} + \gamma_{k,2})) - \log\Gamma(\gamma_{k,1} + \gamma_{k,2}) +$$
$$\log\Gamma(\gamma_{k,1}) + \log\Gamma(\gamma_{k,2}) - (\gamma_{k,1} - 1)(\Gamma^{(1)}(\gamma_{k,1}) - \Gamma^{(1)}(\gamma_{k,1} + \gamma_{k,1})) -$$
$$(\gamma_{k,2} - 1)(\Gamma^{(1)}(\gamma_{k,2}) - \Gamma^{(1)}(\gamma_{k,1} + \gamma_{k,1})),$$

$$B_{\mu_k} = \sum_{j=1}^{d}\left(\frac{1}{2}\log\left(\frac{\beta_{0,j}}{\beta_{k,j}}\right) - \frac{1}{2}\frac{\beta_{0,j}}{\beta_{k,j}} + \frac{1}{2} - \frac{1}{2}\beta_{0,j}v_{k,j}\Psi_{k,j}(m_{k,j} - m_{0,j})^2\right),$$

$$B_{\Lambda_k} = \sum_{j=1}^{d}\left(-\frac{1}{2}(v_{k,j} - v_{0,j})\Gamma^{(1)}\left(\frac{v_{k,j}}{2}\right) - \frac{v_{k,j}\Psi_{k,j}}{2\Psi_{0,j}} + \frac{v_{k,j}}{2} - \frac{v_{0,j}}{2}\log\frac{|\Psi_{0,j}|}{|\Psi_{k,j}|} - \log\frac{\Gamma\left(\frac{v_{0,j}}{2}\right)}{\Gamma\left(\frac{v_{k,j}}{2}\right)}\right),$$

$$B_{z_i} = \sum_{k=1}^{K_{max}} r_{i,k}(\Gamma^{(1)}(\gamma_{k,1}) - \Gamma^{(1)}(\gamma_{k,1} + \gamma_{k,1})) +$$
$$\sum_{k=1}^{K_{max}}\left(\sum_{l=k+1}^{K_{max}} r_{i,l}\right)(\Gamma^{(1)}(\gamma_{k,2}) - \Gamma^{(1)}(\gamma_{k,1} + \gamma_{k,1})) - \sum_{k=1}^{K_{max}} r_{i,k}\log r_{i,k}, \text{ and}$$

$$B_{x_i} = \sum_{j=1}^{d}\sum_{k=1}^{K_{max}} r_{i,k}\left(-\frac{1}{2}\log\pi + \frac{1}{2}\Gamma_d^{(1)}\left(\frac{v_{k,j}}{2}\right) + \frac{1}{2}\log|\Psi_{k,j}| - \frac{1}{2}v_{k,j}\Psi_{k,j}(x_{i,j} - m_{k,j})^2 - \frac{1}{2}\beta_{k,j}^{-1}\right)$$

is used when the covariance option indicates the diagonal covariance option, and $$B_{\phi_k} = \log\Gamma(1+\alpha_0) - \log\Gamma(\alpha_0) +$$
$$(\alpha_0 - 1)(\Gamma^{(1)}(\gamma_{k,2}) - \Gamma^{(1)}(\gamma_{k,1} + \gamma_{k,2})) - \log\Gamma(\gamma_{k,1} + \gamma_{k,2}) +$$
$$\log\Gamma(\gamma_{k,1}) + \log\Gamma(\gamma_{k,2}) - (\gamma_{k,1} - 1)(\Gamma^{(1)}(\gamma_{k,1}) - \Gamma^{(1)}(\gamma_{k,1} + \gamma_{k,1})) -$$
$$(\gamma_{k,2} - 1)(\Gamma^{(1)}(\gamma_{k,2}) - \Gamma^{(1)}(\gamma_{k,1} + \gamma_{k,1})),$$

$$B_{\mu_k} = \frac{d}{2}\log\left(\frac{\beta_0}{\beta_k}\right) - \frac{d}{2}\frac{\beta_0}{\beta_k} + \frac{d}{2} - \frac{1}{2}(m_k - m_0)^T\beta_0 v_k\Psi_k(m_k - m_0),$$

$$B_{\Lambda_k} = -\frac{1}{2}(v_k - v_0)\Gamma_d^{(1)}\left(\frac{v_k}{2}\right) - \left(\frac{v_k}{2}\right)\text{tr}(\Psi_0^{-1}\Psi_k) + \frac{dv_k}{2} - \frac{v_0}{2}\log\frac{|\Psi_0|}{|\Psi_k|} - \log\frac{\Gamma_d\left(\frac{v_0}{2}\right)}{\Gamma_d\left(\frac{v_k}{2}\right)},$$

$$B_{z_i} = \sum_{k=1}^{K_{max}} r_{i,k}(\Gamma^{(1)}(\gamma_{k,1}) - \Gamma^{(1)}(\gamma_{k,1} + \gamma_{k,1})) +$$
$$\sum_{k=1}^{K_{max}}\left(\sum_{l=k+1}^{K_{max}} r_{i,l}\right)(\Gamma^{(1)}(\gamma_{k,2}) - \Gamma^{(1)}(\gamma_{k,1} + \gamma_{k,1})) - \sum_{k=1}^{K_{max}} r_{i,k}\log r_{i,k}, \text{ and}$$

$$B_{x_i} = \sum_{k=1}^{K_{max}} r_{i,k}\left(-\frac{d}{2}\log\pi + \frac{1}{2}\Gamma_d^{(1)}\left(\frac{v_k}{2}\right) + \frac{1}{2}\log|\Psi_k| - \frac{1}{2}(x_i - m_k)^T v_k\Psi_k(x_i - m_k) - \frac{d}{2}\beta_k^{-1}\right)$$

is used otherwise.

In an operation 254, $\Delta$ELBO is computed using $\Delta$ELBO=|ELBO−ELBO$_p$| unless the iteration counter I=1. When the iteration counter I=1, a value for ELBO$_p$ has not been determined.

In an operation 256, a determination is made concerning whether $\Delta$ELBO<Th. If $\Delta$ELBO<Th and I≠1, processing continues in an operation 262 to indicate convergence has been achieved. If $\Delta$ELBO≥Th or I=1, processing continues in an operation 258.

In operation 258, a determination is made concerning whether I≤$I_{max}$. If I>$I_{max}$, processing continues in operation 262 to indicate convergence has been stopped. If I≤$I_{max}$, processing continues in an operation 260.

In operation 260, ELBO$_p$ is updated for a next iteration using ELBO$_p$=ELBO, and processing continues in operation 242 to update the VB gradient ascent step parameters.

In operation 262, a cluster membership index $z_i$ is determined using a multinomial distribution with the updated responsibility parameter value $r_{i,k}$ as the parameter value for each observation vector $x_i$, i=1, 2, . . . , $n_u$, read from input unclassified data 125. The cluster membership index $z_i$ indicates a cluster to which each observation vector $x_i$ read from input unclassified data 125 is assigned. For example, a random draw is made and compared to each probability value defined for each cluster k=1, 2, . . . , $K_{max}$ by $r_{i,k}$ to determine the cluster membership index $z_i$ that is one of k=1, 2, . . . , $K_{max}$.

In an operation 264, a number of clusters $K_n$ that include at least one observation is determined from $K_{max}$ based on the cluster membership index $z_i$ for each observation vector $x_i$, i=1, 2, . . . , $n_u$, read from input unclassified data 125. For example, $K_n$ is a number of unique cluster membership indices to which any observation vector is assigned. The number of clusters $K_n$ may be greater than a number of the unique labeled values defined in input classified data 124.

In operation 266, the ELBO, $m_k$, and $\Psi_k$ computed for each cluster k=1, 2, ..., $K_n$ of the number of clusters $K_n$ are output. Additional information that may be output are a number of observations in each cluster, a neighbor cluster of each cluster whose Gaussian mean is closest to the Gaussian mean of the cluster, the cluster membership index $z_i$ for each observation, the responsibility parameter value $r_{i,k}$ for each observation and each cluster, a clustering model description so that the model can be used for data clustering, etc. For example, the clustering model description may be output to clustering model description 126, and the cluster membership index $z_i$ for each observation and the responsibility parameter value $r_{i,k}$ for each observation and each cluster may be output to clustering model output data 128. The clustering model description may include the clustering algorithm indicating the Gaussian mixture model, the inference method indicating variational Bayesian, $K_n$, the mass parameter value $\alpha_0$, the covariance option, the maximum number of iterations $I_{max}$, the convergence threshold value Th, ELBO, $m_k$, and $\Psi_k$ computed for each cluster k=1, 2, ..., $K_n$ of the number of clusters $K_n$, etc.

The time complexity of updating the cluster parameters using the full covariance option is dominated by the update of $\Psi_k$ in operation 246, which is $O(d^3k)$, and the time complexity of updating $r_i$ in operation 248, which is $O(nd^3k)$. The time complexity of updating the cluster parameters using the diagonal covariance option is also dominated by the update of $\Psi_k$ in operation 246, which is $O(dk)$, and the time complexity of updating $r_i$ in operation 248, which is $O(ndk)$. So the overall time complexity of one VB iteration using the diagonal covariance option is $O(ndk)$, which provides an $O(d^2)$ speedup compared to using the full covariance option. Using the diagonal covariance option also yields better prediction accuracy because the diagonal mode is more expressive when the variables are truly independent.

Figure 3:
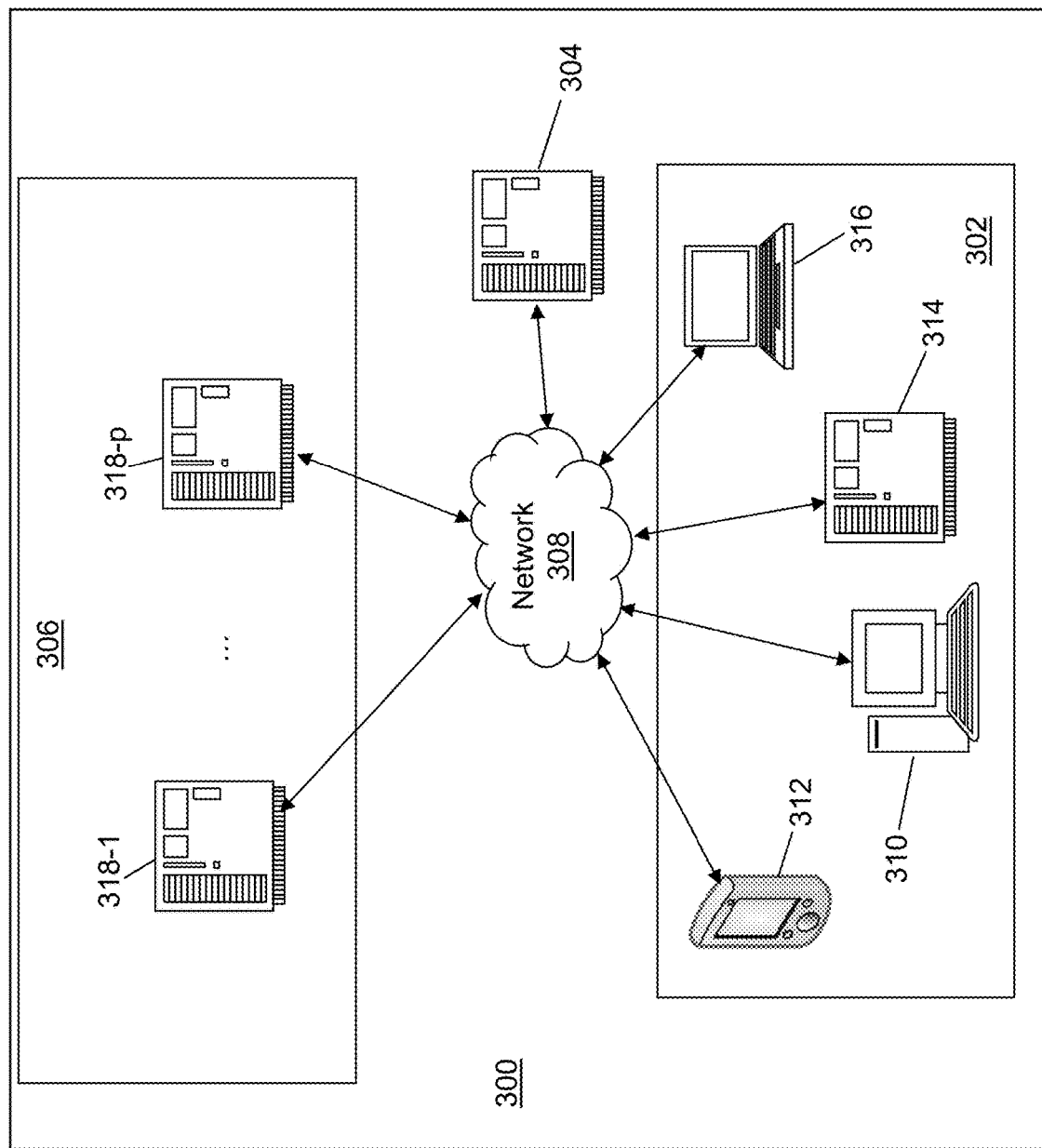
FIG. 3 depicts a block diagram of a clustering model training system in accordance with an illustrative embodiment.

Referring to FIG. 3, a block diagram of a clustering model training system 300 is shown in accordance with an illustrative embodiment. In an illustrative embodiment, clustering model training system 300 may include a user system 302, a controller device 304, a worker system 306, and a network 308. Each of user system 302, controller device 304, and worker system 306 may be composed of zero or more discrete computing devices in communication through network 308. User system 302 and controller device 304 may be integrated into a single computing device capable of executing multiple threads with no worker devices of worker system 306.

Network 308 may include one or more networks of the same or different types. Network 308 can be any type of wired and/or wireless public or private network including a cellular network, a local area network, a wide area network such as the Internet or the World Wide Web, etc. Network 308 further may comprise sub-networks and consist of any number of communication devices.

The one or more computing devices of user system 302 may include computing devices of any form factor such as a desktop 310, a smart phone 312, a server computer 314, a laptop 316, a personal digital assistant, an integrated messaging device, a tablet computer, etc. User system 302 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 302 may send and receive signals through network 308 to/from another of the one or more computing devices of user system 302 and/or to/from controller device 304. The one or more computing devices of user system 302 may communicate using various transmission media that may be wired and/or wireless as understood by those skilled in the art. The one or more computing devices of user system 302 may be geographically dispersed from each other and/or co-located.

Figure 4:
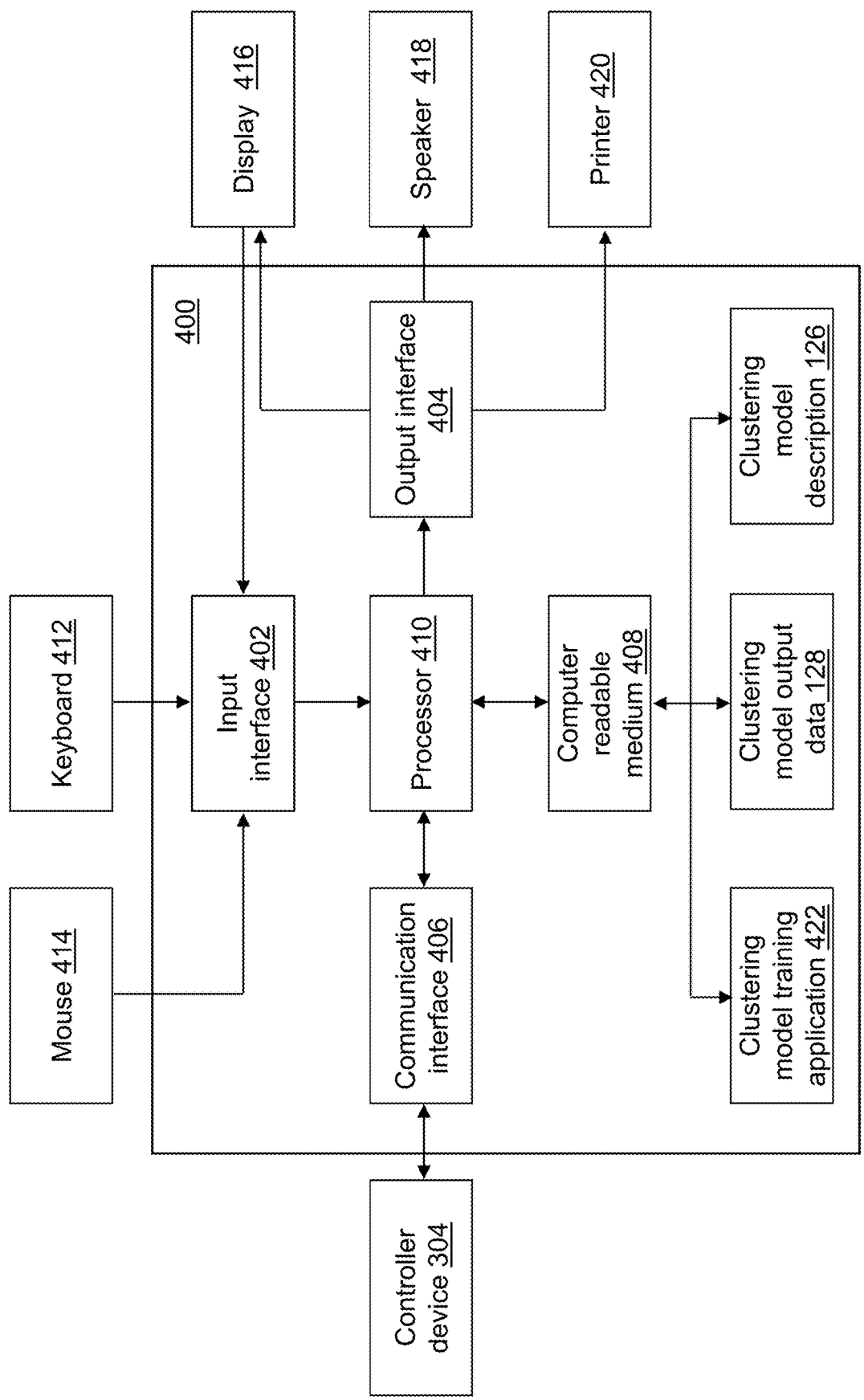
FIG. 4 depicts a block diagram of a user device of the clustering model training system of FIG. 3 in accordance with an illustrative embodiment.

For illustration, referring to FIG. 4, a block diagram of a user device 400 is shown in accordance with an example embodiment. User device 400 is an example computing device of user system 302. For example, each of desktop 310, smart phone 312, server computer 314, and laptop 316 may be an instance of user device 400. User device 400 may include a second input interface 402, a second output interface 404, a second communication interface 406, a second computer-readable medium 408, a second processor 410, a clustering model training application 422, clustering model description 126, and clustering model output data 128. Each computing device of user system 302 may be executing clustering model training application 422 of the same or different type.

Referring again to FIG. 3, controller device 304 can include any form factor of computing device. For illustration, FIG. 3 represents controller device 304 as a server computer. Controller device 304 may send and receive signals through network 308 to/from user system 302 and/or to/from worker system 306. Controller device 304 may communicate using various transmission media that may be wired and/or wireless as understood by those skilled in the art. Controller device 304 may be implemented on a plurality of computing devices of the same or different type. Clustering model training system 300 further may include a plurality of controller devices.

Figure 5:
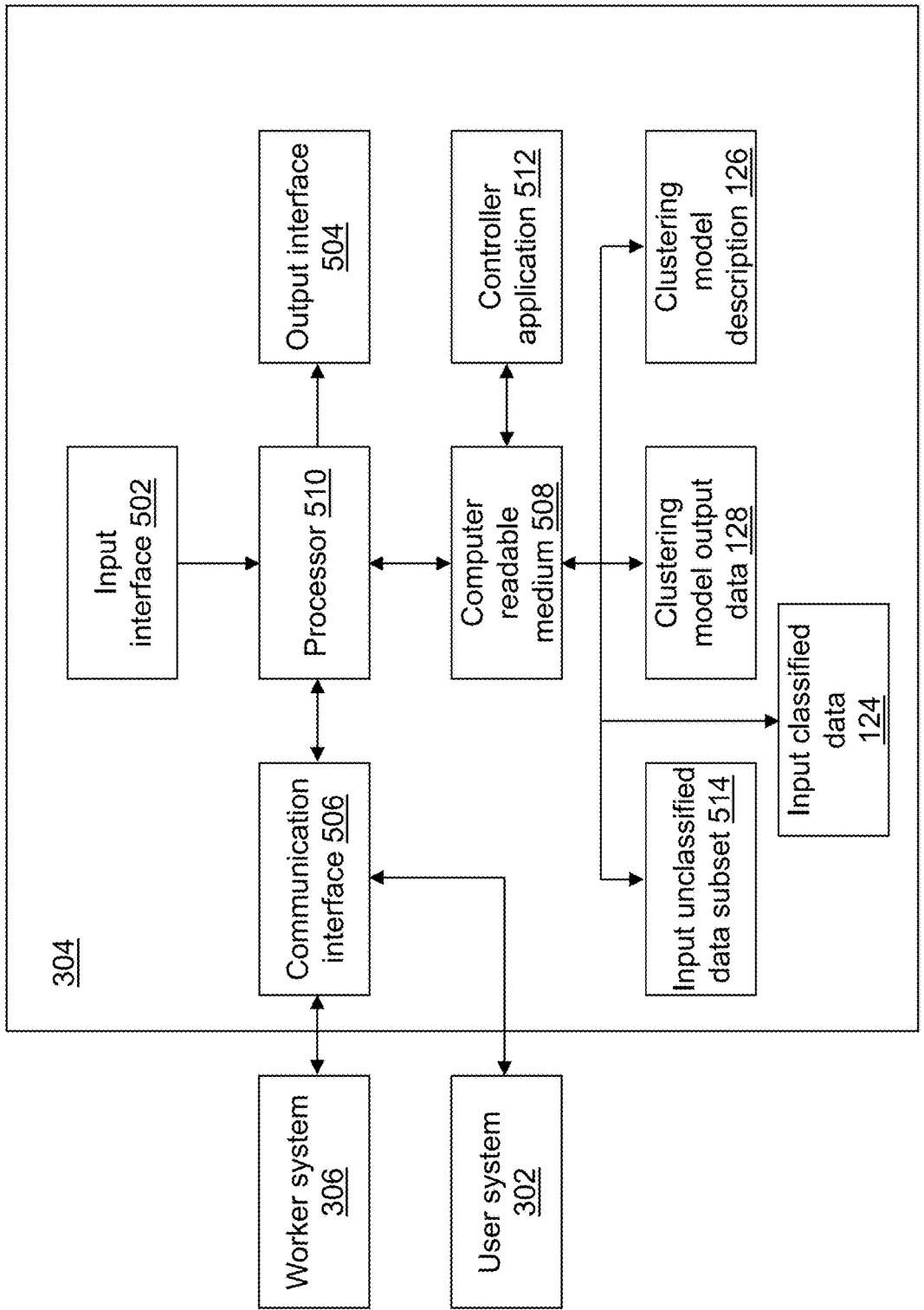
FIG. 5 depicts a block diagram of a controller device of the clustering model training system of FIG. 3 in accordance with an illustrative embodiment.

For illustration, referring to FIG. 5, a block diagram of controller device 304 is shown in accordance with an illustrative embodiment. Controller device 304 may include a third input interface 502, a third output interface 504, a third communication interface 506, a third computer-readable medium 508, a third processor 510, a controller application 512, an input unclassified data subset 514, input classified data 124, clustering model output data 128, and clustering model description 126. Controller device 304 may execute controller application 512 that creates clustering model description 126.

Referring again to FIG. 3, the one or more computing devices of worker system 306 may include computers of any form factor such as a desktop, a server, a laptop, etc. For example, in the illustrative embodiment, worker system 306 includes a first server computer 318-$a$, ..., and an nth server computer 318-$n$. Each server computer may support use of a plurality of threads. The computing devices of worker system 306 may send and receive signals through network 308 to/from controller device 304 and/or to/from another computing device of worker system 306. The one or more computing devices of worker system 306 may be geographically dispersed from each other and/or co-located. The one or more computing devices of worker system 306 may communicate using various transmission media that may be wired and/or wireless as understood by those skilled in the art.

Figure 6:
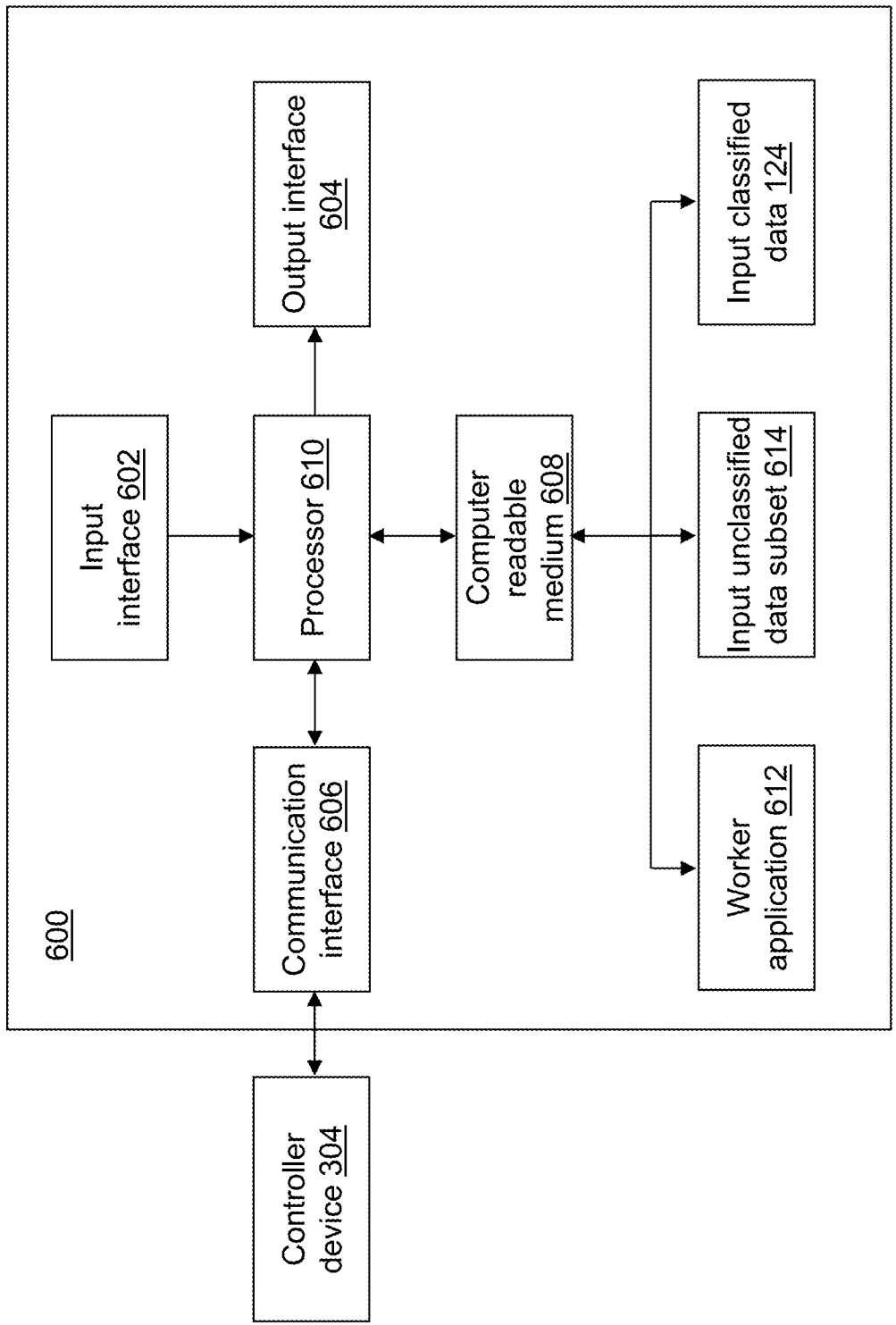
FIG. 6 depicts a block diagram of a worker-thread device of the clustering model training system of FIG. 3 in accordance with an illustrative embodiment.

For illustration, referring to FIG. 6, a block diagram of a worker device 600 is shown in accordance with an example embodiment. Worker device 600 is an example computing device of worker system 306. For example, each of first server computer 318-$a$, ..., and nth server computer 318-$n$ may be an instance of worker device 600. Worker device 600 may include a fourth input interface 602, a fourth output interface 604, a fourth communication interface 606, a fourth computer-readable medium 608, a fourth processor 610, a worker application 612, an input unclassified data subset 614, and input classified data 124. Input unclassified data 125 may be stored in input unclassified data subset 614 distributed across each worker device 600 of worker system 306. A portion of input unclassified data 125 may also be stored in input unclassified data subset 514 stored on controller device 304. A copy of input classified data 124 may be distributed to each worker device 600 of worker system 306.

Referring again to FIG. 4, each user device 400 of user system 302 may include the same or different components and combinations of components. Fewer, different, and additional components may be incorporated into user device 400. Second input interface 402 provides the same or similar functionality as that described with reference to input interface 102 of clustering model training device 100 though referring to user device 400. Second output interface 404 provides the same or similar functionality as that described with reference to output interface 104 of clustering model training device 100 though referring to user device 400. Second communication interface 406 provides the same or similar functionality as that described with reference to communication interface 106 of clustering model training device 100 though referring to user device 400. Data and messages may be transferred between controller device 304 and user device 400 using second communication interface 406. Second computer-readable medium 408 provides the same or similar functionality as that described with reference to computer-readable medium 108 of clustering model training device 100 though referring to user device 400. Second processor 410 provides the same or similar functionality as that described with reference to processor 110 of clustering model training device 100 though referring to user device 400.

Clustering model training application 422 performs operations associated with training a clustering model. The operations may be implemented using hardware, firmware, software, or any combination of these methods. Referring to the example embodiment of FIG. 4, clustering model training application 422 is implemented in software (comprised of computer-readable and/or computer-executable instructions) stored in second computer-readable medium 408 and accessible by second processor 410 for execution of the instructions that embody the operations of clustering model training application 422. Clustering model training application 422 may be written using one or more programming languages, assembly languages, scripting languages, etc.

Clustering model training application 422 may be implemented as a Web application. Clustering model training application 422 may be integrated with other analytic tools. As an example, clustering model training application 422 may be part of an integrated data analytics software application and/or software architecture such as that offered by SAS Institute Inc. of Cary, N.C., USA. For example, clustering model training application 422 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, clustering model training application 422 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS@Visual Data Mining and Machine Learning, SAS® Visual Analytics, SAS® Viya™ SAS In-Memory Statistics for Hadoop®, all of which are developed and provided by SAS Institute Inc. of Cary, N.C., USA. Data mining is applicable in a wide variety of industries.

Referring to FIG. 5, fewer, different, or additional components may be incorporated into controller device 304. Third input interface 502 provides the same or similar functionality as that described with reference to input interface 102 of clustering model training device 100 though referring to controller device 304. Third output interface 504 provides the same or similar functionality as that described with reference to output interface 104 of clustering model training device 100 though referring to controller device 304. Third communication interface 506 provides the same or similar functionality as that described with reference to communication interface 106 of clustering model training device 100 though referring to controller device 304. Data and messages may be transferred between controller device 304 and user device 400 and/or worker device 600 using third communication interface 506. Third computer-readable medium 508 provides the same or similar functionality as that described with reference to computer-readable medium 108 of clustering model training device 100 though referring to controller device 304. Third processor 510 provides the same or similar functionality as that described with reference to processor 110 of clustering model training device 100 though referring to controller device 304.

Controller application 512 performs operations associated with training a clustering model based on inputs provided from user device 400 optionally using the computing devices of worker system 306. The operations may be implemented using hardware, firmware, software, or any combination of these methods. Referring to the example embodiment of FIG. 5, controller application 512 is implemented in software (comprised of computer-readable and/or computer-executable instructions) stored in third computer-readable medium 508 and accessible by third processor 510 for execution of the instructions that embody the operations of controller application 512. Controller application 512 may be written using one or more programming languages, assembly languages, scripting languages, etc. Controller application 512 may be implemented as a Web application.

Controller application 512 may be integrated with other analytic tools. As an example, controller application 512 may be part of an integrated data analytics software application and/or software architecture such as that offered by SAS Institute Inc. of Cary, N.C., USA. For example, controller application 512 may be part of SAS® Enterprise Miner™ developed and provided by SAS Institute Inc. of Cary, N.C., USA. Merely for further illustration, controller application 512 may be implemented using or integrated with one or more SAS software tools such as Base SAS, SAS/STAT®, SAS® High Performance Analytics Server, SAS@LASR™, SAS® In-Database Products, SAS® Scalable Performance Data Engine, SAS/OR®, SAS/ETS®, SAS® Visual Data Mining and Machine Learning, SAS@Visual Analytics, SAS® Viya™, SAS In-Memory Statistics for Hadoop®, all of which are developed and provided by SAS Institute Inc. of Cary, N.C., USA.

Referring to FIG. 6, fewer, different, and additional components may be incorporated into worker device 600. Each worker device 600 of worker system 306 may include the same or different components or combination of components. Fourth input interface 602 provides the same or similar functionality as that described with reference to input interface 102 of clustering model training device 100 though referring to worker device 600. Fourth output interface 604 provides the same or similar functionality as that described with reference to output interface 104 of clustering model training device 100 though referring to worker device 600. Fourth communication interface 606 provides the same or similar functionality as that described with reference to communication interface 106 of clustering model training device 100 though referring to worker device 600. Data and messages may be transferred between controller device 304 and worker device 600 using fourth communication interface 606. Fourth computer-readable medium 608 provides the same or similar functionality as that described with reference to computer-readable medium 108 of clustering model training device 100 though referring to worker device 600. Fourth processor 610 provides the same or similar functionality as that described with reference to processor 110 of clustering model training device 100 though referring to worker device 600.

Worker application 612 may be integrated with other analytic tools. As an example, worker application 612 may be part of an integrated data analytics software application and/or software architecture such as that offered by SAS Institute Inc. of Cary, N.C., USA. For example, worker application 612 may be part of SAS® Enterprise Miner™ developed and provided by SAS Institute Inc. of Cary, N.C., USA. Merely for further illustration, worker application 612 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA.

Clustering model training application 422, controller application 512, and worker application 612 may be the same or different applications that are integrated in various manners to train a clustering model using input classified data 124 distributed to controller device 304 and/or worker system 306 and input unclassified data 125 distributed across controller device 304 and/or worker system 306 into input unclassified data subset 514 and/or input unclassified data subset 614, respectively.

Figure 7:
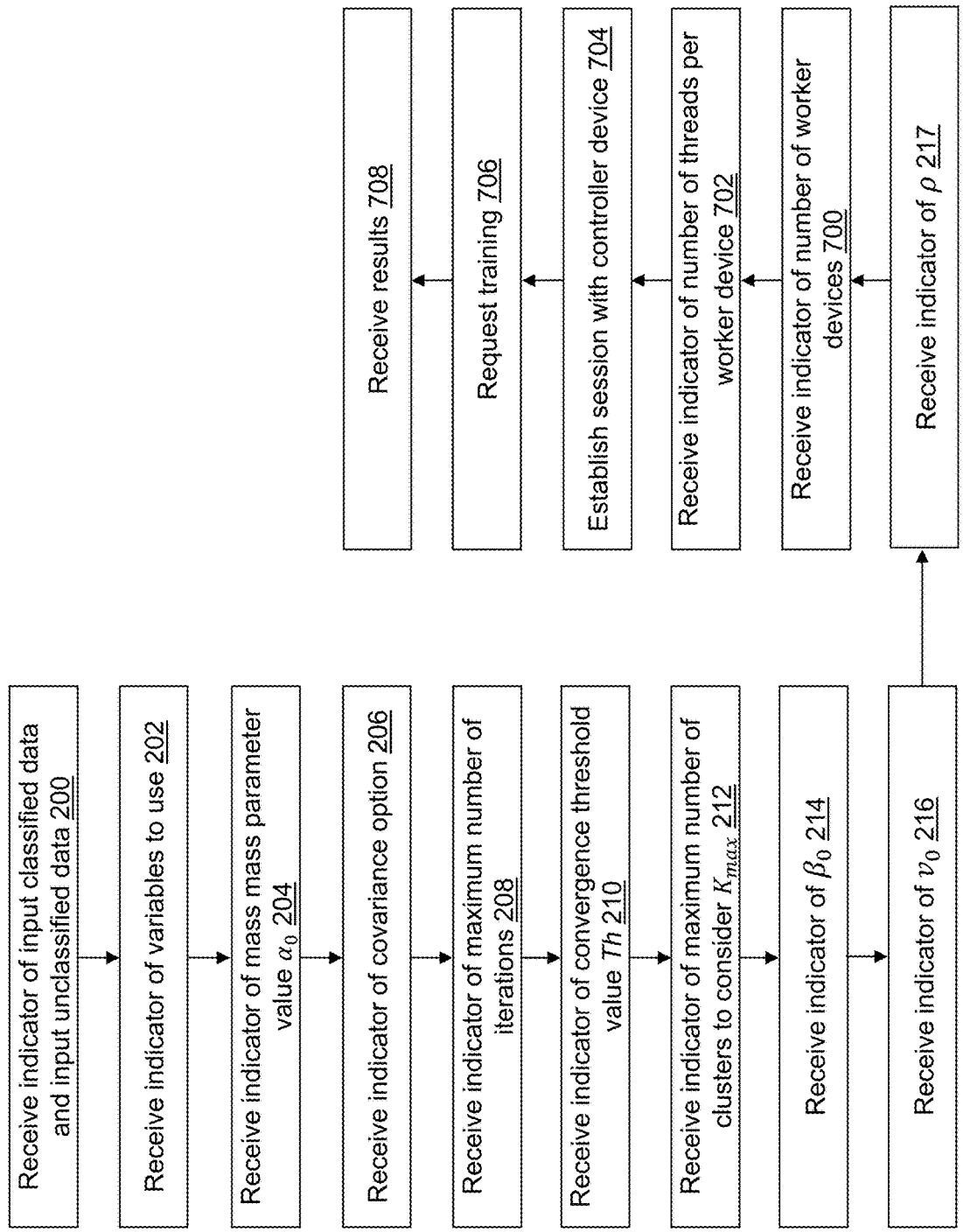
FIG. 7 depicts a flow diagram illustrating examples of operations performed by the user device of FIG. 4 in accordance with an illustrative embodiment.

Referring to FIG. 7, example operations associated with clustering model training application 422 are described. Additional, fewer, or different operations may be performed depending on the embodiment. The order of presentation of the operations of FIG. 7 is not intended to be limiting. A user can interact with one or more user interface windows presented to the user in a display under control of clustering model training application 422 independently or through a browser application in an order selectable by the user. Although some of the operational flows are presented in sequence, the various operations may be performed in various repetitions, concurrently, and/or in other orders than those that are illustrated. For example, a user may execute clustering model training application 422, which causes presentation of a first user interface window, which may include a plurality of menus and selectors such as drop down menus, buttons, text boxes, hyperlinks, etc. associated with clustering model training application 422 as understood by a person of skill in the art. As further understood by a person of skill in the art, various operations may be performed in parallel, for example, using a plurality of threads or a plurality of computing devices such as a grid or a cloud of computing devices.

Similar to clustering model training application 122, clustering model training application 422 may perform one or more of operations 200 to 217 to define parameters for execution of clustering model training application 422. In operation 200 performed by user device 400, the indicator of input unclassified data 125 may indicate input unclassified data subset 514 and/or input unclassified data subset 614.

In an operation 700, an eleventh indicator may be received that indicates the number of computing devices W of worker system 306. In an alternative embodiment, the eleventh indicator may not be received. For example, a default value may be stored, for example, in computer-readable medium 408 and used automatically. In another alternative embodiment, W may not be selectable. Instead, a fixed, predefined value may be used. The value further may be automatically determined based on a number of computing devices connected to controller device 304.

In an operation 702, a twelfth indicator may be received that indicates a number of threads T of each computing device of worker system 306 and/or of controller device 304. In an alternative embodiment, the twelfth indicator may not be received. For example, a default value may be stored, for example, in computer-readable medium 408 and used automatically. In another alternative embodiment, T may not be selectable. Instead, a fixed, predefined value may be used. The value further may be automatically determined based on a number of CPUs available in each computing device of worker system 306 and/or of controller device 304.

When W=0 and T=1, controller device 304 is performing the operations of FIGS. 2A and 2B. When W=0, controller device 304 may operate in single-machine mode meaning multithreaded operation using the number of threads T concurrently to take advantage of parallel execution on multiple processing units. When W=0, input unclassified data 125 is distributed into a plurality of input unclassified data subsets with each thread of the plurality of threads allocated a single input unclassified data subset 514. When W>0, controller device 304 may be a grid host.

In an operation 704, a session is established with controller device 304 when user device 400 and controller device 304 are not integrated. The session may further be established with controller device 304 and each worker device 600 when W>0. User device 400 accepts commands from a user and relays instructions to controller device 304 when user device 400 and controller device 304 are not integrated. When W>0, controller device 304 establishes a communication network with the worker devices of worker system 306, sending instructions to the worker devices of worker system 306, collecting and aggregating the results of computations from the worker devices of worker system 306, and communicating final results to user device 400.

In an operation 706, training of the clustering model is requested. When controller device 304 and user device 400 are integrated in the same computing device, training is initiated as described further referring to FIGS. 8A and 8B. The request may include zero or more of the values defined for the parameters indicated in operations 200 to 217 or zero or more of the values may be stored in a memory location known to controller device 304 when controller device 304 and user device 400 are not integrated in the same computing device.

In an operation 708, some or all of the selected information output in operation 266 may be received from controller device 304 when controller device 304 and user device 400 are not integrated in the same computing device. As another example, an indicator may be received that indicates that the training process is complete. For example, one or more output tables may be presented on second display 416 when the training process is complete. As another option, second display 416 may present a statement indicating that the training process is complete. The user can access the output tables in a predefined location.

Figure 8A:
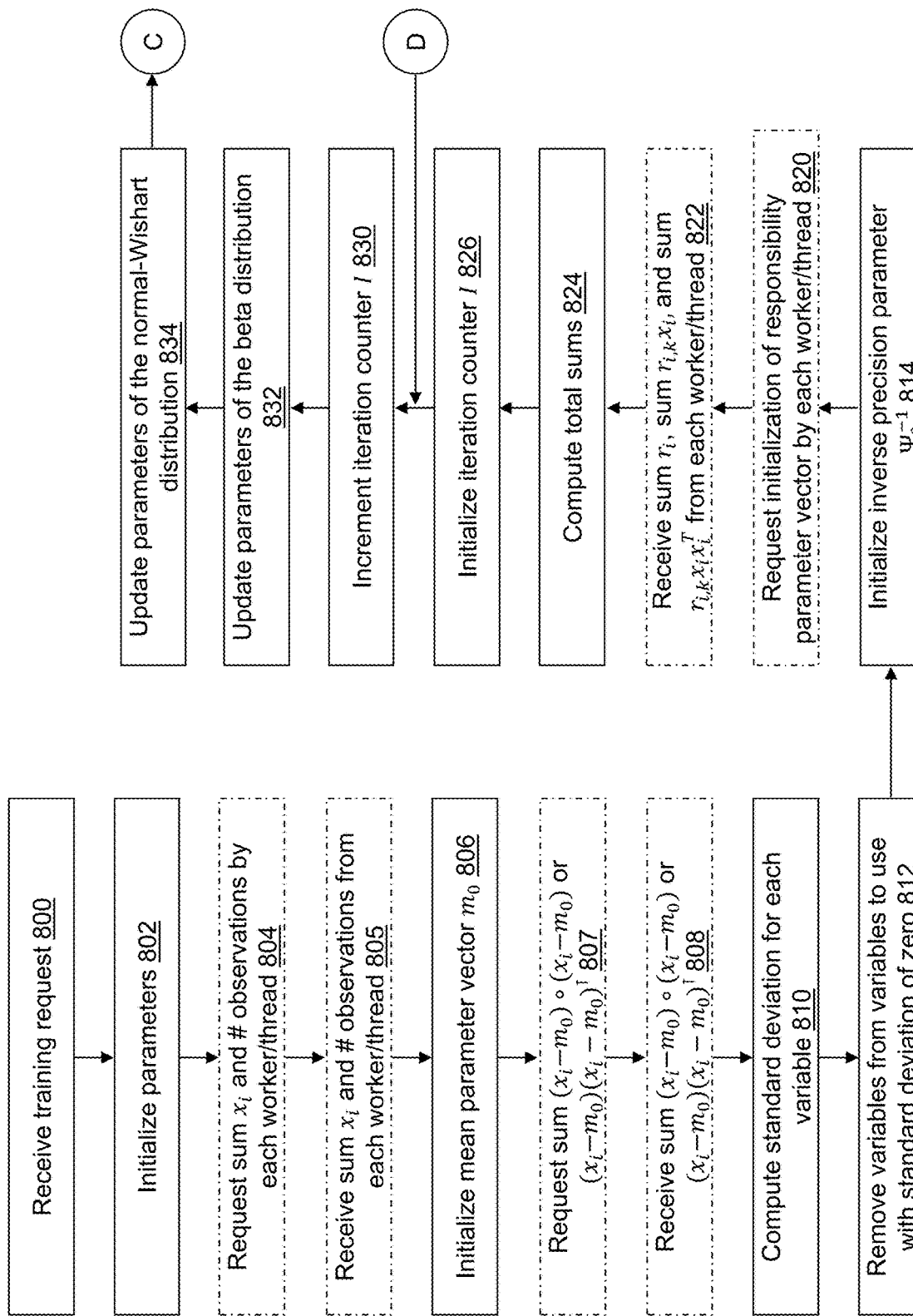
FIGS. 8A and 8B depicts a flow diagram illustrating examples of operations performed by the controller device of FIG. 5 in accordance with an illustrative embodiment.
Figure 8B:
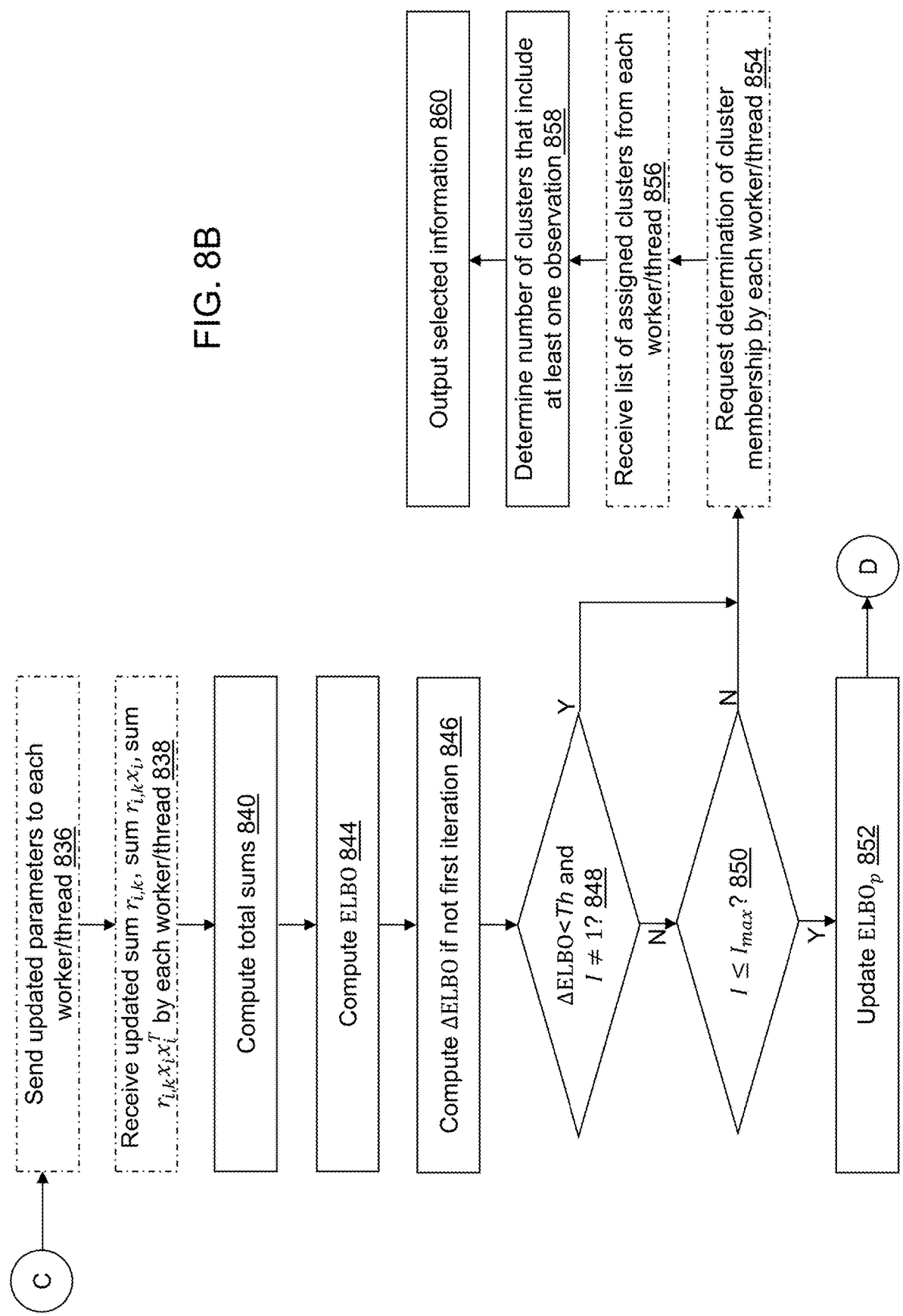

Referring to FIGS. 8A and 8B, example operations associated with controller application 512 are described. Additional, fewer, or different operations may be performed depending on the embodiment. The order of presentation of the operations of FIGS. 8A and 8B is not intended to be limiting. Again, controller application 512 and clustering model training application 422 may be integrated or be the same applications so that the operations of FIG. 7 and FIGS. 8A and 8B are merged.

In an operation 800, the training request may be received from user device 400 or directly from the user of user device 400 when controller device 304 and user device 400 are integrated in the same computing device.

In an operation 802, values for the parameters indicated in operations 200 to 217 may be received from user device 400 or directly from the user of user device 400 when integrated or read from a known storage location.

In an operation 804, a request is sent to each thread of each worker device 400 of worker system 306 and/or to each thread of controller device 304. The request indicates that each worker/thread compute $$\sum_{i=1}^{n_{w,t}} x_i$$

and determine a number of observation vectors $n_{w,t}$ for input unclassified data subset 514 allocated to each thread of controller device 304 and/or input unclassified data subset 614 distributed to each worker device 400 and allocated to each thread of worker device 400 where the subscript w indicates an index to the respective worker device 400, and t indicates an index to the respective thread of the respective worker device 400. When controller device 304 is included as a worker device, W is incremented using W=W+1 to indicate that the values computed by each thread of controller device 304 on each input unclassified data subset 514 are included in the summations below. The request is sent by a controller thread of controller device 304.

In an operation 805, the $$\sum_{i=1}^{n_{w,t}} x_i$$

and determined $n_{w,t}$ are received from each thread of each worker device 400 of worker system 306 and/or from each thread of controller device 304. The values are received by the controller thread of controller device 304. The $$\sum_{i=1}^{n_{w,t}} x_i$$

received from each worker/thread may be denoted as $m_{w,t}^u$, where the subscript w indicates an index to the respective worker device 400 and/or controller device 304, the subscript t indicates an index to the respective thread of the respective worker device 400 and/or controller device 304, the superscript u indicates the unclassified data subsets, and $m_{w,t}^u$ is a vector with d values.

Similar to operation 222, in an operation 806, the third normal-Wishart distribution parameter vector $m_0$ is initialized using $m_{0,k} = \rho m_k^c + (1-\rho) m^u$, k=1, 2, ..., $K_{max}$, where $$m^u = \frac{1}{n_u} \sum_{w=1}^{W} \sum_{t=1}^{T} m_{w,t}, \ n_u = \sum_{w=1}^{W} \sum_{t=1}^{T} n_{w,t},$$

and $$m_k^c = \frac{1}{n_k^c} \sum_{i=1}^{n_k^c} x_i, k = 1, 2, \ldots, K_{max},$$

where $x_i$ is the $i^{th}$ observation vector read from input classified data 124 included in the $k^{th}$ cluster, and $n_k^c$ is a number of observation vectors read from input classified data 124 that are included in the $k^{th}$ cluster. $m_k^c$ may be computed by controller device 304 or any worker device 400 of worker system 306.

In an operation 807, a request is sent to each thread of each worker device 400 of worker system 306 and/or to each thread of controller device 304 that includes $m_0$. The request indicates that each worker/thread compute $$\sum_{i=1}^{n_{w,t}} (x_i - m_0) \circ (x_i - m_0)$$

when the covariance option indicates the diagonal covariance option, otherwise, the request indicates that each worker/thread compute $$\sum_{i=1}^{n_{w,t}} (x_i - m_0)(x_i - m_0)^T$$

for input unclassified data subset 514 allocated to each thread of controller device 304 and/or input unclassified data subset 614 distributed to each worker device 400 and allocated to each thread of worker device 400 where the subscript w indicates an index to the respective worker device 400, and t indicates an index to the respective thread of the respective worker device 400.

In an operation 808, $$\sum_{i=1}^{n_{w,t}} (x_i - m_0) \circ (x_i - m_0)$$

or $$\sum_{i=1}^{n_{w,t}} (x_i - m_0)(x_i - m_0)^T$$

is received from each thread of each worker device 400 of worker system 306 and/or from each thread of controller device 304. The values are received by the controller thread of controller device 304. The $$\sum_{i=1}^{n_{w,t}} (x_i - m_0) \circ (x_i - m_0)$$

or the $$\sum_{i=1}^{n_{w,t}} (x_i - m_0)(x_i - m_0)^T$$

received from each worker/thread may be denoted as $p_{w,t}^u$, where the subscript w indicates an index to the respective worker device 400 and/or controller device 304, t indicates an index to the respective thread of the respective worker device 400 and/or controller device 304, and $p_{w,t}^u$ is a vector with d values.

In an operation 810, a standard deviation matrix $\sigma^u$ may be computed using $$\sigma^u = \sqrt{\frac{p^u}{n_u - 1}},$$

where $$p^u = \sum_{w=1}^{W} \sum_{t=1}^{T} p_{w,t}^u.$$

A standard deviation matrix $\sigma^c$ may be computed using, $$\sigma_k^c = \sqrt{\frac{1}{n_k^c - 1} \sum_{i=1}^{n_k^c} (x_i - m_k^c)(x_i - m_k^c)^\top}, k = 1, 2, \ldots, K_{max},$$

where $x_i$ is the $i^{th}$ observation vector read from input classified data 124 included in the $k^{th}$ cluster, and $n_k^c$ is a number of observation vectors read from input classified data 124 that are included in the $k^{th}$ cluster.

Similar to operation 220, in an operation 812, any variable of the plurality of variables that has a standard deviation value of zero ($\sigma_j^u=0$) is removed from the plurality of variables, and the number of variables d is reduced based on a number of variables removed.

Similar to operation 224, in an operation 814, the fourth normal-Wishart distribution parameter vector $\Psi_0^{-1}$ is initialized using $\Psi_{0,k}^{-1}=\rho\sigma_k^c+(1-\rho)\sigma^u$, k=1, 2, . . . , $K_{max}$.

In an operation 820, a request is sent to each thread of each worker device 400 of worker system 306 and/or to each thread of controller device 304. The request indicates that each worker/thread compute initial values for $$\sum_{i=1}^{n_{w,t}} r_{i,k}, \sum_{i=1}^{n_{w,t}} r_{i,k} x_i,$$

and $$\sum_{i=1}^{n_{w,t}} r_{i,k} x_i x_i^T$$

for each cluster k=1, . . . , $K_{max}$ and for input unclassified data subset 514 allocated to each thread of controller device 304 and/or input unclassified data subset 614 distributed to each worker device 400 and allocated to each thread of worker device 400. When the covariance option indicates the diagonal covariance option, the Hadamard product $$\sum_{i=1}^{n_{w,t}} r_{i,k} x_i \circ x_i$$

is requested instead of $$\sum_{i=1}^{n_{w,t}} r_{i,k} x_i x_i^T.$$

In an illustrative embodiment, the request may be broadcast to each worker device 400. The request is sent by the controller thread of controller device 304.

In an operation 822, the $$\sum_{i=1}^{n_{w,t}} r_{i,k}, \sum_{i=1}^{n_{w,t}} r_{i,k} x_i,$$

and $$\sum_{i=1}^{n_{w,t}} r_{i,k} x_i x_i^T$$

are received from each thread of each worker device 400 of worker system 306 and/or from each thread of controller device 304. The values are received by the controller thread of controller device 304. The $$\sum_{i=1}^{n_{w,t}} r_{i,k}$$

received from each worker/thread may be denoted as $q_{k,w,t}$, where $q_{k,w,t}$ is a scalar value and the subscript k indicates an index to the respective cluster, the subscript w indicates an index to the respective worker device 400 and/or controller device 304, and t indicates an index to the respective thread of the respective worker device 400 and/or controller device 304. The $$\sum_{i=1}^{n_{w,t}} r_{i,k} x_i$$

received from each worker/thread may be denoted as $u_{k,w,t}$, which is a d-dimensional vector. The $$\sum_{i=1}^{n_{w,t}} r_{i,k} x_i x_i^T$$

received from each worker/thread may be denoted as $s_{k,w,t}$ that is a d by d-dimensional matrix. When the covariance option indicates the diagonal covariance option, $$s_{k,w,t} = \sum_{i=1}^{n_{w,t}} r_{i,k} x_i \circ x_i,$$

and $S_{k,w,t}$ is a d-dimensional vector.

In an operation 824, the total sum of each is computed using $$q_k = n_k^c + \sum_{w=1}^{W}\sum_{t=1}^{T} q_{k,w,t}, \quad u_k = \sum_{i=1}^{n_k^c} x_i + \sum_{w=1}^{W}\sum_{t=1}^{T} u_{k,w,t},$$

and $$s_k = \sum_{i=1}^{n_k^c} x_i x_i^\top + \sum_{w=1}^{W}\sum_{t=1}^{T} s_{k,w,t},$$

for k=1, 2, . . . , $K_{max}$, where $x_i$ is the $i^{th}$ observation vector read from input classified data 124 and included in the $k^{th}$ cluster, and $n_k^c$ is a number of observation vectors read from input classified data 124 that are included in the $k^{th}$ cluster.

Similar to operation 232, in an operation 826, the iteration counter I is initialized, for example, as I=0.

Similar to operation 242, in an operation 830, the iteration counter I is incremented, for example, as I=I+1.

Similar to operation 244, in an operation 832, parameters $\gamma_{k,1}$ and $\gamma_{k,2}$ of the beta distribution are updated for each cluster k=1, 2, . . . , $K_{max}$. For example, $\gamma_{k,1}=1+q_k$, k=1, 2, . . . , $K_{max}$ and $$\gamma_{k,2} = \alpha_0 + \sum_{l=k+1}^{K_{max}} q_l, k = 1, 2, \ldots, K_{max}.$$

Similar to operation 246, in an operation 834, parameters $m_k, \beta_k, \Psi_k, v_k$ of the normal-Wishart distribution are updated for each cluster k=1, 2, . . . , $K_{max}$, for example, using $$m_{k,j} = \frac{\beta_{0,j} m_{0,k,j} + u_{k,j}}{\beta_{0,j} + q_k},$$

$$\beta_{k,j} = \beta_{0,j} + q_k,$$

$$v_{k,j} = v_{0,j} + q_k, \text{ and}$$

$$\Psi_{k,j} = (\Psi_{0,j}^{-1} + \beta_{0,j}(m_{k,j} - m_{0,k,j})^2 + s_{k,j} - 2u_{k,j}m_{k,j} + q_k m_{k,j}m_{k,j})^{-1},$$

$$j = 1, 2, \ldots, d$$

when the covariance option indicates the diagonal covariance option, and using $$m_k = \frac{\beta_0 m_{0,k} + u_k}{\beta_0 + q_k},$$

$$\beta_k = \beta_0 + q_k,$$

$$v_k = v_0 + q_k, \text{ and}$$

$$\Psi_k = (\Psi_0^{-1} + \beta_0(m_k - m_{0,k})(m_k - m_{0,k})^\top + s_k - u_k m_k^\top - m_k u_k^\top + q_k m_k m_k^\top)^{-1}$$

otherwise.

In an operation 836, a request is sent to each thread of each worker device 400 of worker system 306 and/or to each thread of controller device 304. The request indicates that each worker/thread compute updated values for $$\sum_{i=1}^{n_{w,t}} r_{i,k}, \sum_{i=1}^{n_{w,t}} r_{i,k} x_i,$$

and $$\sum_{i=1}^{n_{w,t}} r_{i,k} x_i x_i^T$$

for each cluster k=1, 2, . . . , $K_{max}$ and for input unclassified data subset 514 allocated to each thread of controller device 304 and/or input unclassified data subset 614 distributed to each worker device 400 and allocated to each thread of worker device 400. The request includes the updated beta distribution parameters $\gamma_{k,1}$ and $\gamma_{k,2}$ and the updated normal-Wishart distribution parameters $m_k, \beta_k, \Psi_k, v_k$ or $m_{k,j}, \beta_{k,j}, \Psi_{k,j}, v_{k,j}$ when the covariance option indicates the diagonal covariance option. When the covariance option indicates the diagonal covariance option, the Hadamard product $$\sum_{i=1}^{n_{w,t}} r_{i,k} x_i \circ x_i^T$$

is requested instead of $$\sum_{i=1}^{n_{w,t}} r_{i,k} x_i x_i^T.$$

In an illustrative embodiment, the request may be broadcast to each worker device 400. The request is sent by the controller thread of controller device 304.

In an operation 838, the $$\sum_{i=1}^{n_{w,t}} r_{i,k}, \sum_{i=1}^{n_{w,t}} r_{i,k} x_i,$$

and $$\sum_{i=1}^{n_{w,t}} r_{i,k} x_i x_i^T$$

are received from each thread of each worker device 400 of worker system 306 and/or from each thread of controller device 304. The values are received by the controller thread of controller device 304. The $$\sum_{i=1}^{n_{w,t}} r_{i,k}$$

received from each worker/thread may be denoted as $q_{k,w,t}$, where the subscript k indicates an index to the respective cluster, the subscript w indicates an index to the respective worker device 400 and/or controller device 304, and t indicates an index to the respective thread of the respective worker device 400 and/or controller device 304. The $$\sum_{i=1}^{n_{w,t}} r_{i,k} x_i$$

received from each worker/thread may be denoted as $u_{k,w,t}$. The $$\sum_{i=1}^{n_{w,t}} r_{i,k} x_i x_i^T$$

received from each worker/thread may be denoted as $s_{k,w,t}$. When the covariance option indicates the diagonal covariance option, $$s_{k,w,t} = \sum_{i=1}^{n_{w,t}} r_{i,k} x_i \circ x_i^T.$$

Referring to FIG. 8B, in an operation 840, the total sum of each is computed using $$q_k = n_k^c + \sum_{w=1}^{W} \sum_{t=1}^{T} q_{k,w,t}, \quad u_k = \sum_{i=1}^{n_k^c} x_i + \sum_{w=1}^{W} \sum_{t=1}^{T} u_{k,w,t},$$

and $$s_k = \sum_{i=1}^{n_k^c} x_i x_i^T + \sum_{w=1}^{W} \sum_{t=1}^{T} s_{k,w,t},$$

for k=1, 2, . . . , $K_{max}$, where $x_i$ is the $i^{th}$ observation vector read from input classified data 124 and included in the $k^{th}$ cluster.

Similar to operation 252, in an operation 844, ELBO is computed.

Similar to operation 254, in an operation 846, ΔELBO is computed using ΔELBO=|ELBO−$ELBO_p$| unless the iteration counter I=1. When the iteration counter I=1, a value for $ELBO_p$ has not been determined.

Similar to operation 256, in an operation 848, a determination is made concerning whether ΔELBO<Th. If ELBO<Th and I≠1, processing continues in an operation 854 to indicate convergence has been achieved. If ΔELBO≥Th or I=1, processing continues in an operation 850.

Similar to operation 258, in an operation 850, a determination is made concerning whether I≤$I_{max}$. If I>$I_m$, processing continues in operation 854 to indicate convergence has been stopped. If I≤$I_{max}$, processing continues in an operation 852.

Similar to operation 260, in operation 852, $ELBO_p$ is updated for a next iteration using $ELBO_p$=ELBO, and processing continues in operation 830.

In operation 854, a request is sent to each thread of each worker device 400 of worker system 306 and/or to each thread of controller device 304. The request indicates that each worker/thread determine a cluster membership for each observation vector included in input unclassified data subset 514 allocated to each thread of controller device 304 and/or input unclassified data subset 614 distributed to each worker device 400 and allocated to each thread of worker device 400. The request may indicate that each worker/thread output the cluster membership, for example, to clustering model output data 128. In an illustrative embodiment, the request may be broadcast to each worker device 400. The request is sent by the controller thread of controller device 304.

In an operation 856, a list of clusters to which at least one observation was assigned is received from each thread of each worker device 400 of worker system 306 and/or from each thread of controller device 304. The values are received by the controller thread of controller device 304. The list from each worker device 400 of worker system 306 and/or from each thread of controller device 304 may be combined into a single list that includes unique cluster identifiers to which any observation vector has been assigned.

Similar to operation 264, in an operation 858, a number of clusters $K_n$ that include at least one observation is determined from the list of clusters received in operation 856. For example, $K_n$ is a number of unique cluster membership indices to which any observation vector is assigned.

Similar to operation 266, in operation 860, the ELBO, $m_k$, and $\Psi_k$ computed for each cluster k=1, 2, . . . , $K_n$ of the number of clusters $K_n$ are output. Additional information that may be output are a number of observations in each cluster, a neighbor cluster of each cluster whose Gaussian mean is closest to the Gaussian mean of the cluster, the cluster membership index $z_i$ for each observation, the responsibility parameter value $r_{i,k}$ for each observation and each cluster, a clustering model description so that the model can be used for data clustering, etc. For example, the clustering model description may be output to clustering model description 126, and the cluster membership index $z_i$ for each observation and the responsibility parameter value $r_{i,k}$ for each observation and each cluster may be output to clustering model output data 128. The clustering model description may include the clustering algorithm indicating the Gaussian mixture model, the inference method indicating variational Bayesian, $K_n$, the mass parameter value $\alpha_0$, the covariance option, the maximum number of iterations $I_{max}$, the convergence threshold value Th, ELBO, $m_k$, and $\Psi_k$ computed for each cluster k=1, . . . , $K_n$ of the number of clusters $K_n$, etc. Some of the output may be generated from each worker/thread to avoid transmission of the data through network 308.

Referring to FIGS. 9A, 9B, 9C, 9D, and 9E, example operations associated with worker application 612 are described. Additional, fewer, or different operations may be performed depending on the embodiment. The order of presentation of the operations of FIGS. 9A, 9B, 9C, 9D, and 9E is not intended to be limiting. When controller device 304 is acting as a worker device, each thread of the number of threads T of controller device 304 also executes the operations of FIGS. 9A, 9B, 9C, 9D, and 9E with the assigned input unclassified data subset 514.

Figure 9B:
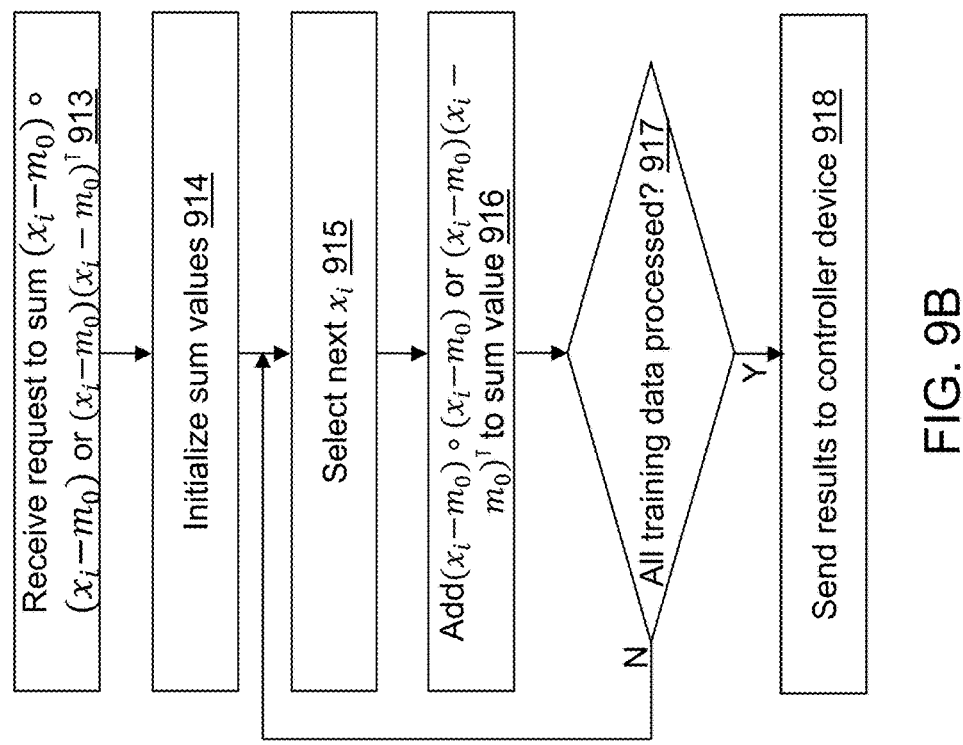
FIGS. 9A, 9B, 9C, 9D, and 9E depict flow diagrams illustrating examples of operations performed by the worker device of FIG. 6 in accordance with an illustrative embodiment.
Figure 9A:
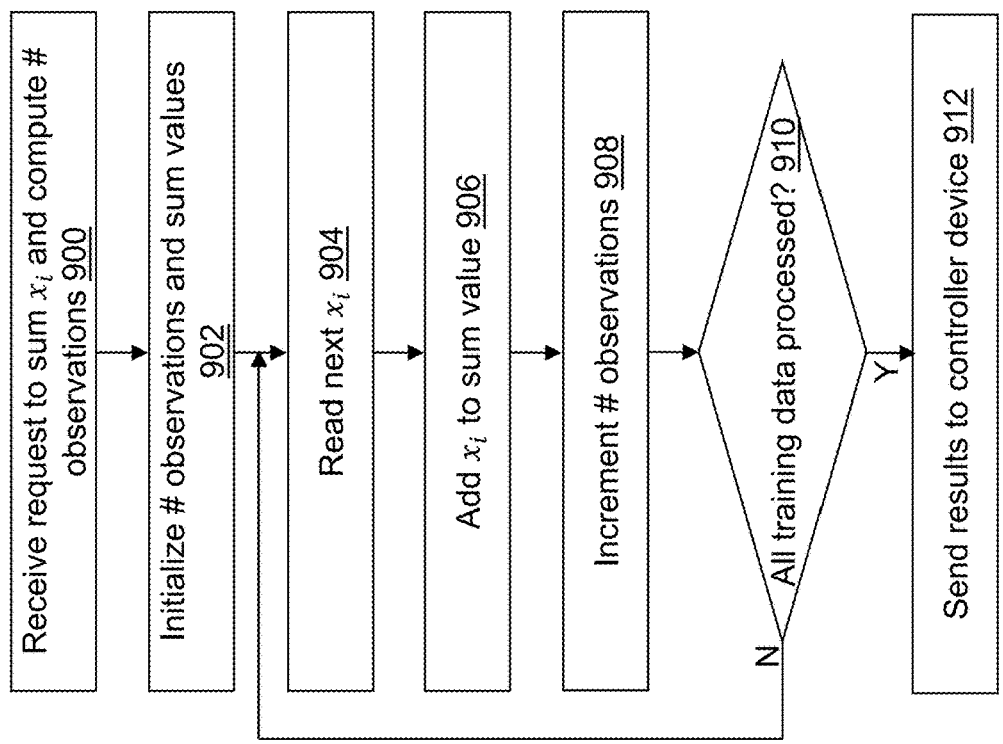

Referring to FIG. 9A, in an operation 900, the request to compute $$\sum_{i=1}^{n} x_i$$

and determine n for input unclassified data subset 614 or input unclassified data subset 514 is received from controller device 304 as a result of operation 804. The request may include the covariance option or the value may be otherwise provided to each worker/thread in a known memory location or based on a default value.

In an operation 902, the number of observations n is initialized, for example, as n=1, and the sum values m are initialized, for example, as m=0, where m is a vector with d values.

In an operation 904, an observation vector $x_i$ is read from input unclassified data subset 614 allocated to the respective thread of worker device 400 or from input unclassified data subset 514 allocated to the respective thread of controller device 304. In an illustrative embodiment, the read data is stored in memory so that no further read of input unclassified data subset 614 allocated to the respective thread of worker device 400 or from input unclassified data subset 514 allocated to the respective thread of controller device 304 is performed.

In an operation 906, m=m+$x_i$.

In an operation 908, n=n+1.

In an operation 910, a determination is made concerning whether input unclassified data subset 614 allocated to the respective thread of worker device 400 or input unclassified data subset 514 allocated to the respective thread of controller device 304 has been read in operation 904. If all of input unclassified data subset 614 allocated to the respective thread or all of input unclassified data subset 514 allocated to the respective thread of controller device 304 has been processed, processing continues in an operation 912. Otherwise, processing continues in operation 904 to read a next observation vector.

In operation 912, m and n are sent from each thread of each worker device 400 of worker system 306 or from each thread of controller device 304 to controller device 304, and processing continues in operation 806 of FIG. 8A.

Referring to FIG. 9B, in an operation 913, the request to compute $$\sum_{i=1}^{n_{w,t}} (x_i - m_0) \circ (x_i - m_0)$$

or $$\sum_{i=1}^{n_{w,t}} (x_i - m_0)(x_i - m_0)^\top$$

for input unclassified data subset 614 or input unclassified data subset 514 is received from controller device 304 as a result of operation 807. The request may include the covariance option and the mean vector $m_0$ or the values may be otherwise provided to each worker/thread in a known memory location or based on a default value. The request indicates that each worker/thread compute $$\sum_{i=1}^{n_{w,t}} (x_i - m_0) \circ (x_i - m_0)$$

when the covariance option indicates the diagonal covariance option; otherwise, the request indicates that each worker/thread compute $$\sum_{i=1}^{n_{w,t}} (x_i - m_0)(x_i - m_0)^\top.$$

In an operation 914, the sum values p are initialized, for example, as p=0, where p is a vector with d values, when the covariance option indicates the diagonal covariance option; otherwise, p is a matrix with n×d values.

In an operation 915, an observation vector $x_i$ is selected from input unclassified data subset 614 allocated to the respective thread of worker device 400 or from input unclassified data subset 514 allocated to the respective thread of controller device 304. When the data read in operation 904 is not stored in memory the observation vector $x_i$ is read.

In an operation 916, p=p+$(x_i-m_0)\circ(x_i-m_0)$, when the covariance option indicates the diagonal covariance option; otherwise, p=p+$(x_i-m_0)(x_i-m_0)^T$.

In an operation 917, a determination is made concerning whether input unclassified data subset 614 allocated to the respective thread of worker device 400 or input unclassified data subset 514 allocated to the respective thread of controller device 304 has been read in operation 904. If all of input unclassified data subset 614 allocated to the respective thread or all of input unclassified data subset 514 allocated to the respective thread of controller device 304 has been processed, processing continues in an operation 918. Otherwise, processing continues in operation 915 to read a next observation vector.

In operation 918, p is sent from each thread of each worker device 400 of worker system 306 or from each thread of controller device 304 to controller device 304, and processing continues in operation 808 of FIG. 8A.

Figure 9D:
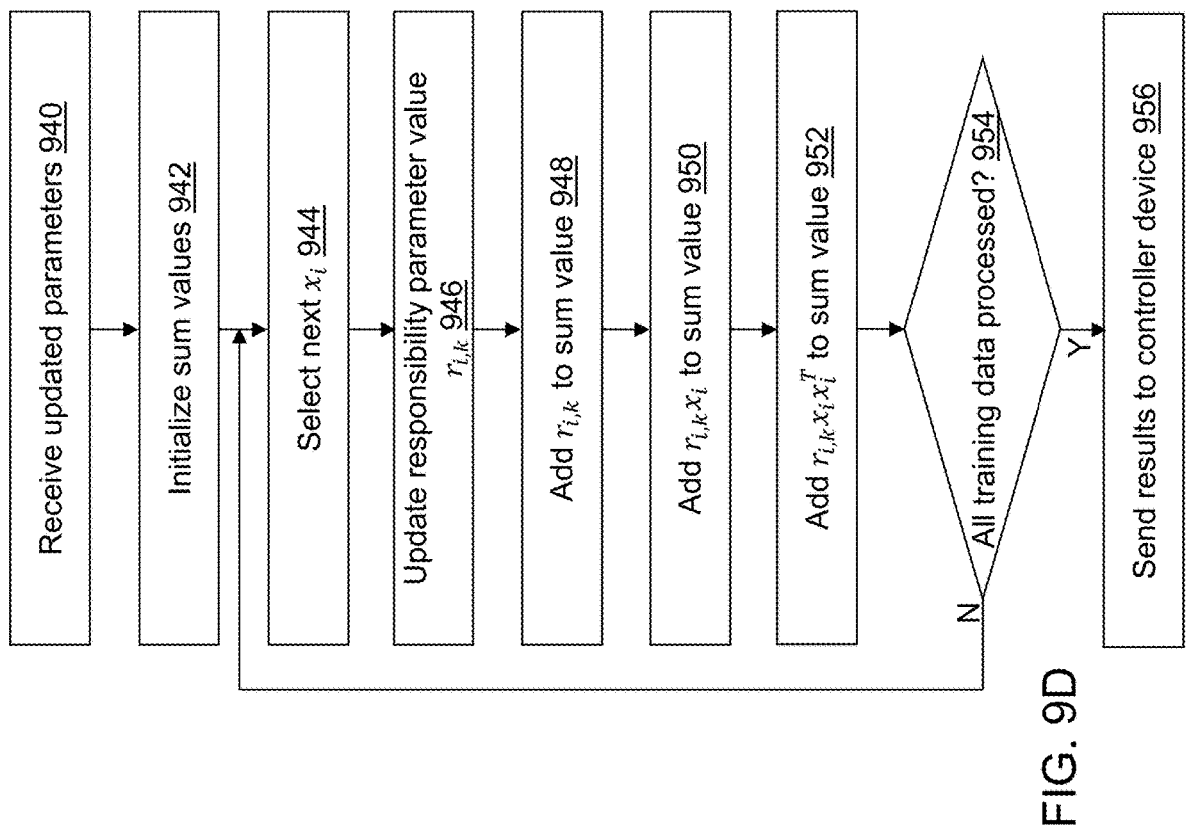
Figure 9C:
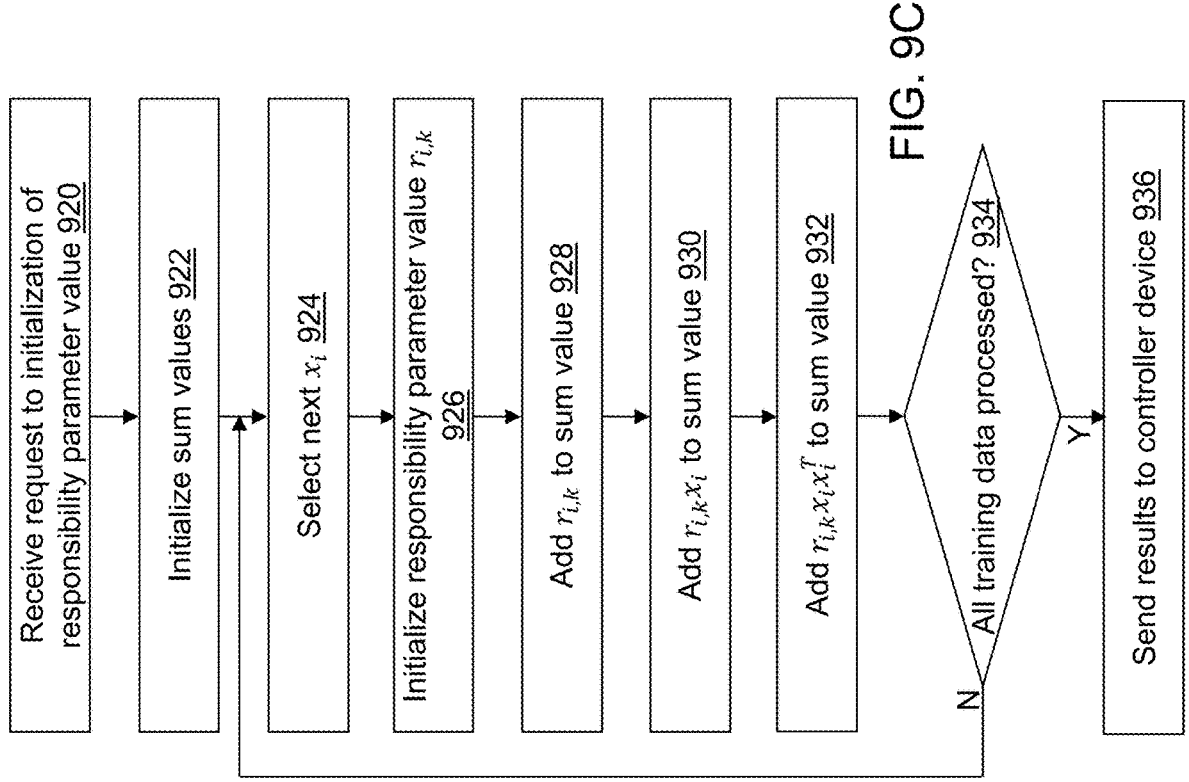

Referring to FIG. 9C, in an operation 920, the request to compute initial values for $$\sum_{i=1}^{n} r_{i,k}, \sum_{i=1}^{n} r_{i,k} x_i,$$

and $$\sum_{i=1}^{n} r_{i,k} x_i x_i^T$$

for input unclassified data subset 614 or input unclassified data subset 514 and for each cluster k=1, . . . , $K_x$ is received from controller device 304 as a result of operation 820. The request may include the value for $K_{max}$ or the value may be otherwise provided to each worker/thread in a known memory location or based on a default value. When the covariance option indicates the diagonal covariance option, the Hadamard product, $$\sum_{i=1}^{n_{w,t}} r_{i,k} x_i \circ x_i$$

is requested instead of $$\sum_{i=1}^{n_{w,t}} r_{i,k} x_i x_i^T.$$

In an operation 922, the sum values $q_k$, $u_k$, and $s_k$ are initialized, for example, as $q=0$, $u_k=0$, and $s_k=0$, for $k=1, 2, \ldots, K_{max}$.

In an operation 924, an observation vector $x_i$ is selected that was read previously from input unclassified data subset 614 allocated to the respective thread of worker device 400 or from input unclassified data subset 514 allocated to the respective thread of controller device 304.

Similar to operation 230, in an operation 926, a responsibility parameter value is initialized for the observation vector $x_i$ for each cluster. For illustration, the responsibility parameter value $r_{i,k}$ may be initialized using draws from a multinomial distribution such that a probability that the $i^{th}$ observation vector $x_i$ is assigned to each cluster $k=1, 2, \ldots, K_{max}$ sums to one or $$\sum_{k=1}^{K_{max}} r_{i,k} = 1.$$

As another illustration, the responsibility parameter value $r_{i,k}$ may be initialized using $r_{i,k}=1/K_{max}$, $k=1, 2, \ldots, K_{max}$.

In an operation 928, $q_k=q_k+r_{i,k}$ is computed for each cluster $k=1, 2, \ldots, K_{max}$.

In an operation 930, $u_k=u_k+r_{i,k}x_i$ is computed for each cluster $k=1, 2, \ldots, K_{max}$.

In an operation 932, $S_k=S_k+r_{i,k}x_ix_i^T$ is computed for each cluster $k=1, 2, \ldots, K_{max}$, and is a matrix. When the covariance option indicates the diagonal covariance option, $s_k=s_k+r_{i,k}x_i \circ x_i$, and is a vector indexed by dimension k.

In an operation 934, a determination is made concerning whether input unclassified data subset 614 allocated to the respective thread of worker device 400 or input unclassified data subset 514 allocated to the respective thread of controller device 304 has been read in operation 924. If all of input unclassified data subset 614 allocated to the respective thread or all of input unclassified data subset 514 allocated to the respective thread of controller device 304 has been processed, processing continues in an operation 936. Otherwise, processing continues in operation 924 to read a next observation vector.

In operation 936, $q_k$, $u_k$, and $s_k$ are sent from each thread of each worker device 400 of worker system 306 or from each thread of controller device 304 to controller device 304, and processing continues in operation 822 of FIG. 8A.

Referring to FIG. 9D, in an operation 940, the request to compute updated values for $$\sum_{i=1}^{n} r_{i,k}, \sum_{i=1}^{n} r_{i,k}x_i,$$

and $$\sum_{i=1}^{n} r_{i,k}x_ix_i^T$$

for input unclassified data subset 614 and for each cluster $k=1, 2, \ldots, K_{max}$ is received from controller device 304 as a result of operation 836. The request may include the updated beta distribution parameters $\gamma_{k,1}$ and $\gamma_{k,2}$ and the updated normal-Wishart distribution parameters $m_k$, $\beta_k$, $\Psi_k$, $v_k$ or the values may be otherwise provided to each worker/thread in a known memory location, for example. When the covariance option indicates the diagonal covariance option, the Hadamard product $$\sum_{i=1}^{n_{w,t}} r_{i,k}x_i \circ x_i$$

is requested instead of $$\sum_{i=1}^{n_{w,t}} r_{i,k}x_ix_i^T.$$

In an operation 942, the sum values $q_k$, $u_k$, and $s_k$ are initialized, for example, as $q_k=0$, $u_k=0$, and $s_k=0$, for $k=1, 2, \ldots, K_{max}$.

In an operation 944, an observation vector $x_i$ is selected that was read previously from input unclassified data subset 614 allocated to the respective thread of worker device 400 or from input unclassified data subset 514 allocated to the respective thread of controller device 304.

Similar to operation 248, in an operation 946, the responsibility parameter value $r_{i,k}$ is updated with observation vector $x_i$ for each cluster. For example, $$r_{i,k} \propto \exp\left(\Gamma^{(1)}(\gamma_{k,1}) - \Gamma^{(1)}(\gamma_{k,1}+\gamma_{k,2}) + \sum_{l=1}^{k-1}(\Gamma^{(1)}(\gamma_{l,2}) - \Gamma^{(1)}(\gamma_{l,1}+\gamma_{l,2})) + \frac{1}{2}\sum_{j=1}^{d}\left(\Gamma^{(1)}\left(\frac{v_{k,j}}{2}\right) + \log|\Psi_{k,j}| - v_{k,j}\Psi_{k,j}(x_{i,j}-m_{k,j})^2 - \beta_{k,j}^{-1}\right)\right)$$

is used when the covariance option indicates the diagonal covariance option, and $$r_{i,k} \propto \exp\left(\Gamma^{(1)}(\gamma_{k,1}) - \Gamma^{(1)}(\gamma_{k,1}+\gamma_{k,2}) + \sum_{l=1}^{k-1}(\Gamma^{(1)}(\gamma_{l,2}) - \Gamma^{(1)}(\gamma_{l,1}+\gamma_{l,2})) + \frac{1}{2}\Gamma_d^{(1)}\left(\frac{v_k}{2}\right) + \frac{1}{2}\log|\Psi_k| - \frac{1}{2}(x_i-m_k)^T v_k \Psi_k (x_i-m_k) - \frac{d}{2}\beta_k^{-1}\right)$$

is used otherwise.

In an operation 948, $q_k=q_k+r_{i,k}$ is computed for each cluster $k=1, 2, \ldots, K_{max}$.

In an operation 950, $u_k=u_k+r_{i,k}x_i$ is computed for each cluster $k=1, 2, \ldots, K_{max}$.

In an operation 952, $S_k=S_k+r_{i,k}x_ix_i^T$ is computed for each cluster $k=1, 2, \ldots, K_{max}$. When the covariance option indicates the diagonal covariance option, $S_k=S_k+r_{i,k}x_i \circ x_i$.

In an operation 954, a determination is made concerning whether input unclassified data subset 614 allocated to the respective thread of worker device 400 or input unclassified data subset 514 allocated to the respective thread of controller device 304 has been read in operation 944. If all of input unclassified data subset 614 allocated to the respective thread or all of input unclassified data subset 514 allocated to the respective thread of controller device 304 has been processed, processing continues in an operation 956. Otherwise, processing continues in operation 944 to read a next observation vector.

In operation 956, $q_k$, $u_k$, and $S_k$ are sent from each thread of each worker device 400 of worker system 306 or from each thread of controller device 304 to controller device 304, and processing continues in operation 838 of FIG. 8B.

Figure 9E:
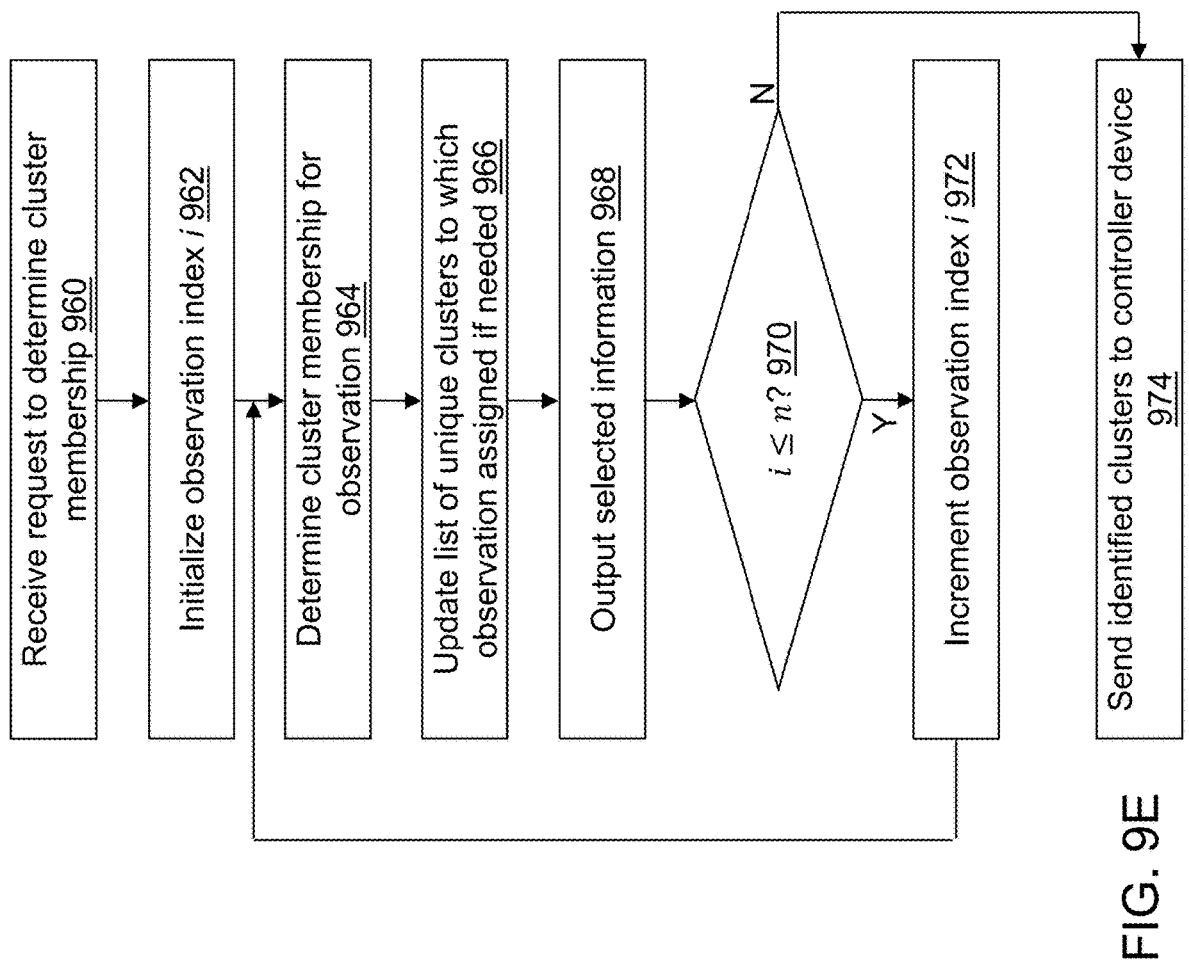

Referring to FIG. 9E, in an operation 960, the request to determine a cluster membership for each observation vector is received from controller device 304 as a result of operation 854.

In an operation 962, an observation index i is initialized, for example, as i=1.

Similar to operation 262, in an operation 964, a cluster membership index $z_i$ is determined using a multinomial distribution with the updated responsibility parameter value $r_{i,k}$ as the parameter value for the $i^{th}$ observation vector $x_i$. The cluster membership index $z_i$ indicates a cluster to which the $i^{th}$ observation vector $x_i$ is assigned. For example, a random draw is made and compared to each probability value defined by $r_{i,k}$ to determine the cluster membership index $z_i$ that is one of k=1, 2, . . . , $K_{max}$.

In an operation 966, the unique cluster list is updated to include the cluster membership index $z_i$ if the $i^{th}$ observation vector $x_i$ is the first observation vector to be assigned to the cluster indicated by the cluster membership index $z_i$.

In an operation 968, the cluster membership index $z_i$ may be output, for example, to clustering model output data 128 in association with the observation vector by outputting the observation index i and/or the $i^{th}$ observation vector $x_i$, for example, with the cluster membership index $z_i$.

In an operation 970, a determination is made concerning whether i≤n indicating that input unclassified data subset 614 allocated to the respective thread of worker device 400 or input unclassified data subset 514 allocated to the respective thread of controller device 304 included another observation vector. If i≤n, processing continues in operation 972. If i>n, processing continues in an operation 974.

In operation 972, the observation index i is incremented, for example, as i=i+1, and processing continues in operation 964.

In operation 974, the unique cluster list is sent from each thread of each worker device 400 of worker system 306 to controller device 304, and processing continues in operation 856 of FIG. 8B.

Figure 10A:
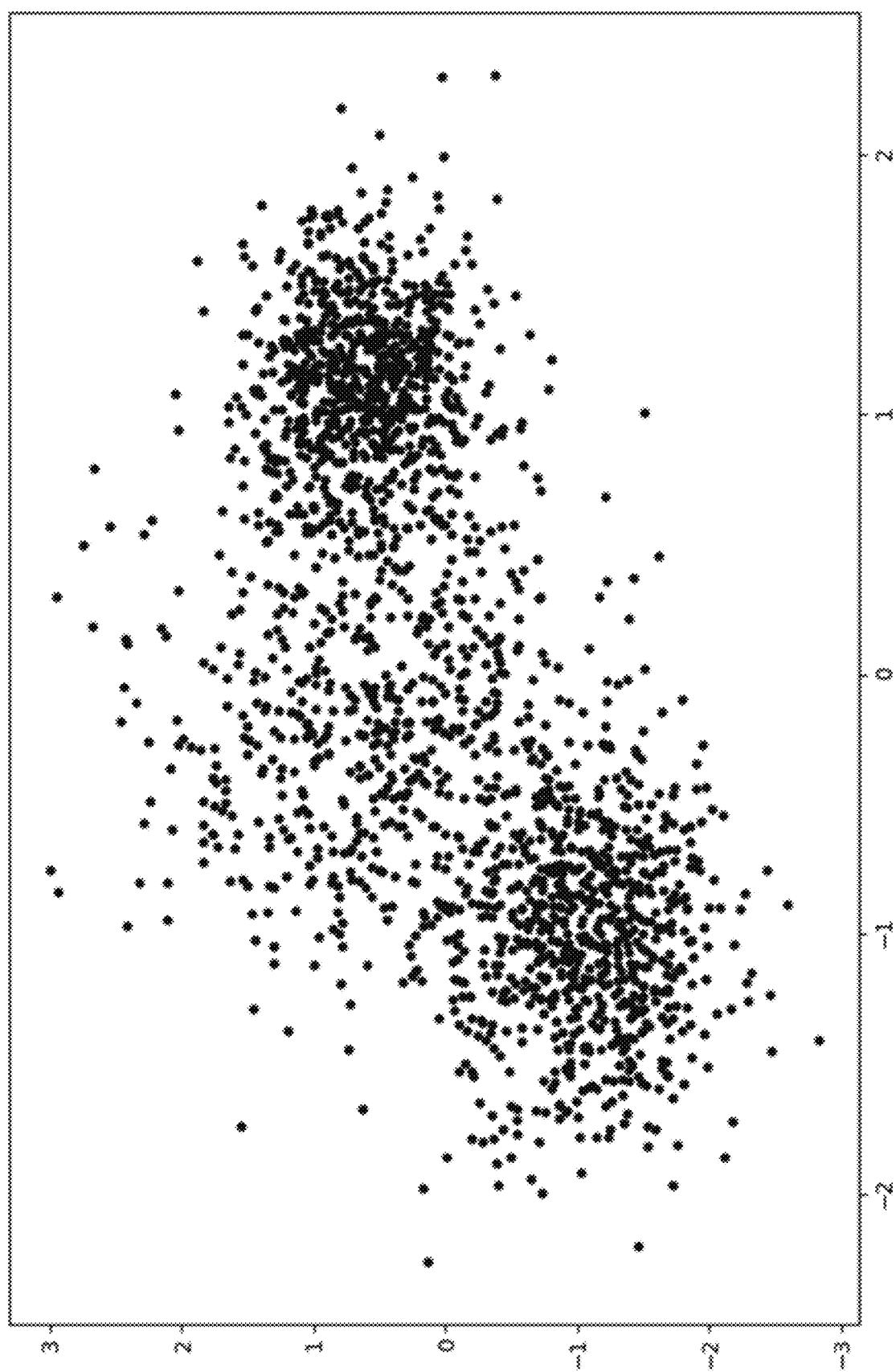
FIG. 10A shows a cluster assignment computed after a first iteration of operation 234 of FIG. 2B with seven clusters in accordance with an illustrative embodiment.

Experimental results were generated using the operations of clustering model training application 122. The dataset included three Gaussian clusters with means of [−4, −2], [−3, 0], [1, 0.25] and standard deviations of [2, 3, 1.5]. 2000 observations were created in total. Referring to FIG. 10A, the clustering results are shown with input classified data 124 empty. Because the three clusters were very close to each other and the deviations were large, the three clusters are mixed at their edges. With no classified observations, clustering model training application 122 failed to determine the number of clusters in the data and merged the three clusters into a single cluster.

Figure 10B:
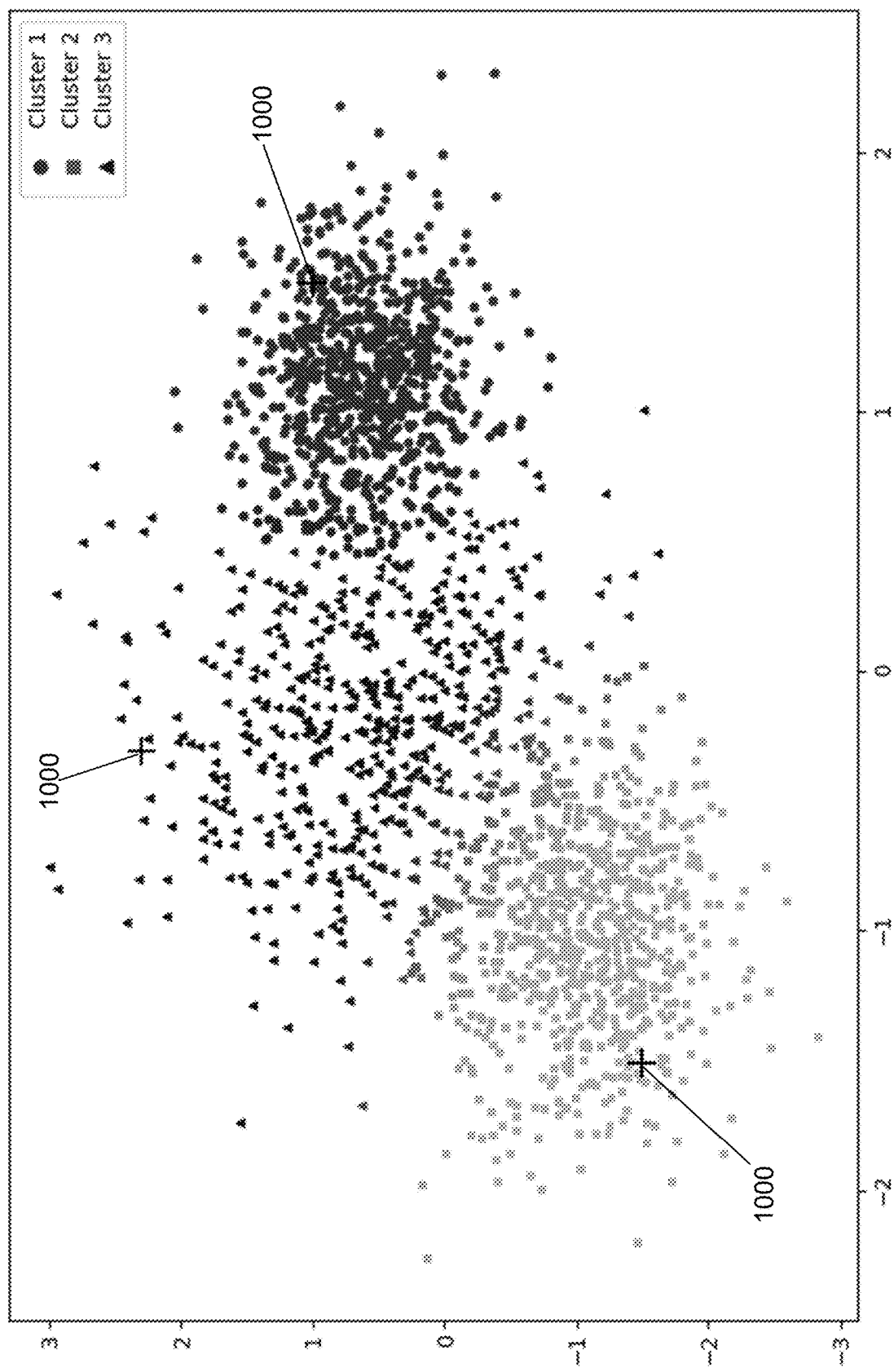
FIG. 10B shows the cluster assignment computed after a thirtieth iteration of operation 234 of FIG. 2B with five clusters in accordance with an illustrative embodiment.

Three of the 2000 observations were then classified and 1997 observations remained unclassified. Referring to FIG. 10B, the three classified observations 1000 are shown with "+" in the data. With the classified data, the three clusters are clearly separated by clustering model training application 122. The effect of the classified data in the initialized mean and covariance plays an important role in differentiating the clusters in the data.

Figure 11:
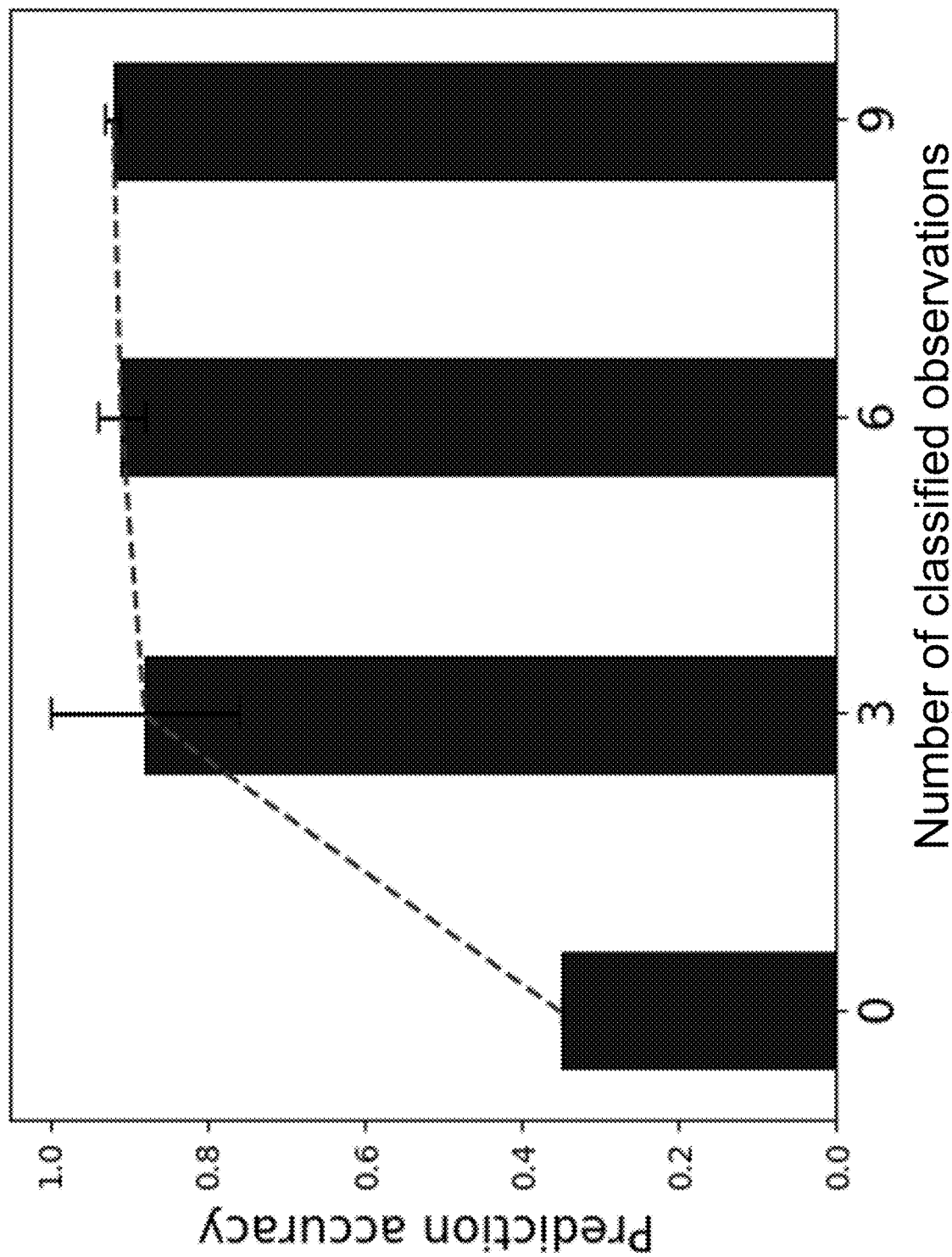
FIG. 11 shows the cluster assignment computed after a fiftieth iteration of operation 234 of FIG. 2B with three clusters in accordance with an illustrative embodiment.

Referring to FIG. 11, the prediction accuracy is shown that results as a function of the number of classified observation vectors. The prediction accuracy is improved with very few classified observations.

For a VB iteration, the inter-node communication comprises two parts: each worker device 400 sends the computed values to controller device 304, taking $WK_x(1+d+b)$ float bytes, where b=d(d+1)/2. Since controller device 304 needs to notify each worker device 400 when ΔELBO<Th, an additional W binary bytes are added. Compared to the big n, each of $n_{w,t}$, $K_{max}$, and W are small numbers usually less than 100. Neither $\{x_i\}_{i=1}^{n}$ nor $\{\{r_{i,k}\}_{i=1}^{n}\}_{k=1}^{K_{max}}$ with the cardinality of n is required to move between controller device 304 or each worker device 400. Thus, controller application 512 and/or worker application 612 introduce small inter-node communication and otherwise introduce no changes relative to clustering model training application 422. Therefore, the multithreaded and/or distributed operations performed by controller application 512 and/or worker application 612 result in identical accuracy with significantly faster results due to the distributed processing. The faster results are a 1/WT fraction of the processing time that results using clustering model training application 422.

Figure 12:
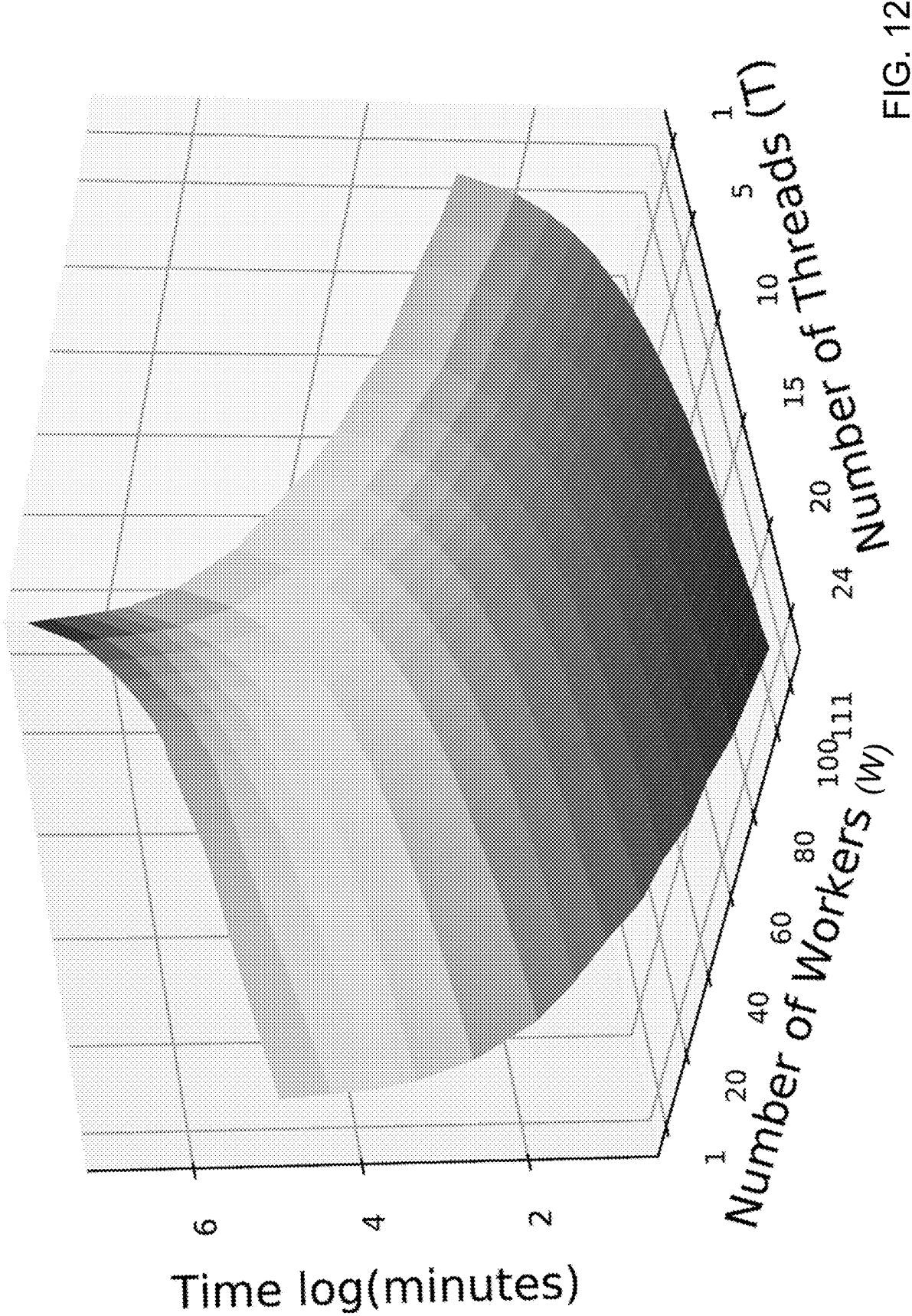
FIG. 12 shows a clustering time for 100 iterations of operation 842 of FIG. 8B using a dataset that included 10 million observations with ten variables in accordance with an illustrative embodiment.

Clustering model training application 422 was implemented in C with the message passing interface as the inter-node communication protocol. Clustering model training system 300 included controller device 304 and worker system 306 included 111 worker devices 400. Controller device 304 had 72 CPUs of the base frequency 2.3 gigahertz (GHz), and each worker device 400 had 32 CPUs of the base frequency 2.7 GHz. Clustering model training application 422 was tested for its scalability on a Toy dataset as input classified data 124 with 10 million rows and 10 variables. Referring to FIG. 12, the convergence time is shown as a function of the number of workers W and the number of threads T selected in operations 700 and 702. Using clustering model training application 122, 20 hours and 10 minutes of computing time was required to compute the clusters for the Toy dataset. Using clustering model training application 422 with W=111 and T=24, 1 minute and 44 seconds of computing time was required to compute the clusters for the Toy dataset, despite the overhead of multithreading and inter-node communication. Identical clustering results were achieved. Clustering model training application 422 made the clustering of the toy dataset achievable for big data with a dramatic acceleration from ~20 hours to less than 2 minutes. The time is shown with a log scale.

Figure 13:
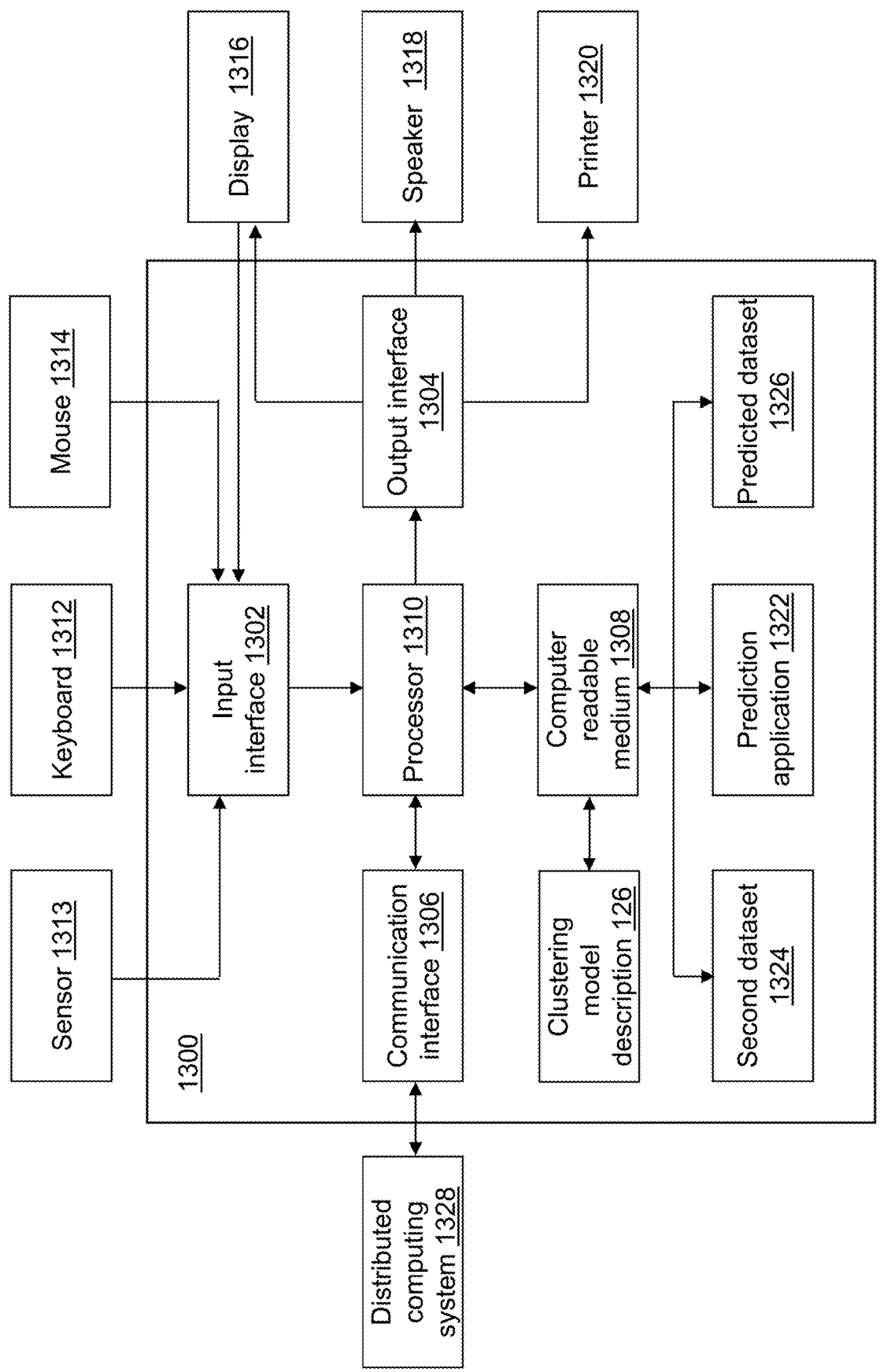
FIG. 13 depicts a block diagram of a prediction device in accordance with an illustrative embodiment.

Referring to FIG. 13, a block diagram of a prediction device 1300 is shown in accordance with an illustrative embodiment. Prediction device 1300 may include a fifth input interface 1302, a fifth output interface 1304, a fifth communication interface 1306, a fifth non-transitory computer-readable medium 1308, a fifth processor 1310, a prediction application 1322, clustering model description 126, second dataset 1324, and predicted dataset 1326. Fewer, different, and/or additional components may be incorporated into prediction device 1300. Prediction device 1300 and user device 400 and/or controller device 304 and/or clustering model training device 100 may be the same or different devices.

Fifth input interface 1302 provides the same or similar functionality as that described with reference to input interface 102 of clustering model training device 100 though referring to prediction device 1300. Fifth output interface 1304 provides the same or similar functionality as that described with reference to output interface 104 of clustering model training device 100 though referring to prediction device 1300. Fifth communication interface 1306 provides the same or similar functionality as that described with reference to communication interface 106 of clustering model training device 100 though referring to prediction device 1300. Data and messages may be transferred between prediction device 1300 and a distributed computing system 1328 using fifth communication interface 1306. Fifth computer-readable medium 1308 provides the same or similar functionality as that described with reference to computer-readable medium 108 of clustering model training device 100 though referring to prediction device 1300. Fifth processor 1310 provides the same or similar functionality as that described with reference to processor 110 of clustering model training device 100 though referring to prediction device 1300.

Prediction application 1322 performs operations associated with classifying or predicting a cluster membership of each observation vector included in second dataset 1324. The cluster membership may be stored in predicted dataset 1326 to support various data analysis functions as well as provide alert/messaging related to the classified/predicted data. Dependent on the type of data stored in input classified data 124 and input unclassified data 125 (input unclassified data subset 514 and/or input unclassified data subset 614) and second dataset 1324, prediction application 1322 may identify anomalies as part of process control, for example, of a manufacturing process, for machine condition monitoring, for image classification, for intrusion detection, for fraud detection, etc. Some or all of the operations described herein may be embodied in prediction application 1322. The operations may be implemented using hardware, firmware, software, or any combination of these methods.

Referring to the example embodiment of FIG. 13, prediction application 1322 is implemented in software (comprised of computer-readable and/or computer-executable instructions) stored in fifth computer-readable medium 1308 and accessible by fifth processor 1310 for execution of the instructions that embody the operations of prediction application 1322. Prediction application 1322 may be written using one or more programming languages, assembly languages, scripting languages, etc. Prediction application 1322 may be integrated with other analytic tools. As an example, prediction application 1322 may be part of an integrated data analytics software application and/or software architecture such as that offered by SAS Institute Inc. of Cary, N.C., USA. For example, prediction application 1322 may be part of SAS® Enterprise Miner™ developed and provided by SAS Institute Inc. of Cary, N.C., USA. Merely for further illustration, prediction application 1322 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA. One or more operations of prediction application 1322 further may be performed by an ESPE. Prediction application 1322, clustering model training application 122, clustering model training application 422, controller application 512, and/or worker application 612 may be the same or different applications that are integrated in various manners to execute a clustering model using input classified data 124 and using input unclassified data 125 that may be distributed (input unclassified data subset 514 and/or input unclassified data subset 614) and/or second dataset 1324.

Prediction application 1322 may be implemented as a Web application. Prediction application 1322 may be integrated with other system processing tools to automatically process data generated as part of operation of an enterprise, to classify data in the processed data, and/or to provide a warning or alert associated with the data classification using fifth input interface 1302, fifth output interface 1304, and/or fifth communication interface 1306 so that appropriate action can be initiated in response. For example, a warning or an alert may be presented using a third display 1316, a third speaker 1318, a third printer 1320, etc. or sent to one or more computer-readable media, display, speaker, printer, etc. of distributed computing system 1328.

Input classified data 124, input unclassified data 125, and second dataset 1324 may be generated, stored, and accessed using the same or different mechanisms. Similar to input classified data 124 and input unclassified data 125, second dataset 1324 may include a plurality of rows and a plurality of columns with the plurality of rows referred to as observations or records, and the columns referred to as variables that are associated with an observation. Second dataset 1324 may be transposed.

Similar to input classified data 124 and input unclassified data 125, second dataset 1324 may be stored on fifth computer-readable medium 1308 or on one or more computer-readable media of distributed computing system 1328 and accessed by prediction device 1300 using fifth communication interface 1306. Data stored in second dataset 1324 may be a sensor measurement or a data communication value, for example, from a sensor 1313, may be generated or captured in response to occurrence of an event or a transaction, generated by a device such as in response to an interaction by a user with the device, for example, from a third keyboard 1312 or a third mouse 1314, etc. The data stored in second dataset 1324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 1324 may be captured at different time points periodically, intermittently, when an event occurs, etc. One or more columns may include a time value. Similar to input classified data 124 and input unclassified data 125, data stored in second dataset 1324 may be generated as part of the IoT, and some or all data may be pre- or post-processed by an ESPE.

Similar to input classified data 124 and input unclassified data 125, second dataset 1324 may be stored in various compressed formats such as a coordinate format, a compressed sparse column format, a compressed sparse row format, etc. Second dataset 1324 further may be stored using various structures as known to those skilled in the art including a file system, a relational database, a system of tables, a structured query language database, etc. on prediction device 1300 and/or on distributed computing system 1328. Prediction device 1300 and/or distributed computing system 1328 may coordinate access to second dataset 1324 that is distributed across a plurality of computing devices that make up distributed computing system 1328. For example, second dataset 1324 may be stored in a cube distributed across a grid of computers as understood by a person of skill in the art. As another example, second dataset 1324 may be stored in a multi-node Hadoop® cluster. As another example, second dataset 1324 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 1324.

Figure 14:
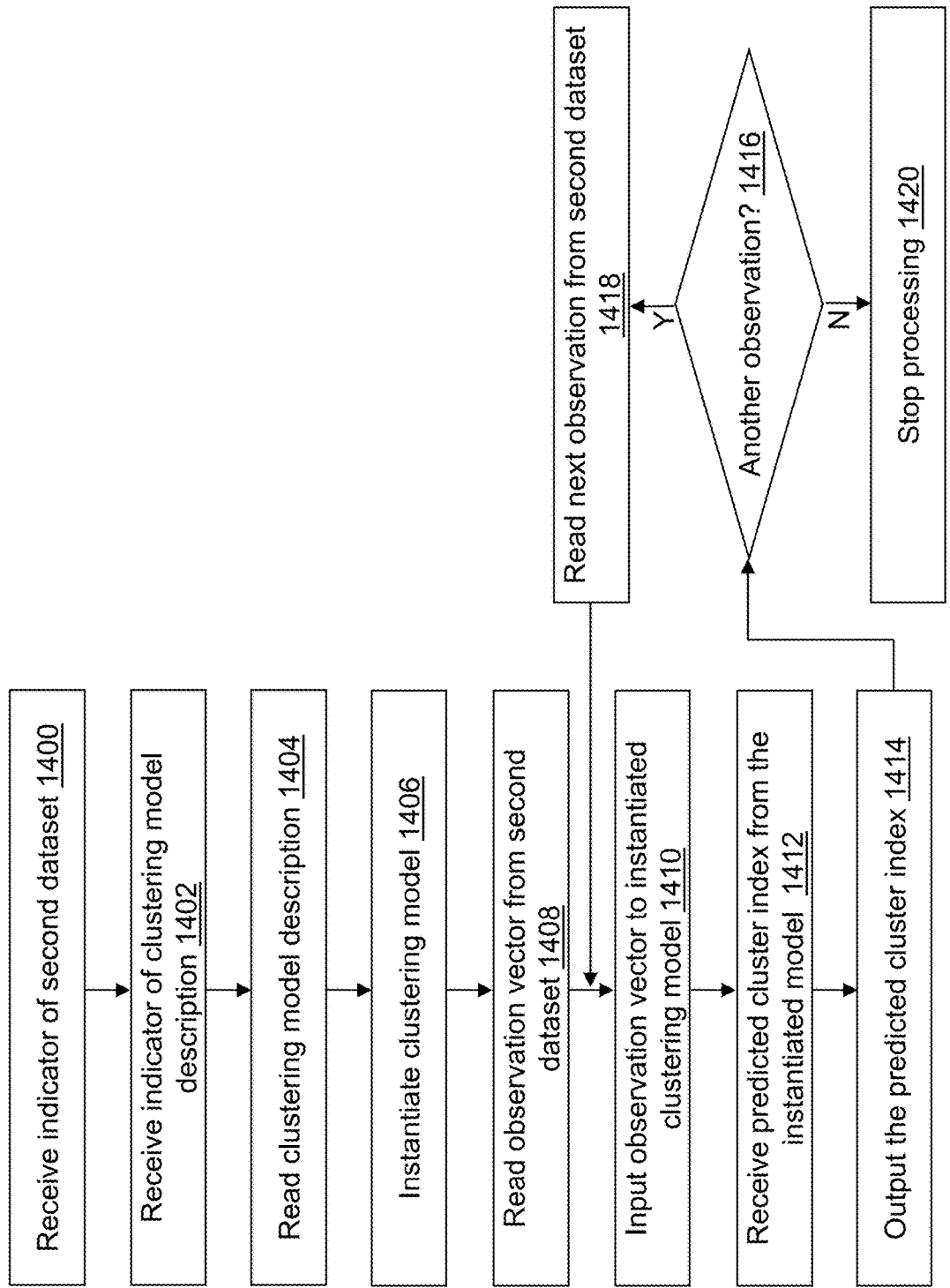
FIG. 14 depicts a flow diagram illustrating examples of operations performed by the prediction device of FIG. 14 in accordance with an illustrative embodiment.

Referring to FIG. 14, example operations of prediction application 1322 are described. Additional, fewer, or different operations may be performed depending on the embodiment of prediction application 1322. The order of presentation of the operations of FIG. 14 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1400, a thirteenth indicator may be received that indicates second dataset 1324. For example, the thirteenth indicator indicates a location and a name of second dataset 1324. As an example, the thirteenth indicator may be received by prediction application 1322 after selection from a user interface window or after entry by a user into a user interface window. In an alternative embodiment, second dataset 1324 may not be selectable. For example, a most recently created dataset may be used automatically.

In an operation 1402, a fourteenth indicator may be received that indicates clustering model description 126. For example, the fourteenth indicator indicates a location and a name of clustering model description 126. As an example, the fourteenth indicator may be received by prediction application 1322 after selection from a user interface window or after entry by a user into a user interface window. In an alternative embodiment, clustering model description 126 may not be selectable. For example, a most recently created model configuration data may be used automatically. As another example, clustering model description 126 may be provided automatically as part of integration with clustering model training application 122, clustering model training application 422, controller application 512, and/or worker application 612.

In an operation 1404, a clustering model description is read from clustering model description 126.

In an operation 1406, a clustering model is instantiated with the clustering model description. For example, the type of model, its hyperparameters, and other characterizing elements are read and used to instantiate a clustering model based on the information output from the training process in operation 266 or operation 860.

In an operation 1408, an observation vector is read from second dataset 1324.

In an operation 1410, the observation vector is input to the instantiated model.

In an operation 1412, a predicted cluster index for the read observation vector is received as an output of the instantiated model. The output may indicate a probability that the observation vector is assigned to each cluster. For illustration, the predicted cluster index and/or the probability may be computed based on a comparison of the observation vector with the $m_k$ and $\Psi_k$ computed for each cluster $k=1, 2, \ldots, K_n$ of the number of clusters $K_n$.

In an operation 1414, the predicted cluster index may be output, for example, by storing the predicted cluster index with the observation vector to predicted dataset 1326. In addition, or in the alternative, the predicted cluster index may be presented on third display 1316, printed on third printer 1320, sent to another computing device using fifth communication interface 1306, an alarm or other alert signal may be sounded through third speaker 1318, etc.

In an operation 1416, a determination is made concerning whether or not second dataset 1324 includes another observation vector. When second dataset 1324 includes another observation vector, processing continues in an operation 1418. When second dataset 1324 does not include another observation vector, processing continues in an operation 1420.

In operation 1418, a next observation vector is read from second dataset 1324, and processing continues in operation 1410.

In operation 1420, processing stops and cleanup is performed as needed.

There are applications for clustering model training application 122, clustering model training application 422, controller application 512, worker application 612, and/or prediction application 1322 in many areas such as process control and equipment health monitoring, image processing and classification, data segmentation, data analysis, etc. Clustering model training application 422, controller application 512, and worker application 612 provide efficient distributed and parallel computing device implementations for training clustering models. The presented results demonstrate improved or comparable model accuracies with significantly faster computing times.

The explosion of digital data is generating many opportunities for big data analytics, which in turn provides many opportunities for training clustering models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   compute a mean vector for each cluster of a plurality of clusters from a plurality of observation vectors, wherein the plurality of observation vectors includes a plurality of classified observation vectors and a plurality of unclassified observation vectors, wherein each observation vector of the plurality of observation vectors includes a value for each variable of the plurality of variables, wherein a target variable value is defined to represent a class for each respective observation vector of the plurality of classified observation vectors, wherein the target variable value is unlabeled for each respective observation vector of the plurality of unclassified observation vectors;
compute an inverse precision parameter value for each cluster of the plurality of clusters from the plurality of observation vectors;
initialize a responsibility parameter vector for each observation vector of the plurality of unclassified observation vectors, wherein the responsibility parameter vector includes a probability value of a cluster membership in each cluster of the plurality of clusters for each respective observation vector, wherein the plurality of unclassified observation vectors are distributed across a plurality of threads, and the responsibility parameter vector is initialized by each thread on which the plurality of unclassified observation vectors are distributed on each computing device of one or more computing devices;
(A) compute beta distribution parameter values for each cluster using a predefined mass parameter value and the responsibility parameter vector;
(B) compute parameter values for a normal-Wishart distribution for each cluster using a predefined concentration parameter value, a predefined degree of freedom parameter value, the computed mean vector, the computed inverse precision parameter value, each observation vector of the plurality of observation vectors, and each responsibility parameter vector defined for each observation vector of the plurality of unclassified observation vectors;
(C) update each responsibility parameter vector defined for each observation vector of the plurality of unclassified observation vectors using the computed beta distribution parameter values, the computed parameter values for the normal-Wishart distribution, and a respective observation vector of the plurality of unclassified observation vectors;
(D) compute a convergence parameter value;
(E) repeat (A) to (D) until the computed convergence parameter value indicates the responsibility parameter vector defined for each observation vector of the plurality of unclassified observation vectors is converged;
determine a cluster membership for each observation vector of the plurality of unclassified observation vectors from the plurality of clusters using a respective updated responsibility parameter vector; and
output the determined cluster membership for each observation vector of the plurality of unclassified observation vectors.

2. The non-transitory computer-readable medium of claim 1, wherein the inverse precision parameter value is computed using $\Psi_{0,k}^{-1} = \rho \sigma_k^c + (1-\rho)\sigma^u$, $k=1, 2, \ldots, K_{max}$, where $\Psi_{0,k}^{-1}$ is an inverse precision parameter matrix for a $k^{th}$ cluster of the plurality of clusters, wherein the inverse precision parameter matrix includes the computed inverse precision parameter value, $\rho$ is a predefined labeling coefficient, $\sigma_k^c$ is a first standard deviation matrix for the $k^{th}$ cluster computed using the plurality of classified observation vectors, $\sigma^u$ is a second standard deviation matrix computed using the plurality of unclassified observation vectors, and $K_{max}$ is a number of the plurality of clusters.

3. The non-transitory computer-readable medium of claim 2, wherein the first standard deviation matrix is computed using $$\sigma_k^c = \sqrt{\frac{1}{n_k^c - 1} \sum_{i=1}^{n_k^c} (x_i - m_k^c)(x_i - m_k^c)^T}, k = 1, 2, \ldots, K_{max},$$

where $x_i$ is an $i^{th}$ observation vector of the plurality of classified observation vectors that is included in the $k^{th}$ cluster, $m_k^c$ is a mean vector for the $k^{th}$ cluster computed using the plurality of classified observation vectors included in the $k^{th}$ cluster, wherein the mean vector includes the mean vector value computed for each variable of the plurality of variables, $n_k^c$ is a number of observation vectors of the plurality of classified observation vectors that is included in the $k^{th}$ cluster, and T indicates a transpose.

4. The non-transitory computer-readable medium of claim 3, wherein the second standard deviation matrix is computed using $$\sigma^u = \frac{1}{n-1} \sum_{i=1}^{n} (x_{i,j} - m_{0,j})^2, j = 1, 2, \ldots, d,$$

where d is a number of the plurality of variables, $x_{i,j}$ is a variable value for a $j^{th}$ variable of the $i^{th}$ observation vector of the plurality of unclassified observation vectors, n is a number of the plurality of unclassified observation vectors, and $m_{0,j}$ is a mean value computed from the plurality of unclassified observation vectors for the $j^{th}$ variable of the plurality of variables.

5. The non-transitory computer-readable medium of claim 3, wherein the second standard deviation matrix is computed using $$\sigma^u = \frac{1}{n-1} \sum_{i=1}^{n} (x_i - m_0)(x_i - m_0)^T,$$

where d is a number of the plurality of variables, $x_i$ is the $i^{th}$ observation vector of the plurality of unclassified observation vectors, $m_0$ is the mean vector computed from the plurality of unclassified observation vectors, and n is a number of the plurality of unclassified observation vectors.

6. The non-transitory computer-readable medium of claim 1, wherein the responsibility parameter vector is initialized for each observation vector using random draws from a multinomial distribution such that $$\sum_{k=1}^{K_{max}} r_{i,k} = 1 \text{ for } i = 1, 2, \ldots, n,$$

where $r_{i,k}$ is a responsibility parameter value for an $i^{th}$ observation vector of the plurality of unclassified observation vectors and a $k^{th}$ cluster of the plurality of clusters, n is a number of the plurality of unclassified observation vectors, and $K_{max}$ is a number of the plurality of clusters.

7. The non-transitory computer-readable medium of claim 1, wherein the responsibility parameter vector is initialized using $$\sum_{k=1}^{K_{max}} r_{i,k} = 1/K_{max} \text{ for } i = 1, 2, \dots, n,$$

where $r_{i,k}$ is a responsibility parameter value for an $i^{th}$ observation vector of the plurality of unclassified observation vectors and a $k^{th}$ cluster of the plurality of clusters, n is a number of the plurality of unclassified observation vectors, and $K_{max}$ is a number of the plurality of clusters.

8. The non-transitory computer-readable medium of claim 1, wherein the beta distribution parameter values include a first beta distribution parameter value and a second beta distribution parameter value, wherein the first beta distribution parameter value is computed using $$\gamma_{k,1} = 1 + n_k^c + \sum_{i=1}^{n_u} r_{i,k}, k = 1, 2, \dots, K_{max},$$

where $\gamma_{k,1}$ is the first beta distribution parameter value, $n_k^c$ is a number of the plurality of classified observation vectors included in a $k^{th}$ cluster of the plurality of clusters, $r_{i,k}$ is a responsibility parameter value of the responsibility parameter vector defined for an $i^{th}$ observation vector of the plurality of unclassified observation vectors and the $k^{th}$ cluster of the plurality of clusters, $n_u$ is a number of the plurality of unclassified observation vectors, and $K_{max}$ is a number of the plurality of clusters.

9. The non-transitory computer-readable medium of claim 8, wherein the second beta distribution parameter value is computed using $$\gamma_{k,2} = \alpha_0 + \sum_{l=k+1}^{K_{max}} \sum_{i=1}^{n} r_{i,l},$$

where $\gamma_{k,2}$ is the second beta distribution parameter value, and $\alpha_0$ is the predefined mass parameter value.

10. The non-transitory computer-readable medium of claim 1, wherein computing the parameter values for the normal-Wishart distribution comprises:
  computing a first parameter value for the normal-Wishart distribution for each cluster using the predefined concentration parameter value, the computed mean vector, each observation vector of the plurality of unclassified observation vectors, and each responsibility parameter vector defined for each observation vector of the plurality of unclassified observation vectors;
  computing a second parameter value for the normal-Wishart distribution for each cluster using the predefined concentration parameter value and each responsibility parameter vector defined for each observation vector of the plurality of unclassified observation vectors;
  computing a third parameter value for the normal-Wishart distribution for each cluster using the predefined degree of freedom parameter value and each responsibility parameter vector defined for each observation vector of the plurality of unclassified observation vectors; and
  computing a fourth parameter value for the normal-Wishart distribution for each cluster using the predefined concentration parameter value, the computed mean vector, the computed first parameter value, the computed inverse precision parameter value, each observation vector of the plurality of observation vectors, and each responsibility parameter vector defined for each observation vector of the plurality of unclassified observation vectors.

11. The non-transitory computer-readable medium of claim 10, wherein the first parameter value is computed using $$m_k = \frac{\beta_0 m_{0,k} + u_k}{\beta_0 + q_k}$$

for $k=1, \dots, K_{max}$, where $m_k$ is a first parameter vector that includes the first parameter value for each variable of the plurality of variables for a $k^{th}$ cluster of the plurality of clusters, $\beta_0$ is the predefined concentration parameter value, $m_{0,k}$ is the mean vector for the $k^{th}$ cluster of the plurality of clusters, $$u_k = \sum_{i=1}^{n_k^c} x_i^c + \sum_{i=1}^{n_u} r_{i,k} x_i^u, k = 1, 2, \dots, K_{max}, q_k = n_k^c + \sum_{i=1}^{n_u} r_{i,k},$$

$x_i^c$ is an $i^{th}$ observation vector of the plurality of classified observation vectors included in the $k^{th}$ cluster, $r_{i,k}$ is a responsibility parameter value for the $i^{th}$ observation vector of the plurality of unclassified observation vectors and the $k^{th}$ cluster, $x_i^u$ is the $i^{th}$ observation vector of the plurality of unclassified observation vectors, $n_k^c$ is a number of the plurality of classified observation vectors included in the $k^{th}$ cluster, $n_u$ is a number of the plurality of unclassified observation vectors, and $K_{max}$ is a number of the plurality of clusters.

12. The non-transitory computer-readable medium of claim 11, wherein the second parameter value is computed using $\beta_k = \beta_0 + q_k$, $k=1, \dots, K_{max}$, where $\beta_k$ is the second parameter value for the $k^{th}$ cluster.

13. The non-transitory computer-readable medium of claim 12, wherein the third parameter value is computed using $v_k = v_0 + q_k$, $k=1, \dots, K_{max}$, where $v_k$ is the third parameter value for the $k^{th}$ cluster, and $v_0$ is the predefined degree of freedom parameter value.

14. The non-transitory computer-readable medium of claim 13, wherein the fourth parameter value is computed using $\Psi_k = (\Psi_0^{-1} + \beta_0(m_k - m_0)(m_k - m_0)^T + s_k - u_k m_k^T - m_k u_k^T + q_k m_k m_k^T)^{-1}$, $k=1, \dots, K_{max}$, where $\Psi_k$ is a d by d-dimensional matrix that includes the fourth parameter value for each variable of the plurality of variables by each variable of the plurality of variables and for the $k^{th}$ cluster, $\Psi_0^{-1}$ is a d by d-dimensional inverse precision parameter matrix that includes the computed inverse precision parameter value for each variable of the plurality of variables by each variable of the plurality of variables, $$s_k = \sum_{i=1}^{n_k^c} x_i^c x_i^{cT} + \sum_{i=1}^{n_u} r_{i,k} x_{i,j} x_{i,j}^T, j = 1, 2, \dots, d, k = 1, 2, \dots, K_{max}, d$$

is a number of the plurality of variables, and T indicates a transpose.

15. The non-transitory computer-readable medium of claim 14, wherein the responsibility parameter vector is updated using $$r_{i,k} \propto \exp\left(\Gamma^{(1)}(\gamma_{k,1}) - \Gamma^{(1)}(\gamma_{k,1} + \gamma_{k,2}) + \sum_{l=1}^{k-1}(\Gamma^{(1)}(\gamma_{l,2}) - \Gamma^{(1)}(\gamma_{l,1} + \gamma_{l,2})) + \frac{1}{2}\Gamma_d^{(1)}\left(\frac{v_k}{2}\right) + \frac{1}{2}\log|\Psi_k| - \frac{1}{2}(x_i - m_k)^T v_k \Psi_k (x_i - m_k) - \frac{d}{2}\beta_k^{-1}\right)$$

for k=1, 2, ..., $K_{max}$, i=1, 2, ..., n, where $\gamma_{k,1}$ is a first beta distribution parameter value of the beta distribution parameter values for the $k^{th}$ cluster, $\gamma_{k,2}$ is a second beta distribution parameter value of the beta distribution parameter values for the $k^{th}$ cluster, $\gamma_{l,1}$ is the first beta distribution parameter value of the beta distribution parameter values for the $l^{th}$ cluster, $\gamma_{l,2}$ is the second beta distribution parameter value of the beta distribution parameter values for the $l^{th}$ cluster, $\Gamma^{(1)}$ indicates a digamma function, and $\Gamma_d^{(1)}$ indicates a d-dimensional digamma function.

16. The non-transitory computer-readable medium of claim 10, wherein after determining the cluster membership for each observation vector of the plurality of unclassified observation vectors, the computer-readable instructions further cause the computing device to:
determine a number of clusters of the plurality of clusters that include at least one observation vector of the plurality of observation vectors; and
output the determined number of clusters.

17. The non-transitory computer-readable medium of claim 16, wherein after determining the number of clusters, the computer-readable instructions further cause the computing device to:
output the first parameter value and the fourth parameter value computed for each cluster that includes at least one observation vector of the plurality of observation vectors.

18. The non-transitory computer-readable medium of claim 17, wherein, after determining the number of clusters, the computer-readable instructions further cause the computing device to:
read a new observation vector from a dataset;
assign the read new observation vector to a cluster of the determined number of clusters based on the read new observation vector, the first parameter value, and the fourth parameter value computed for each cluster that includes at least one observation vector; and
output the assigned cluster.

19. The non-transitory computer-readable medium of claim 1, wherein each thread computes $$q_{k,w,t} = \sum_{i=1}^{n_{w,t}} r_{i,k}, \ u_{k,w,t} = \sum_{i=1}^{n_{w,t}} r_{i,k} x_i, \text{ and } s_{k,w,t} = \sum_{i=1}^{n_{w,t}} r_{i,k} x_i x_i^T$$

for each cluster k=1, ..., $K_{max}$, where $n_{w,t}$ is a number of observation vectors on which a computing device w and a thread t of the computing device w initializes the responsibility parameter vector, $r_{i,k}$ is a responsibility parameter value for an $i^{th}$ observation vector of the plurality of unclassified observation vectors and the $k^{th}$ cluster on which a computing device w and a thread t of the computing device w initialize the responsibility parameter vector, $x_i$ is the $i^{th}$ observation vector of the plurality of unclassified observation vectors on which a computing device w and a thread t of the computing device w initialize the responsibility parameter vector, $K_{max}$ is a number of the plurality of clusters, and T indicates a transpose.

20. The non-transitory computer-readable medium of claim 19, wherein the responsibility parameter vector is updated by each thread on which the plurality of unclassified observation vectors are distributed on each computing device of the one or more computing devices.

21. The non-transitory computer-readable medium of claim 20, wherein the cluster membership is determined for each observation vector of the plurality of unclassified observation vectors using a respective updated responsibility parameter vector by each thread on which the plurality of unclassified observation vectors are distributed on each computing device of the one or more computing devices.

22. The non-transitory computer-readable medium of claim 1, wherein the target variable value selected for each observation vector of the plurality of unclassified observation vectors identifies a characteristic of a respective observation vector.

23. The non-transitory computer-readable medium of claim 1, wherein the mean vector is computed using $m_{o,k} = \rho m_k^c + (1-\rho) m^u$, k=1, 2, ..., $K_{max}$, where $m_{o,k}$ is the mean vector for a $k^{th}$ cluster of the plurality of clusters, $\rho$ is a predefined labeling coefficient, $m_k^c$ is a first mean vector for the $k^{th}$ cluster computed using the plurality of classified observation vectors, $m^u$ is a second mean vector computed using the plurality of unclassified observation vectors, and $K_{max}$ is a number of the plurality of clusters.

24. The non-transitory computer-readable medium of claim 23, wherein the first mean vector is computed using $$m_k^c = \frac{1}{n_k^c} \sum_{i=1}^{n_k^c} x_i, k = 1, 2, \ldots, K_{max},$$

where $x_i$ is an $i^{th}$ observation vector of the plurality of classified observation vectors that is included in the $k^{th}$ cluster, and $n_k^c$ is a number of observation vectors of the plurality of classified observation vectors that is included in the $k^{th}$ cluster.

25. The non-transitory computer-readable medium of claim 24, wherein the second mean vector is computed using $$m^u = \frac{1}{n_u} \sum_{i=1}^{n_u} x_i^u,$$

where $x_i^u$ is the $i^{th}$ observation vector of the plurality of unclassified observation vectors, and $n_u$ is a number of the plurality of unclassified observation vectors.

26. A system comprising:
a processor; and
a computer-readable medium operably coupled to the processor, the computer-readable medium having computer-readable instructions stored thereon that, when executed by the processor, cause the system to
compute a mean vector for each cluster of a plurality of clusters from a plurality of observation vectors, wherein the plurality of observation vectors includes a plurality of classified observation vectors and a plurality of unclassified observation vectors, wherein each observation vector of the plurality of observation vectors includes a value for each variable of the plurality of variables, wherein a target variable value is defined to represent a class for each respective observation vector of the plurality of classified observation vectors, wherein the target variable value is unlabeled for each respective observation vector of the plurality of unclassified observation vectors;

compute an inverse precision parameter matrix for each cluster of the plurality of clusters from the plurality of observation vectors;

initialize a responsibility parameter vector for each observation vector of the plurality of unclassified observation vectors, wherein the responsibility parameter vector includes a probability value of a cluster membership in each cluster of the plurality of clusters for each respective observation vector, wherein the plurality of unclassified observation vectors are distributed across a plurality of threads, and the responsibility parameter vector is initialized by each thread on which the plurality of unclassified observation vectors are distributed on each computing device of one or more computing devices;

(A) compute beta distribution parameter values for each cluster using a predefined mass parameter value and the responsibility parameter vector;

(B) compute parameter values for a normal-Wishart distribution for each cluster using a predefined concentration parameter value, a predefined degree of freedom parameter value, the computed mean vector, the computed inverse precision parameter matrix, each observation vector of the plurality of observation vectors, and each responsibility parameter vector defined for each observation vector of the plurality of unclassified observation vectors;

(C) update each responsibility parameter vector defined for each observation vector of the plurality of unclassified observation vectors using the computed beta distribution parameter values, the computed parameter values for the normal-Wishart distribution, and a respective observation vector of the plurality of unclassified observation vectors;

(D) compute a convergence parameter value;

(E) repeat (A) to (D) until the computed convergence parameter value indicates the responsibility parameter vector defined for each observation vector of the plurality of unclassified observation vectors is converged;

determine a cluster membership for each observation vector of the plurality of unclassified observation vectors from the plurality of clusters using a respective updated responsibility parameter vector; and output the determined cluster membership for each observation vector of the plurality of unclassified observation vectors.

27. A method of providing distributed training of a clustering model, the method comprising:

computing, by a computing device, a mean vector for each cluster of a plurality of clusters from a plurality of observation vectors, wherein the plurality of observation vectors includes a plurality of classified observation vectors and a plurality of unclassified observation vectors, wherein each observation vector of the plurality of observation vectors includes a value for each variable of the plurality of variables, wherein a target variable value is defined to represent a class for each respective observation vector of the plurality of classified observation vectors, wherein the target variable value is unlabeled for each respective observation vector of the plurality of unclassified observation vectors;

computing, by the computing device, an inverse precision parameter matrix for each cluster of the plurality of clusters from the plurality of observation vectors;

initializing a responsibility parameter vector for each observation vector of the plurality of unclassified observation vectors, wherein the responsibility parameter vector includes a probability value of a cluster membership in each cluster of the plurality of clusters for each respective observation vector, wherein the plurality of unclassified observation vectors are distributed across a plurality of threads, and the responsibility parameter vector is initialized by each thread on which the plurality of unclassified observation vectors are distributed on each computing device of one or more computing devices;

(A) computing, by the computing device, beta distribution parameter values for each cluster using a predefined mass parameter value and the responsibility parameter vector;

(B) computing, by the computing device, parameter values for a normal-Wishart distribution for each cluster using a predefined concentration parameter value, a predefined degree of freedom parameter value, the computed mean vector, the computed inverse precision parameter matrix, each observation vector of the plurality of observation vectors, and each responsibility parameter vector defined for each observation vector of the plurality of unclassified observation vectors;

(C) updating, by the computing device, each responsibility parameter vector defined for each observation vector of the plurality of unclassified observation vectors using the computed beta distribution parameter values, the computed parameter values for the normal-Wishart distribution, and a respective observation vector of the plurality of unclassified observation vectors;

(D) computing, by the computing device, a convergence parameter value;

(E) repeating (A) to (D), by the computing device, until the computed convergence parameter value indicates the responsibility parameter vector defined for each observation vector of the plurality of unclassified observation vectors is converged;

determining, by the computing device, a cluster membership for each observation vector of the plurality of unclassified observation vectors from the plurality of clusters using a respective updated responsibility parameter vector; and outputting, by the computing device, the determined cluster membership for each observation vector of the plurality of unclassified observation vectors.

28. The method of claim 27, wherein the mean vector is computed using $m_{0,k} = \rho m_k^c + (1-\rho) m^u$, $k=1, 2, \ldots, K_{max}$, where $m_{0,k}$ is the mean vector for a $k^{th}$ cluster of the plurality of clusters, $\rho$ is a predefined labeling coefficient, $m_k^c$ is a first mean vector for the $k^{th}$ cluster computed using the plurality of classified observation vectors, $m^u$ is a second mean vector computed using the plurality of unclassified observation vectors, and $K_{max}$ is a number of the plurality of clusters.

29. The method of claim 27, wherein the inverse precision parameter value is computed using $\Psi_{0,k}^{-1} = \rho \sigma_k^c + (1-\rho) \sigma^u$, $k=1, 2, \ldots, K_{max}$, where $\Psi_{0,k}^{-1}$ is an inverse precision parameter matrix for a $k^{th}$ cluster of the plurality of clusters, wherein the inverse precision parameter matrix includes the computed inverse precision parameter value, $\rho$ is a predefined labeling coefficient, $\sigma_k^c$ is a first standard deviation matrix for the $k^{th}$ cluster computed using the plurality of classified observation vectors, $\sigma^u$ is a second standard deviation matrix computed using the plurality of unclassified observation vectors, and $K_{max}$ is a number of the plurality of clusters.

30. The method of claim 27, wherein each thread computes $$q_{k,w,t} = \sum_{i=1}^{n_{w,t}} r_{i,k}, \; u_{k,w,t} = \sum_{i=1}^{n_{w,t}} r_{i,k} x_i, \text{ and } s_{k,w,t} = \sum_{i=1}^{n_{w,t}} r_{i,k} x_i x_i^T$$

for each cluster k=1, ..., $K_{max}$, where $n_{w,t}$ is a number of observation vectors on which a computing device w and a thread t of the computing device w initializes the responsibility parameter vector, $r_{i,k}$ is a responsibility parameter value for an $i^{th}$ observation vector of the plurality of unclassified observation vectors and the $k^{th}$ cluster on which a computing device w and a thread t of the computing device w initialize the responsibility parameter vector, $x_i$ is the $i^{th}$ observation vector of the plurality of unclassified observation vectors on which a computing device w and a thread t of the computing device w initialize the responsibility parameter vector, $K_{max}$ is a number of the plurality of clusters, and T indicates a transpose.

* * * * *

UNITED STATES PATENT AND TRADEMARK OFFICE
CERTIFICATE OF CORRECTION

PATENT NO. : 10,867,253 B1
APPLICATION NO. : 16/880551
DATED : December 15, 2020
INVENTOR(S) : Yingjian Wang et al.

Page 1 of 5

It is certified that error appears in the above-identified patent and that said Letters Patent is hereby corrected as shown below:

In the Specification

Column 3, Lines 61-64:
Delete the phrase
"$p(\{\mu_k, \Lambda_k\}_{k=1}^{K_{max}} | x, z) \propto \Pi_{i=1}^{n} N(x_i | \mu_{z_i}, \Lambda_{z_i}) \Pi_{k=1}^{K_{max}} NW(\mu_k, \Lambda_k | m_0, \beta_0, \Psi_0, \nu_0)$  (1)
$x = \{x_i\}_{i=1}^{n}$, $n$ input observations;
$z = \{z_i\}_{i=1}^{n}$," and replace with
--$p(\{\mu_k, \Lambda_k\}_{k=1}^{K_{max}} | x, z) \propto \Pi_{i=1}^{n} N(x_i | \mu_{z_i}, \Lambda_{z_i}) \Pi_{k=1}^{K_{max}} NW(\mu_k, \Lambda_k | m_0, \beta_0, \Psi_0, \nu_0)$  (1)
$x = \{x_i\}_{i=1}^{n}$, $n$ input observations;
$z = \{z_i\}_{i=1}^{n}$,--.

Column 4, Lines 16-17:
Delete the phrase "$\{z_i\}_{i=1}^{n}$", and the Gaussian parameters of the clusters $\{\mu_k, \Lambda_k\}_{k=1}^{K_{max}}$."
and replace with --$\{z_i\}_{i=1}^{n}$, and the Gaussian parameters of the clusters $\{\mu_k, \Lambda_k\}_{k=1}^{K_{max}}$.--.

Column 5, Line 22:
Delete the phrase "$\pi_k = \phi_k \Pi_{l=1}^{k-1}(1 - \phi_l)$" and replace with --$\pi_k = \phi_k \Pi_{l=1}^{k-1}(1 - \phi_l)$--.

Column 5, Line 27:
Delete the phrase "$x_i \sim N(\mu_{z_i}, \Lambda_{z_i}^{-1})$," and replace with --$x_i \sim N(\mu_{z_i}, \Lambda_{z_i}^{-1})$--.

Column 5, Line 56:
Delete the phrase "$\pi_k = \phi_k \Pi_{l=1}^{k-1}(1 - \phi_l)$" and replace with --$\pi_k = \phi_k \Pi_{l=1}^{k-1}(1 - \phi_l)$--.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,867,253 B1

Column 5, Line 63:
Delete the phrase "$x_i \sim N(\mu_{z_i}, \Lambda_{z_i}{}^{-1})$," and replace with --$x_i \sim N(\mu_{z_i}, \Lambda_{z_i}^{-1})$,--.

Column 8, Line 35:
Delete the phrase "SAS@Visual Data Mining and Machine Learning," and replace with --SAS® Visual Data Mining and Machine Learning,--.

Column 15, Line 12:
Delete the phrase "$m_k{}^c$" and replace with --$m_k^c$--.

Column 15, Line 30:
Delete the phrase "$m_k{}^c$" and replace with --$m_k^c$--.

Column 15, Line 34:
Delete the phrase "$\sigma_j{}^u = 0$" and replace with --$\sigma_j^u = 0$--.

Column 15, Line 41:
Delete the phrase "$m_{0,k} = \rho m_k{}^c + (1-\rho)m^u$, $k = 1, 2, \ldots, K_{max}$." and replace with --$m_{0,k} = \rho m_k^c + (1-\rho)m^u, k = 1, 2, \ldots, K_{max}$.--.

Column 15, Lines 44-45:
Delete the phrase "$\Psi_{0,k}{}^{-1}$ is initialized or each cluster using $\Psi_{0,k}{}^{-1} = \rho\sigma_k{}^c + (1-\rho)\sigma^u$, $k = 1, 2, \ldots, K_{max}$." and replace with --$\Psi_{0,k}^{-1}$ is initialized or each cluster using $\Psi_{0,k}^{-1} = \rho\sigma_k^c + (1-\rho)\sigma^u, k = 1, 2, \ldots, K_{max}$.--.

Column 16, Line 61:
Delete the phrase "$x_i{}^c$" and replace with --$x_i^c$--.

Column 17, Line 25:
Delete the phrase "$\delta_d{}^{(1)}$" and replace with --$\Gamma_d^{(1)}$--.

Column 22, Line 2:
Delete the phrase "SAS@Visual Data Mining and Machine Learning," and replace with --SAS® Visual Data Mining and Machine Learning,--.

Column 22, Line 56:
Delete the phrase "SAS@LASR™," and replace with --SAS® LASR™,--.

Column 22, Line 59:
Delete the phrase "SAS@Visual Analytics," and replace with --SAS® Visual Analytics,--.

Column 25, Line 65:
Delete the phrase "$m_{w,t}{}^u$" and replace with --$m_{w,t}^u$--.

CERTIFICATE OF CORRECTION (continued)
U.S. Pat. No. 10,867,253 B1

Column 26, Line 4:
Delete the phrase "$m_{w,t}{}^u$" and replace with --$m^u_{w,t}$--.

Column 26, Line 7:
Delete the phrase "$m_{0,k} = \rho m_k{}^c + (1-\rho)m^u$," and replace with --$m_{0,k} = \rho m^c_k + (1-\rho)m^u$,--.

Column 26, Line 21:
Delete the phrase "$n_k{}^c$" and replace with --$n^c_k$--.

Column 26, Line 21:
Delete the phrase "$m_k{}^c$" and replace with --$m^c_k$--.

Column 27, Line 16:
Delete the phrase "$p_{w,t}{}^u$" and replace with --$p^u_{w,t}$--.

Column 27, Line 39:
Delete the phrase "$n_k{}^c$" and replace with --$n^c_k$--.

Column 27, Line 44:
Delete the phrase "$(\sigma_j{}^u = 0)$" and replace with --$(\sigma^u_j = 0)$--.

Column 27, Lines 48-49:
Delete the phrase "$\Psi_0{}^{-1}$ is initialized using $\Psi_{0,k}{}^{-1} = \rho\sigma_k{}^c + (1-\rho)\sigma^u$, $k = 1, 2, \ldots, K_{max}$." and replace with --$\Psi^{-1}_{0,k}$ is initialized using $\Psi^{-1}_{0,k} = \rho\sigma^c_k + (1-\rho)\sigma^u, k = 1, 2, \ldots, K_{max}$.--

Column 29, Line 6:
Delete the phrase "$S_{k,w,t}$" and replace with --$s_{k,w,t}$--.

Column 29, Line 23:
Delete the phrase "$n_k{}^c$" and replace with --$n^c_k$--.

Column 35, Line 2:
Delete the phrase "q = 0," and replace with --$q_k = 0$,--.

Column 35, Line 28:
Delete the phrase "$s_k = s_k + r_{i,k} x_i x_i{}^T$" and replace with --$s_k = s_k + r_{i,k} x_i x_i^T$--.

Column 36, Line 54:
Delete the phrase "$S_k = S_k + r_{i,k} x_i x_i{}^T$" and replace with --$s_k = s_k + r_{i,k} x_i x_i^T$--.

Column 36, Line 56:
Delete the phrase "$S_k = S_k + r_{i,k} x_i \circ x_i$." and replace with --$s_k = s_k + r_{i,k} x_i \circ x_i$.--

CERTIFICATE OF CORRECTION (continued)
U.S. Pat. No. 10,867,253 B1

Column 37, Line 1:
Delete the phrase "$S_k$" and replace with --$s_k$--.

Column 38, Line 8:
Delete the phrase "$\{x_i\}_{i=1}^n$ nor $\left\{\{r_{i,k}\}_{i=1}^n\right\}_{k=1}^{K_{max}}$" and replace with
--$\{x_i\}_{i=1}^n$ nor $\left\{\{r_{i,k}\}_{i=1}^n\right\}_{k=1}^{K_{max}}$--.

Column 38, Line 31-32:
Delete the phrase "the number of workers Wand the number of threads" and replace with --the number of workers $W$ and the number of threads--.

In the Claims

Claim 2, Column 43, Lines 54-55:
Delete the phrase "$\Psi_{0,k}^{-1} = \rho\sigma_k^c + (1-\rho)\sigma^u$, $k = 1, 2, \ldots, K_{max}$, where $\Psi_{0,k}^{-1}$" and replace with
--$\Psi_{0,k}^{-1} = \rho\sigma_k^c + (1-\rho)\sigma^u, k = 1, 2, \ldots, K_{max}$, where $\Psi_{0,k}^{-1}$--.

Claim 2, Column 43, Line 60:
Delete the phrase "$\sigma_k^c$" and replace with --$\sigma_k^c$--.

Claim 3, Column 44, Line 9:
Delete the phrase "$m_k^c$" and replace with --$m_k^c$--.

Claim 3, Column 44, Line 13:
Delete the phrase "$n_k^c$" and replace with --$n_k^c$--.

Claim 8, Column 45, Lines 23-24:
Delete the phrase "$n_k^c$" and replace with --$n_k^c$--.

Claim 11, Column 46, Line 31:
Delete the phrase "$x_i^u$" and replace with --$x_i^u$--.

Claim 14, Column 46, Lines 48-49:
Delete the phrase "$\Psi_k = (\Psi_0^{-1} + \beta_0(m_k - m_0)(m_k - m_0)^T + s_k - u_k m_k^T - m_k u_k^T + q_k m_k m_k^T)^{-1}$, $k = 1, \ldots, K_{max}$," and replace with
--$\Psi_k = (\Psi_0^{-1} + \beta_0(m_k - m_0)(m_k - m_0)^T + s_k - u_k m_k^T - m_k u_k^T + q_k m_k m_k^T)^{-1}, k = 1, \ldots, K_{max}$,--.

Claim 14, Column 46, Line 52:
Delete the phrase "$\Psi_0^{-1}$" and replace with --$\Psi_0^{-1}$--.

Claim 23, Column 48, Line 22:
Delete the phrase "$m_{0,k} = \rho m_k^c + (1-\rho)m^u$, $k = 1, 2, \ldots, K_{max}$," and replace with
--$m_{0,k} = \rho m_k^c + (1-\rho)m^u, k = 1, 2, \ldots, K_{max}$,--.

Claim 23, Column 48, Line 24:
Delete the phrase "$m_k^c$" and replace with --$m_k^c$--.

Claim 24, Column 48, Line 40:
Delete the phrase "$n_k^c$" and replace with --$n_k^c$--.

Claim 25, Column 48, Line 51:
Delete the phrase "$x_i^u$" and replace with --$x_i^u$--.

Claim 28, Column 50, Line 55:
Delete the phrase "$m_{0,k} = \rho m_k^c + (1-\rho)m^u$, $k = 1, 2, \ldots, K_{max}$," and replace with
--$m_{0,k} = \rho m_k^c + (1-\rho)m^u, k = 1, 2, \ldots, K_{max}$,--.

Claim 28, Column 50, Lines 57:
Delete the phrase "$m_k^c$" and replace with --$m_k^c$--.

Claim 29, Column 50, Lines 63-64:
Delete the phrase "$\Psi_{0,k}^{-1} = \rho \sigma_k^c + (1-\rho)\sigma^u$, $k = 1, 2, \ldots, K_{max}$, where $\Psi_{0,k}^{-1}$" and replace with
--$\Psi_{0,k}^{-1} = \rho \sigma_k^c + (1-\rho)\sigma^u, k = 1, 2, \ldots, K_{max}$, where $\Psi_{0,k}^{-1}$--.

Claim 29, Column 51, Line 1:
Delete the phrase "$\sigma_k^c$" and replace with --$\sigma_k^c$--.